(12) United States Patent
Mairs et al.

(10) Patent No.: US 9,042,528 B2
(45) Date of Patent: May 26, 2015

(54) DATA COMMUNICATION

(71) Applicant: Metaswitch Networks Ltd, Enfield, Middlesex (GB)

(72) Inventors: Chris Mairs, Middlesex (GB); Felix Palmer, Bristol (GB); Alex Pollitt, Middlesex (GB)

(73) Assignee: Metaswitch Networks Ltd., Enfield (GB)

( * ) Notice: Subject to any disclaimer, the term of this patent is extended or adjusted under 35 U.S.C. 154(b) by 0 days.

(21) Appl. No.: 13/967,119

(22) Filed: Aug. 14, 2013

(65) Prior Publication Data
US 2013/0329870 A1    Dec. 12, 2013

Related U.S. Application Data

(63) Continuation of application No. PCT/GB2012/050334, filed on Feb. 14, 2012.

(60) Provisional application No. 61/442,775, filed on Feb. 14, 2011.

(30) Foreign Application Priority Data

Mar. 18, 2011    (GB) .................................. 1104620.8

(51) Int. Cl.
*H04M 1/64*    (2006.01)
*H04M 3/533*    (2006.01)
(Continued)

(52) U.S. Cl.
CPC ...... *H04M 3/53366* (2013.01); *H04M 3/42059* (2013.01); *H04M 3/42102* (2013.01);
(Continued)

(58) Field of Classification Search
CPC ...................................................... H04M 3/533
USPC ...................................... 379/88.22; 455/413
See application file for complete search history.

(56) References Cited

U.S. PATENT DOCUMENTS 5,003,577 A    3/1991    Ertz et al.
6,823,047 B1    11/2004    Cruickshank
(Continued)

FOREIGN PATENT DOCUMENTS

EP    1317117 A1    6/2003
EP    1672881 A1    6/2006
(Continued)

OTHER PUBLICATIONS

Search Report issued in International Application No. PCT/GB2012/050334.

*Primary Examiner* — Simon King
(74) *Attorney, Agent, or Firm* — EIP US LLP

(57) ABSTRACT

A telephony user device capable of establishing a communications session for communication of data in a data communications network, the telephony user device including a processing system configured to provide a reconfigurable graphical user interface, establish a telephone call with a voicemail system, establish a separate communications session, separate from the telephone call, for the transfer of data to/from the telephony user device, on the basis of one or more call party details associated with the telephone call, and reconfigure at least a part of the graphical user interface in accordance with configuration data received via the separate communication session, the configuration data relating to and/or being derived from the voicemail system.

32 Claims, 28 Drawing Sheets

(51) Int. Cl.
*H04M 7/00* (2006.01)
*H04M 3/42* (2006.01)

(52) U.S. Cl.
CPC .......... *H04M 7/0027* (2013.01); *H04M 7/0042* (2013.01); *H04M 2207/12* (2013.01); *H04M 2207/18* (2013.01); *H04M 2207/203* (2013.01)

(56) References Cited

U.S. PATENT DOCUMENTS

| | | | |
|---|---|---|---|
| 6,885,737 | B1 | 4/2005 | Gao et al. |
| 7,027,571 | B1 | 4/2006 | Cook |
| 2002/0152275 | A1* | 10/2002 | Bettis ............................ 709/206 |
| 2003/0005076 | A1 | 1/2003 | Koch et al. |
| 2004/0086095 | A1 | 5/2004 | Dixit et al. |
| 2004/0121814 | A1 | 6/2004 | Creamer et al. |
| 2006/0246915 | A1 | 11/2006 | Shrivastava |
| 2006/0285662 | A1 | 12/2006 | Yin et al. |
| 2008/0055264 | A1* | 3/2008 | Anzures et al. ................ 345/173 |
| 2009/0170480 | A1 | 7/2009 | Lee |
| 2010/0210245 | A1 | 8/2010 | Kim |
| 2011/0009096 | A1 | 1/2011 | Rotsztein et al. |

FOREIGN PATENT DOCUMENTS

| | | |
|---|---|---|
| WO | 2007108631 A1 | 9/2007 |
| WO | 2008081242 A2 | 7/2008 |
| WO | 2008118696 A1 | 10/2008 |
| WO | 2009079252 A1 | 6/2009 |
| WO | 2010126822 A2 | 11/2010 |
| WO | 2011007262 A1 | 1/2011 |

* cited by examiner

DATA COMMUNICATION

CROSS REFERENCE TO PRIOR APPLICATIONS

This application is a continuation of International Application No. PCT/GB2012/050334, filed Feb. 14, 2012 and designating the U.S., which claims priority to Great Britain Patent Application No. GB 1104620.8, filed Mar. 18, 2011, which also claims priority to the U.S. Patent Application No. 61/442,775 filed Feb. 14, 2011 all of which are incorporated herein by reference in their entirety.

TECHNICAL FIELD

The present disclosure relates to the communication of data. In particular, but not exclusively, the present disclosure relates to the communication of data between user devices during telephone calls.

BACKGROUND

Communication between parties in a telecommunications network can be carried out in a number of ways. Most commonly, communication is carried out by a calling party dialing the telephone dialing number of a called party telephony device on a calling party telephony device. The dialing of the telephone number causes a call set-up process to be carried out in the network which results in the telephone of the called party ringing. If the called party chooses to answer their telephone, a telephone call can ensue between the calling party and the called party. The telephone call allows audio data such as speech data to be transferred along an audio channel created between the calling party telephony device and the called party telephony device.

Some telephony devices have enhanced capabilities which allow transfer of video data along a video channel created between the calling party telephone and the called party telephone. A video call may not be possible unless both the calling and called party telephone devices support video call functionality.

Audio or video conferencing may be carried out between three or more remote telephony devices, allowing communication of audio and/or video data between parties to the conference.

Web conferencing is also possible between multiple remote parties using devices with combined data processing, display and telephony capabilities. Web conferencing allows online meetings to be conducted for viewing and/or collaborating on common multimedia content.

Parties may also exchange text data by use of text messaging services such as the Short Message Service (SMS). Enhanced messaging services such as the Multimedia Messaging Service (MMS) allow parties to exchange image and video data in addition to text data.

The example methods of communication described above provide a wide range of ways for remote parties to communicate with each other. However, each method typically has different requirements in terms of device and/or network capability and interchanging between the different methods is either not possible or requires use of inconvenient set-up or configuration processes.

It would therefore be desirable to provide improved methods for communicating data between remote parties, including communication of data in a manner convenient to the parties.

SUMMARY

In accordance with first embodiments, there is a telephony user device capable of establishing a communications session for communication of data in a data communications network, the telephony user device comprising a processing system configured to:
provide a reconfigurable graphical user interface;
establish a telephone call with a voicemail system;
establish a separate communications session, separate from the telephone call, for the transfer of data to/from the telephony user device, on the basis of one or more call party details associated with the telephone call; and
reconfigure at least a part of the graphical user interface in accordance with configuration data received via the separate communication session, the configuration data relating to and/or being derived from the voicemail system.

In accordance with second embodiments, there is apparatus adapted to establish a communications session for communication of data in a data communications network, the apparatus comprising a processing system configured to:
receive call party details for a telephone call established between a telephony user device having a reconfigurable graphical user interface and a voicemail system;
establish a separate communications session, separate from the telephone call, for the transfer of data to/from the telephony user device, on the basis of one or more call party details associated with the telephone call; and
transmit configuration data via the separate communication session, the configuration data being operable to instruct the telephony device to reconfigure at least a part of its graphical user interface.

In accordance with third embodiments, there is apparatus adapted to establish a communications session for communication of data in a data communications network, the apparatus comprising a processing system configured to:
receive call party details for a telephone call established between a telephony user device and an automated system;
establish a separate communications session, separate from the telephone call, for the transfer of data to/from the telephony user device, on the basis of one or more call party details associated with the telephone call;
receive one or more files from the telephony user device via the session: and
store the received one or more files in association with one or more call party details associated with the telephone call.

In accordance with fourth embodiments, there is apparatus adapted to establish a communications session for communication of data in a data communications network, the apparatus comprising a processing system configured to:
store one or more files;
receive call party details for a telephone call established between a telephony user device and an automated system;
establish a separate communications session, separate from the telephone call, for the transfer of data to/from the telephony user device, on the basis of one or more call party details associated with the telephone call; and
transmit at least one of the stored files via the session.

In accordance with fifth embodiments, there is a computer program product comprising a non-transitory computer-readable storage medium having computer readable instructions stored thereon, the computer readable instructions being executable by a computerized device to cause the computerized device to operate a telephony device and/or apparatus according to the first, second third or fourth embodiments.

Further features of embodiments will become apparent from the following description of preferred embodiments, given by way of example only, which is made with reference to the accompanying drawings.

DETAILED DESCRIPTION

Figure 1:
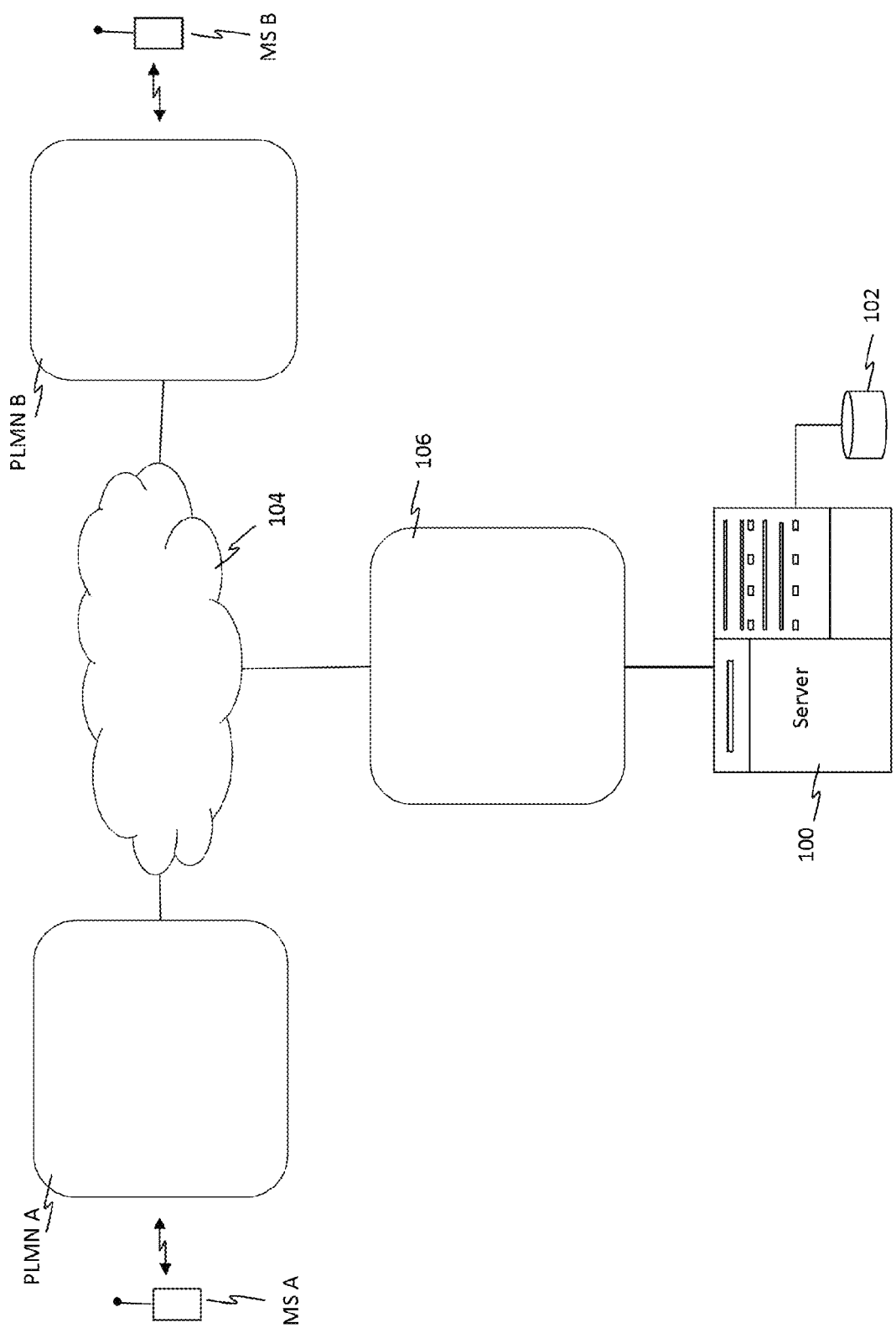
FIG. 1 is a system diagram according to embodiments.

FIG. 1 is a system diagram showing a data communications network according to embodiments of the present disclosure. These embodiments involve two mobile stations (MS) MS A and MS B which access public land mobile networks (PLMNs) PLMN A and PLMN B respectively via radio interfaces. MS A and MS B may be smart phones having data processing capabilities and operating systems.

PLMN A and PLMN B contain mobile telephony network infrastructure including one or more mobile switching centers, one or more base station controllers, and one or more base transceiver stations; the function of such entities is well known in the art and will not be described in detail here.

PLMN A and PLMN B are connected via a telecommunications network 104 comprising one or more Public Switched Telephone Networks (PSTNs) and/or packet networks. Telecommunications network 104 comprises one or more media and/or signaling gateway entities (not shown) for performing conversion between the various protocols and data formats used to transfer media and signaling data within and between the different networks. Server (or server system) 100 has an associated data store 102 and is connected to telecommunications network 104 via a packet network 106. Although server 100 is depicted as a single entity in FIG. 1, server 100 may be a single device, a cluster of servers or servers forming a server system which is distributed throughout the data communications network.

MS A has an associated identity in the form of a telephone dialing number (TDN), TDN A. MS B has an associated identity in the form of a telephone dialing number TDN B. MS A has communication session application software running on it with an associated application identifier AppID A. MS B also has communication session application software running on it with an associated application identifier AppID B.

In some embodiments, during installation of the application software on MS A, server 100 may be informed of AppID A and creates a record for MS A in data store 102 containing AppID A stored in association with TDN A. Similarly, in some embodiments, during installation of the application software on MS B, server 100 may informed of AppID B and creates a record for MS B in data store 102 containing AppID B stored in association with TDN B.

Figure 2:
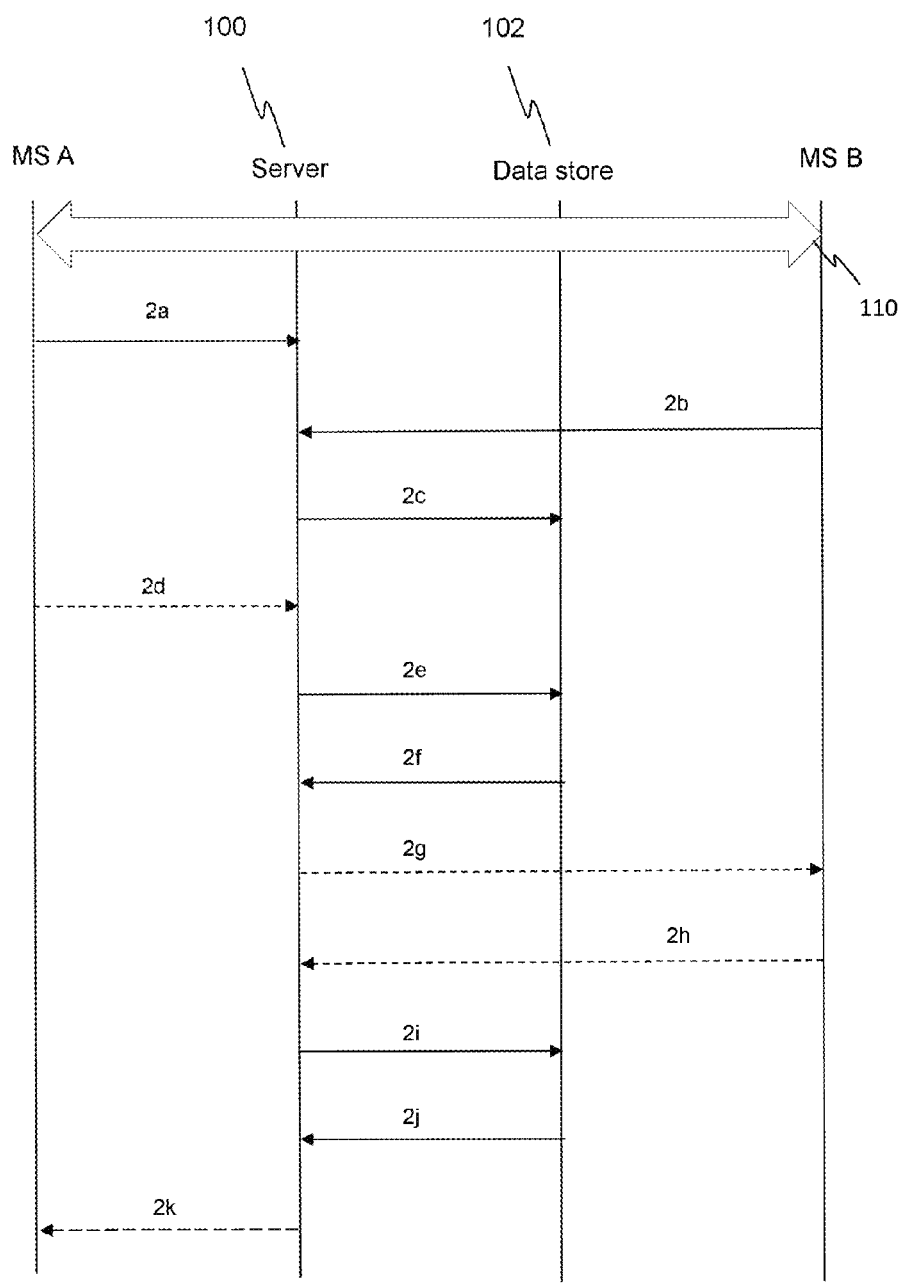
FIG. 2 is a flow diagram depicting operation of embodiments using the system of FIG. 1.

FIG. 2 is a flow diagram depicting operation of embodiments, for example implemented in a system depicted in FIG. 1.

In this and subsequent flow diagrams, solid arrows denote transfer of control, messaging or signaling data, whereas dashed arrows denote transfer of media or payload data.

A voice call is currently in progress between MS A in PLMN A and MS B in PLMN B, as shown by item 110. The voice call will typically be a circuit-switched voice call, the set-up and control for which is known in the art.

Application software running on MS A detects that there is a call in progress between MS A and MS B and notifies server 100 of call party details for the call, e.g. the TDNs of telephones involved in the call, TDN A associated with MS A and TDN B associated with MS B, in step 2a. Similarly, application software running on MS B detects the call in progress between MS B and MS A and notifies server 100 of call party details for the call, e.g. the TDNs of telephones involved in the call, TDN A associated with MS A and TDN B associated with MS B, in step 2b.

Application software running on MS A may detect that the call is in progress by registering with the operating system of MS A to be notified upon start of a call involving MS A. This could for example involve registering with an application programming interface (API) of the operating system of MS A associated with start and end of call events. A similar call detection process may occur on MS B.

In these embodiments, the user of MS A could be the calling or the called party for the call. Call party details are received from both telephony apparatus acting on behalf of the calling party and telephony apparatus acting on behalf of the called party for the call, e.g. telephony device MS A and telephony device MS B.

Server 100 identifies that the notification of step 2a from MS A and notification of step 2b from MS B have call party details, TDN A and TDN B, in common and establishes a separate communications session, separate from the telephone call, for the communication of data between MS A and MS B. The separate communications session is established on the basis of the received call party details, TDN A and TDN B. The separate communications session is established whilst the telephone call is in progress, and is continued in parallel with the telephone call, such that voice call data is transmitted via the telephone call and other data may be transmitted via the communications session, after the establishment of the separate communications session.

Server 100 updates the records for MS A and MS B in data store 102 to indicate that a call is in progress between MS A and MS B and that a communications session between MS A and MS B, separate to the voice call between MS A and MS B, has been established in step 2c.

Server 100 may respond (not shown) to the notifications of steps 2a and 2b by responding with respective acknowledgements to MS A and MS B.

If MS A wants to communicate data to (e.g. share data with) MS B, it transmits the data to server 100 in step 2d. Server 100 performs a lookup in data store 102 using TDN A for MS A in step 2e and identifies that a communications session has been established between MS A and MS B. Server 100 retrieves TDN B for MS B in step 2f and transmits the data received from MS A to MS B using the retrieved TDN B in step 2g.

In embodiments, the lookup in data store 102 of step 2e may also result in AppID B being retrieved. The data may then be transmitted to MS B using both TDN B and AppID B, with TDN B being used to locate MS B and AppID B being used to direct the data to the communications session application software running on MS B. The data may be transmitted by means of a push notification directed to AppID B of the communication session application on MS B. In the case of MS B being an Apple® iPhone®, the push notification could employ use of the Apple® Push Notification Service (APNS).

If MS B wants to send data to MS A, it sends the data to server 100 in step 2h. Server 100 performs a lookup in data store 102 using TDN B for MS B in step 2i and identifies that a communications session has been established between MS B and MS A. Server 100 retrieves TDN A for MS A in step 2j and transmits the data received from MS B to MS A using the retrieved TDN A in step 2k.

In embodiments, the lookup in data store 102 of step 2j may also result in AppID A being retrieved. The data may then be transmitted to MS A using both TDN A and AppID A, with TDN A being used to locate MS A and AppID A being used to direct the data to the communications session application software running on MS A. The data may be transmitted by means of a push notification directed to AppID A of the communication session application on MS A.

In embodiments, the communication session is established in the form of a client-server relationship, with server 100 acting as the server and each of MS A and MS B acting as clients. One connection is created between server 100 and MS A and another connection is created between server 100 and MS B. The two connections together create a channel between MS A and MS B through which data can be communicated in either direction.

In embodiments, server 100 establishes client-server connections with MS A and MS B in response to receiving one or more client-server connection requests.

In embodiments, a client-server connection request is transmitted in response to the telephone call being established between MS A and MS B. In other embodiments, a client-server connection request is transmitted in response to initiation of a data communications service on MS A or MS B after the telephone call is established between them.

Each of the connections could be HyperText Transfer Protocol (HTTP) or HyperText Transfer Protocol Secure (HTTPS) connections.

To avoid loss of the channel between MS and MS B, the connections can be maintained by maintenance messages ('heartbeats') transmitted from server 100 to MS A and MS B, for example transmitted at periodic intervals sufficiently short to prevent time-out of the connections due to inactivity, e.g. a client-server connection can be maintained by transmitting a message to keep the connection alive if the telephone call lasts more than a connection threshold period.

The data communicated via the session may comprise server 100 receiving data identifying a downloadable resource, selected from the group consisting of a photographic image data file; a word processing document data file; a spreadsheet document data file; a presentation document data file; a video image data file; and streaming video, from one of MS A and MS B, during the separate communications session, and transmitting the data to the other of MS A and MS B, for example via the client-server connection.

In embodiments, the communications session between MS A and MS B can be maintained after the voice call is terminated allowing the users of MS A and MS B to continue communicating data between their user devices.

In alternative embodiments, the separate communications session is established via server 100 and data is transmitted via a data communication path between MS A and MS B which is established on the basis of information received from said server, but with server 100 not being including in the data communication path.

Server 100 may receive a service data object from MS A or MS B during the separate communications session and transmit the service data object to the other of MS A and MS B.

Server 100 may receive a service data object from MS A or MS B during the separate communications session, process the service data object in combination with additional service data to generate derived service data; and transmit the derived service data to the other of MS A and MS B.

Figure 3:
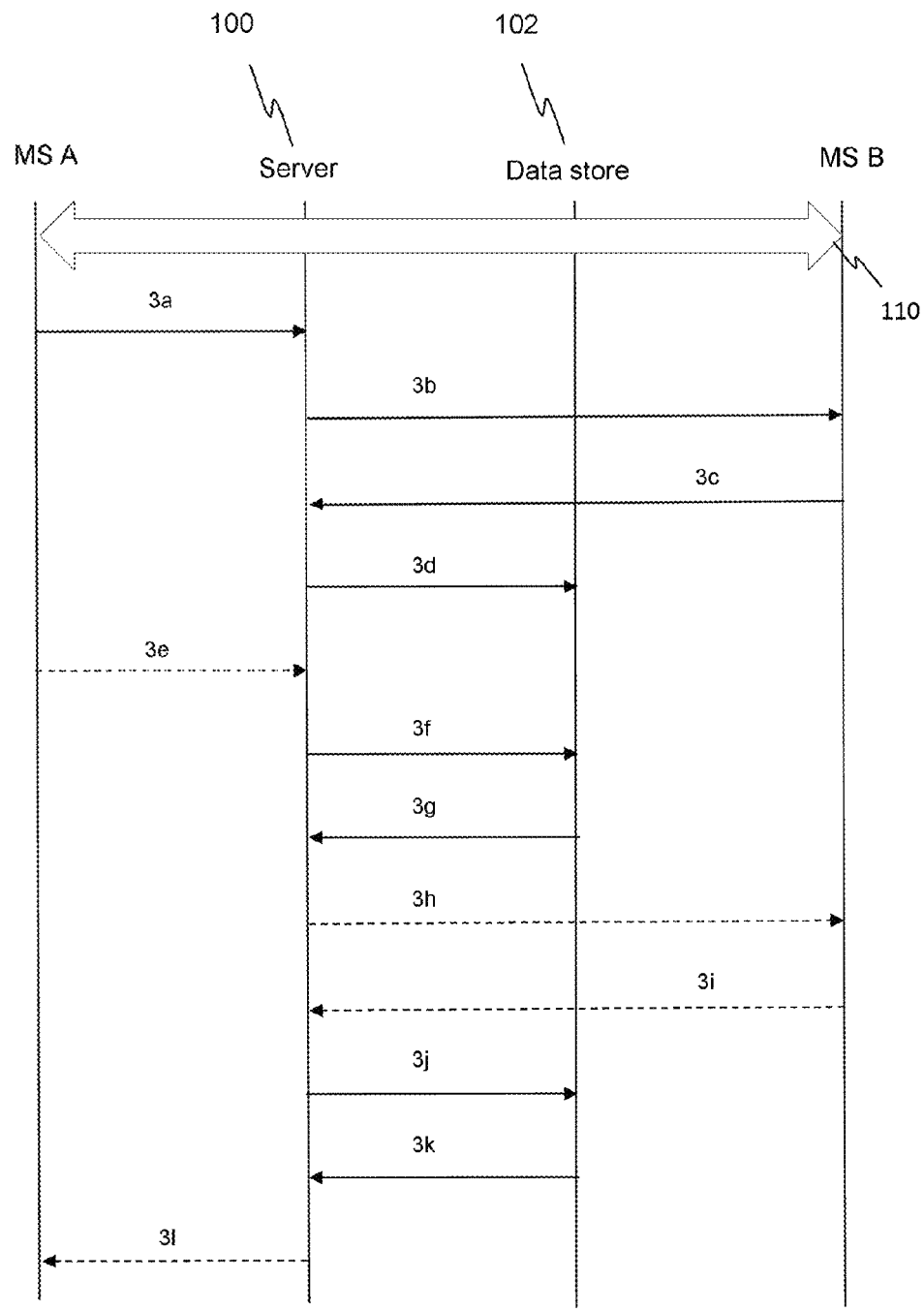
FIG. 3 is a flow diagram depicting operation of embodiments using the system of FIG. 1.

FIG. 3 is a flow diagram depicting operation of embodiments, for example implemented in a system depicted in FIG. 1. Similarly to FIG. 2 described above, a voice call is currently in progress between MS A in PLMN A and MS B in PLMN B, as shown by item 110.

Application software running on MS A detects that there is a call in progress between MS A and MS B and notifies server 100 of call party details for the call, e.g. the TDNs of telephones involved in the call, TDN A associated with MS A and TDN B associated with MS B, in step 3a. Here, however, MS B does not have application software or any other capability which can detect the call with MS A and notify server 100 of such. Instead, server 100 notifies MS B of the receipt of call party details for the call from MS A by transmitting a separate communication session initiation request to MS B in step 3b. The communication session initiation request may cause a message such as "Do you want to establish a data communication session with the party you are speaking to?" or such like. If the user of MS B accepts the request by appropriate user input, MS B transmits a separate communication session initiation response to server 100 in step 3c indicating that a communication session between MS B and MS A, separate to the voice call, should be established.

In these embodiments, the user of MS A could be the calling or the called party for the call. Call party details are received from either telephony apparatus acting on behalf of the calling party or telephony apparatus acting on behalf of the called party, e.g. MS A.

Once, the response of step 3c is received, server 100 updates the records for MS A and MS B in data store 102 in step 3d to indicate that a call is in progress between MS A and MS B and that a separate communications session between MS A and MS B should be established.

Similarly to FIG. 2 described above, server 100 establishes a separate communications session, separate from the telephone call, for the communication of data between MS A and MS B. The separate communications session is established on the basis of the received call party details, e.g. TDN A and TDN B, whilst the telephone call is in progress, and is continued in parallel with the telephone call, such that voice call data is transmitted via the telephone call and other data can be transmitted via the communications session, after the establishment of the separate communications session.

Communication of data from MS A to MS B can now occur in steps 3e to 3h by a similar process to that described above for steps 2d to 2g in relation to FIG. 2. Further, communication of data from MS B to MS A can now occur in steps 3i to 3l in a similar process to that described above for steps 2h to 2k in relation to FIG. 2.

Figure 4:
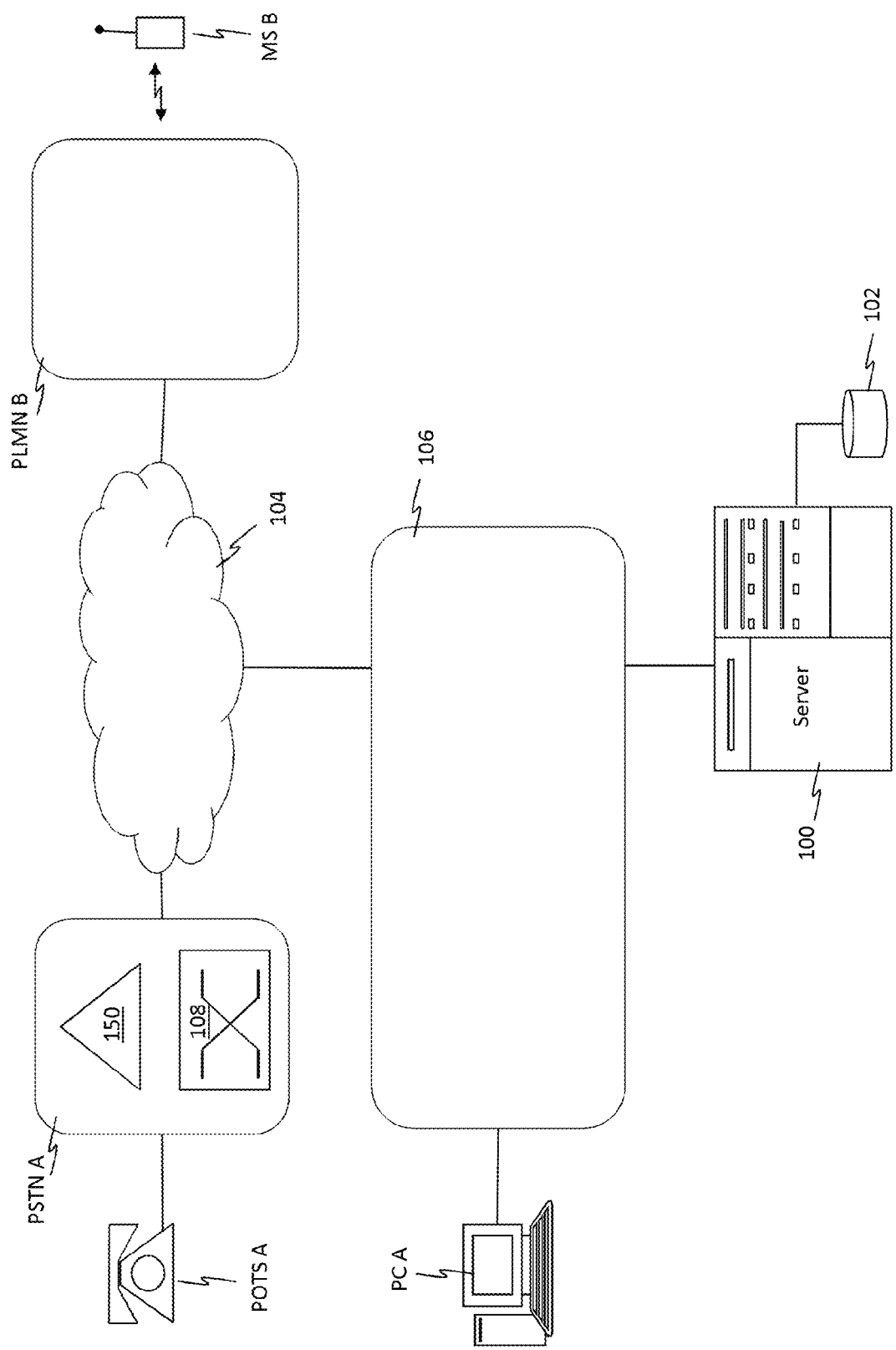
FIG. 4 is a system diagram according to embodiments.

FIG. 4 is a system diagram showing a data communications network according to embodiments. FIG. 4 includes some entities similarly depicted and labeled to FIG. 1, with such entities functioning in a similar manner.

The embodiments of FIG. 4, however, involve an analogue telephone (sometimes referred to as a Plain Old Telephone Service (POTS) telephone or a 'black phone'), denoted POTS A, located in PSTN A, and a mobile station MS B located in PLMN B. PSTN A and PLMN B are connected via a telecommunications network 104 comprising one or more PSTNs and/or packet networks. Further, the user of POTS A also has an associated personal computer PC A connected to packet network 106.

In these embodiments, the user of POTS A cannot conduct communications sessions separate to voice calls conducted via POTS A just using POTS A alone. The user of POTS A therefore additionally employs PC A through which separate communications sessions can be conducted. To provide both voice calls via POTS A and separate communication sessions via PC A, POTS phone and PC A are coupled together logically.

POTS A has an associated telephone dialing number TDN A and MS B has an associated telephone dialing number TDN B. PC A has an associated network address in the form of an Internet Protocol (IP) address IP A in packet network 106. MS B has communications session application software running on it with an associated identifier AppID B.

PSTN A includes a network element 108 in the form of a call switching element, sometimes referred to as a Service Switching Point (SSP), which is capable of detecting whether a query should be raised in relation to calls to/from particular telephone dialing numbers by analyzing in-call signaling information for the calls. Network element 108 acts on behalf of the user of POTS A and PC A and is configured to trigger a query, e.g. hand call control, to a service control point (SCP) network node 150 when it detects a predetermined call state for a call to/from TDN A associated with POTS A, for example by use of an Intelligent Network (IN) or Advanced Intelligent Network (AIN) call origination/termination trigger. SCP 150 is a network node responsible for deciding upon how such queries should be dealt with and acting accordingly, for example responding to network element 108 with appropriate instructions. The query from network element 108 to SCP 150 may pass via one or more Signaling Transfer Points (STPs) (not shown).

Upon receipt of in-call signaling information relating to a query from network element 108, SCP 150 is configured to trigger notification of such to server 100. Any such notification to server 100 will include call party details for the call, e.g. the TDNs of telephones involved in the call, TDN A associated with POTS A and TDN B associated with MS B.

Configuration of SCP 150 may involve storing an IP address for server 100 in association with TDN A, such that when in-call signaling information relating to a call to/from POTS A is received, notification to server 100 at the stored IP address is triggered.

In the embodiments of FIG. 4, POTS A has no communication session application software running on it. Further, POTS A has no capability to generate notifications when a call is outgoing from or incoming to POTS A.

Instead, PC A has communication session application software running on it for facilitating communication sessions according to embodiments.

During installation of the communication session application software on PC A, server 100 is informed that PC A and POTS A are to be coupled together logically. PC A sends IP A and TDN A to server 100 which creates a record for the user of POTS A and PC A in data store 102 containing IP A stored in association with TDN A. Similarly, during installation of the application software on MS B, server 100 is informed of AppID B and creates a record for MS B in data store 102 containing AppID B stored in association with TDN B.

Figure 5:
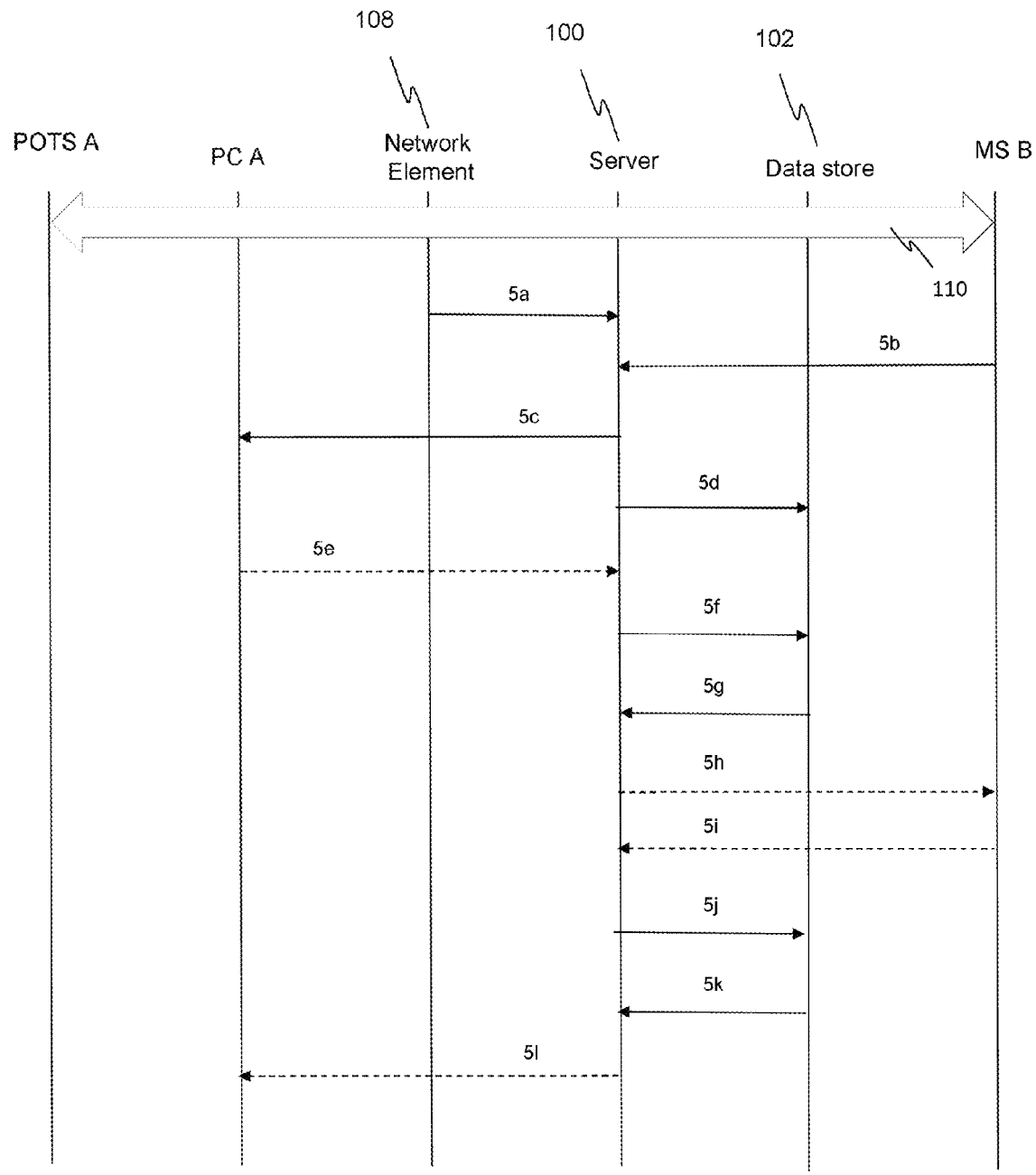
FIG. 5 is a flow diagram depicting operation of embodiments using the system of FIG. 4.

FIG. 5 is a flow diagram depicting operation of embodiments, for example implemented in a system depicted in FIG. 4. Similarly to FIG. 2 described above, a voice call is currently in progress between POTS A in PSTN A and MS B in PLMN B, as shown by item 110.

In the case of an outgoing call being made by POTS A to MS B, network element 108 receives in-call signaling information for the call, including TDN A, for which an AIN call origination trigger is configured. This triggers notification of call party details for the call to server 100 in step 5a.

In the case of an incoming call being received by POTS A from MS B, network element 108 receives in-call signaling information for the call, including TDN, for which an AIN call termination trigger is configured. This triggers notification of call party details for the call to server 100 in step 5a.

A call termination/origination trigger relating to a call to/from POTS A will include call party details for the call, e.g. the TDNs of telephones involved in the call, TDN A associated with POTS A and TDN B associated with MS B.

Application software running on MS B detects the call in progress between MS B and POTS A and notifies server 100 of call party details for the call, e.g. the TDNs of telephones involved in the call, TDN A associated with POTS A and TDN B associated with MS B, in step 5b.

In these embodiments, the user of POTS A could be the calling or the called party for the call. Call party details are received from telephony apparatus acting on behalf of the calling party and telephony apparatus acting on behalf of the called party, e.g. network element 108 and MS B.

Server 100 identifies that the notification of step 5a from network element 108 and the notification of step 5b from MS B have call party details, TDN A and TDN B, in common, e.g. server 100 matches the call party details received on behalf of each respective party to the call.

Server 100 maps the identity TDN A of POTS A to the network address for PC A, e.g. IP A, by reference to data store 102. Alternatively, IP A may be received during the call along with the call party details.

Server 100 establishes a communications session, separate from the telephone call between POTS A and MS B, for the communication of data between PC A and MS B. The separate communications session is established on the basis of the received call party details, e.g. TDN A and TDN B. Once the separate communications session is established, voice call data is transmitted via the telephone call and other data can be transmitted via the separate communications session.

Server 100 notifies PC A via IP A that a call has been detected between POTS A and MS B and that a separate communications session has been established between PC A and MS B in step 5c.

Server 100 updates the records for POTS A/PC A and MS B in data store 102 in step 5d to indicate that a call is in progress between POTS A and MS B and that a separate communications session between PC A and MS B has been established.

If the user of POTS A and PC A wants to communicate data to MS B, the user sends the data using PC A to server 100 in step 5e. Server 100 performs a lookup in data store 102 using IP A for PC A in step 5f and identifies that a communications session has been established between PC A and MS B separately to the call taking place between POTS A and MS B. Server 100 retrieves TDN B for MS B in step 5g and transmits the data received from PC A to MS B using the retrieved TDN B in step 5h.

In embodiments, the lookup in data store 102 of step 5f may also result in AppID B being retrieved. The data may then be transmitted to MS B using both TDN B and AppID B, with TDN B being used to locate MS B and AppID B being used to direct the data to the communications session application software running on MS B.

If the user of MS B wants to send data to the user of POTS A and PC A, the user of MS B sends the data to server 100 in step 5i. Server 100 performs a lookup in data store 102 using TDN A for POTS A in step 5j and identifies that a communications session has been established between PC A and MS B separately to the call taking place between MS B and POTS A. Server 100 retrieves IP A for PC A in step 5k and transmits the data received from MS B to PC A using the retrieved IP A in step 5l.

In alternative embodiments, instead of both call party detail notifications being sent to server 100 in steps 5a and 5b, server 100 may instead notify MS B of the request from PC A to initiate establishment of a separate communications session in a similar manner to step 3b described above in relation to FIG. 3. Similarly to step 3c, MS B will then transmit a communication session initiation response (in response to user input on MS B indicating acceptance of the request) to server 100 indicating that a communication session separate to the voice call between POTS A and MS B should be established between MS B and PC A.

Similarly to embodiments described above in relation to FIG. 2, the communication session is established in the form of a client-server relationship, with server 100 acting as the server and each of PC A and MS B acting as clients. One connection is created between server 100 and PC A and another connection is created between server 100 and MS B. The two connections together create a channel between PC A and MS B through which data can be communicated in either direction.

In some embodiments, establishing the session comprises receiving a client-server connection request from PC A and establishing a client-server connection with PC A. In other embodiments, establishing the session comprises receiving a client-server connection request from MS B and establishing a client-server connection with MS B.

In embodiments, the client-server connection request is transmitted in response to the telephone call between POTS A and MS B being established. In other embodiments, the client-server connection request is transmitted in response to initiation of a data communications service on PC A after the telephone call between POTS A and MS B is established.

If the call between POTS A and MS B is terminated at any stage and server 100 receives an indication of such, a notification message may be transmitted to PC A to inform it of a change of state of the separate communication session.

In alternative embodiments, network element 108 is a call initiating element, for example configured to initiate the establishment of the telephone call between POTS A and MS B in response to a remote click-to-dial website action by a user.

Figure 6:
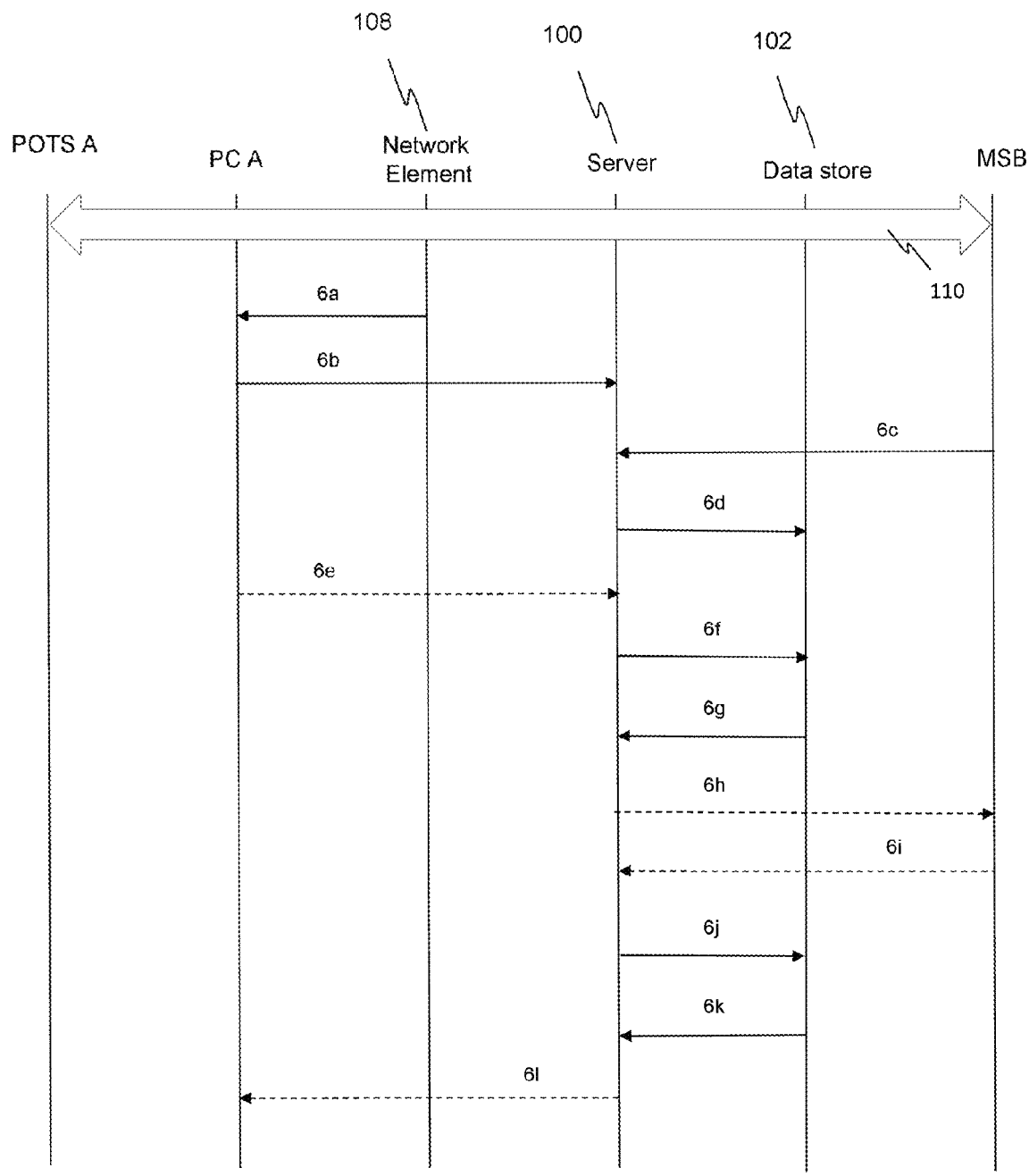
FIG. 6 is a flow diagram depicting operation of embodiments using the system of FIG. 4.

FIG. 6 is a flow diagram depicting operation of embodiments, for example implemented in a system depicted in FIG. 4. Network element 108 is configured similarly to network element 108 described above in relation to FIG. 4, e.g. when it detects a call to/from TDN A associated with POTS A, for example by use of an Advanced Intelligent Network (AIN) call origination/termination trigger, a query to SCP 150 is triggered. Here, however, SCP is configured such that upon receipt of in-call signaling information relating to a query from network element 108, notification to PC A is triggered, instead of notification to server 100. Any such notification to PC A will include call party details for the call, e.g. the TDNs of telephones involved in the call, TDN A associated with POTS A and TDN B associated with MS B.

Configuration of SCP 150 may involve storing an IP address IP A for PC A in association with TDN A, such that when a call is received to/from POTS A, PC A can be notified at the stored IP address.

In the embodiments of FIG. 6, when network element 108 detects the call being conducted between POTS A and MS B, it transmits call party details for the call, TDN A and TDN B, to PC A in step 6a. PC A forwards the call party details notification, including TDN A and TDN B, to server 100 in step 6b.

Application software running on MS B detects the call in progress between MS B and POTS A and notifies server 100 of call party details for the call, e.g. the TDNs of telephones involved in the call, TDN A associated with POTS A and TDN B associated with MS B, in step 6c.

In these embodiments, the user of POTS A could be the calling or the called party for the call. Call party details are received from telephony apparatus acting on behalf of the calling party and telephony apparatus acting on behalf of the called party, e.g. PC A and MS B.

Steps 6d to 6l of FIG. 6 then proceed in a similar manner to steps 5d to 5l described above in relation to FIG. 5.

Figure 7:
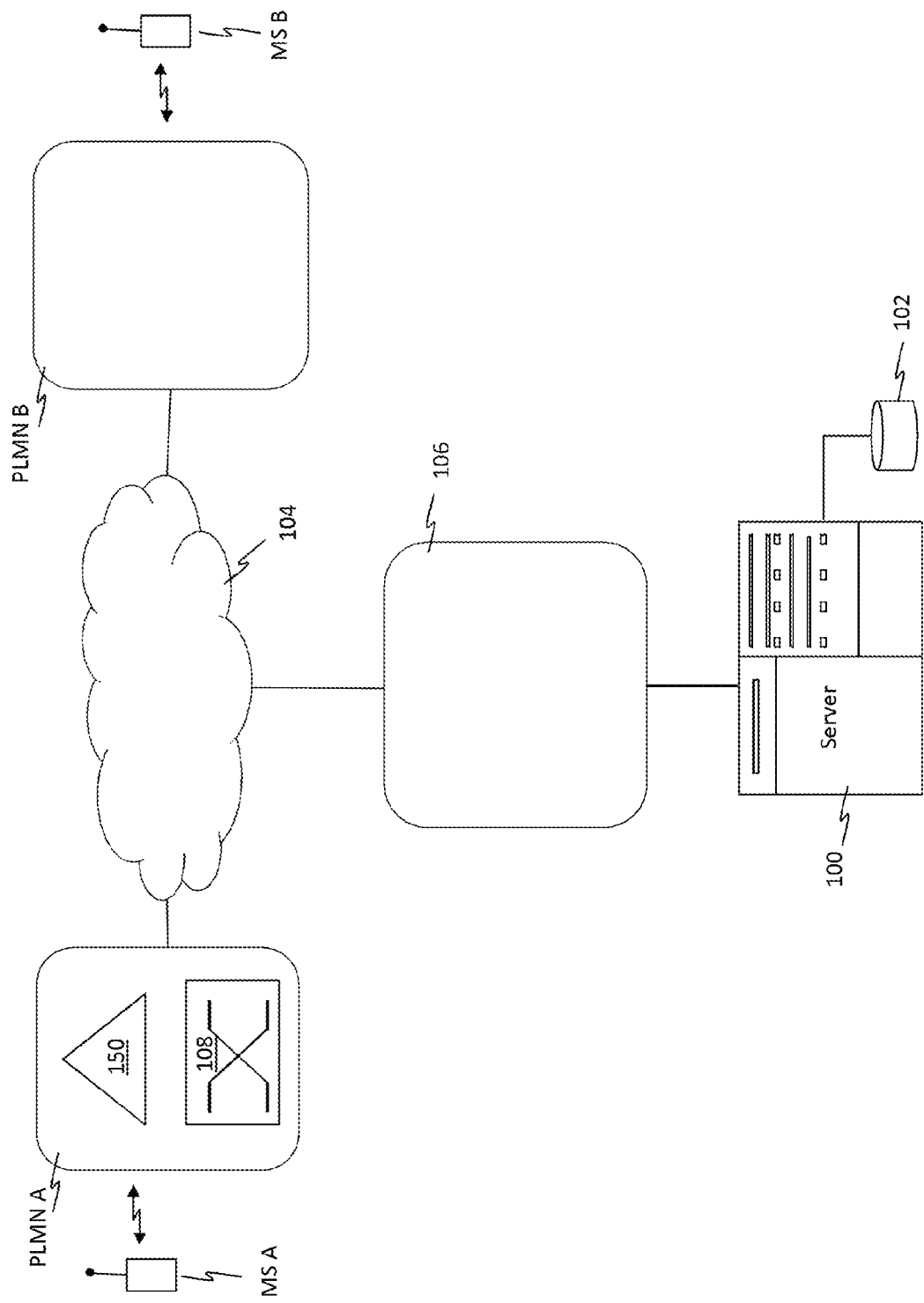
FIG. 7 is a system diagram according to embodiments.

FIG. 7 is a system diagram showing a data communications network according to embodiments. FIG. 7 includes some elements similarly depicted and labeled to FIG. 4, with such elements functioning in a similar manner.

In the embodiments of FIG. 7, MS A has communication session application software running on it with an associated identifier AppID A. However, MS A does not have application software (or any other capability) for detecting calls to/from MS A and notifying server 100 of such.

MS B has communication session application software running on it with an associated identifier AppID B. In addition, MS B has application software running on it which is capable of detecting calls to/from MS B and notifying server 100 of such.

During installation of the communication session application software on MS A, server 100 is informed of AppID A and creates a record for MS A in data store 102 containing AppID A stored in association with TDN A. Similarly, during installation of the communication session application software on MS B, server 100 is informed of AppID B and creates a record for MS B in data store 102 containing AppID B stored in association with TDN B.

PLMN A includes a network switching element 108, for example an SSP, capable of generating queries in response to triggers configured for calls to/from MS A. Network element 108 of FIG. 7 generates queries to SCP 150 in a similar manner to network element 108 described above in relation to FIG. 4. The network element 108 of FIG. 4 generates queries in relation to wireline network triggers, for example Advanced Intelligent Network (AIN) triggers, generated within PSTN of FIG. 4. In FIG. 7, however, the queries are generated in relation to wireless network triggers such as Customized Applications for Mobile networks Enhanced Logic (CAMEL) or Wireless Intelligent Network (WIN) triggers.

Network switching element 108 is configured to trigger a query including in-call signaling information to a service control point (SCP) network node 150 when it detects a call to/from TDN A associated with MS A. Upon receipt of in-call signaling information relating to a query from network element 108, SCP 150 is configured to trigger notification of such to server 100. Any such notification to server 100 will include call party details for the call, e.g. the TDNs of telephones involved in the call, TDN A associated with POTS A and TDN B associated with MS B.

Configuration of SCP 150 may involve SCP 150 storing an IP address for server 100 in association with TDN A, such that when in-call signaling information relating to a call to/from POTS A is received, notification to server 100 at the stored IP address is triggered.

Figure 8:
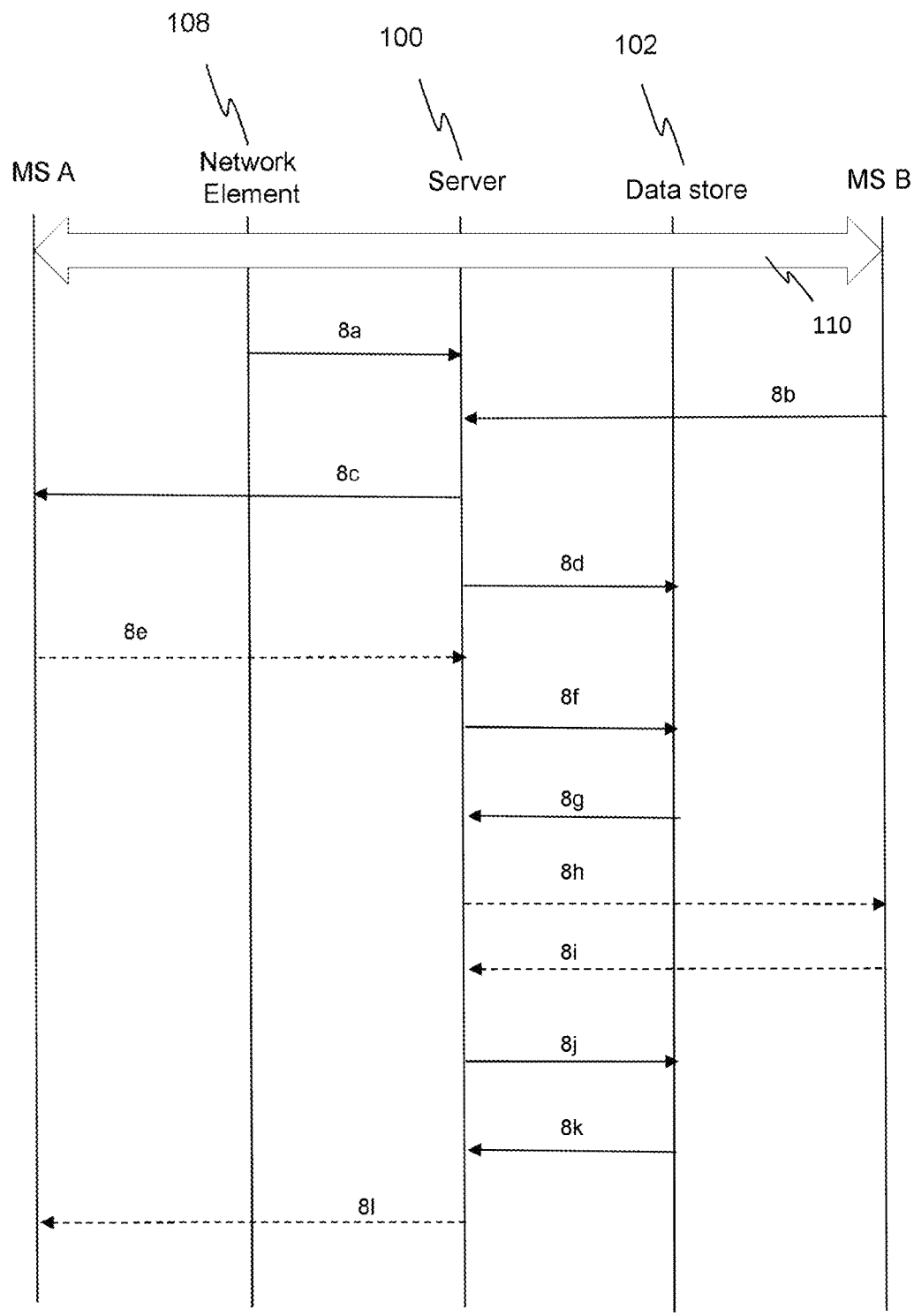
FIG. 8 is a flow diagram depicting operation of embodiments using the system of FIG. 7.

FIG. 8 is a flow diagram depicting operation of embodiments, for example implemented in a system depicted in FIG. 7. Similarly to FIG. 2 described above, a voice call is currently in progress between MS A in PLMN A and MS B in PLMN B, as shown by item 110.

In the case of an outgoing call being made by MS A to MS B, network element 108 receives in-call signaling information for the call, including TDN A, for which a wireless call origination trigger is configured. This triggers notification of call party details for the call to server 100 in step 8a.

In the case of an incoming call being received by MS A from MS B, network element 108 receives in-call signaling information for the call, including TDN A, for which a wireless call termination trigger is configured. This triggers notification of call party details for the call to server 100 in step 8a.

A call termination/origination trigger relating to a call to/from MS A will include call party details for the call, e.g. the TDNs of telephones involved in the call, TDN A associated with MS A and TDN B associated with MS B.

Application software running on MS B detects the call in progress between MS B and MS A and notifies server 100 of call party details for the call, e.g. the TDNs of telephones involved in the call, TDN A associated with MS A and TDN B associated with MS B, in step 8b.

In these embodiments, the user of POTS A could be the calling or the called party for the call. Call party details are received from telephony apparatus acting on behalf of the calling party and telephony apparatus acting on behalf of the called party, e.g. network element 108 and MS B.

Server 100 identifies that the notification of step 8a from network element 108 and the notification of step 8b from MS B have call party details, TDN A and TDN B, in common and establishes a communications session, separate from the telephone call between MS A and MS B, for the communication of data between MS A and MS B. The separate communications session is established on the basis of the received call party details, e.g. TDN A and TDN B. Once the separate communications session is established, voice call data is transmitted via the telephone call and other data can be transmitted via the separate communications session.

Server 100 notifies MS A that a call has been detected between MS A and MS B and that a separate communications session has been established between MS A and MS B in step 8c.

Server 100 updates the records for MS A and MS B in data store 102 in step 8d to indicate that a call is in progress between MS A and MS B and that a separate communications session between MS A and MS B has been established.

Communication of data from MS A to MS B can now occur in steps 8e to 8h by a similar process to that described above for steps 2d to 2g in relation to FIG. 2. Further, communication of data from MS B to MS A can now occur in steps 8i to 8l in a similar process to that described above for steps 2h to 2k in relation to FIG. 2.

In alternative embodiments, instead of both call party detail notifications being sent to server 100 in steps 8a and 8b, server 100 may instead notify MS B of the request from MS A to initiate establishment of a separate communications session in a similar manner to step 3b described above in relation to FIG. 3. Similarly to step 3c, MS B will then transmit a communication session initiation response (in response to user input on MS B indicating acceptance of the request) to server 100 indicating that a communication session separate to the voice call between MS A and MS B should be established between MS B and MS A.

Figure 9:
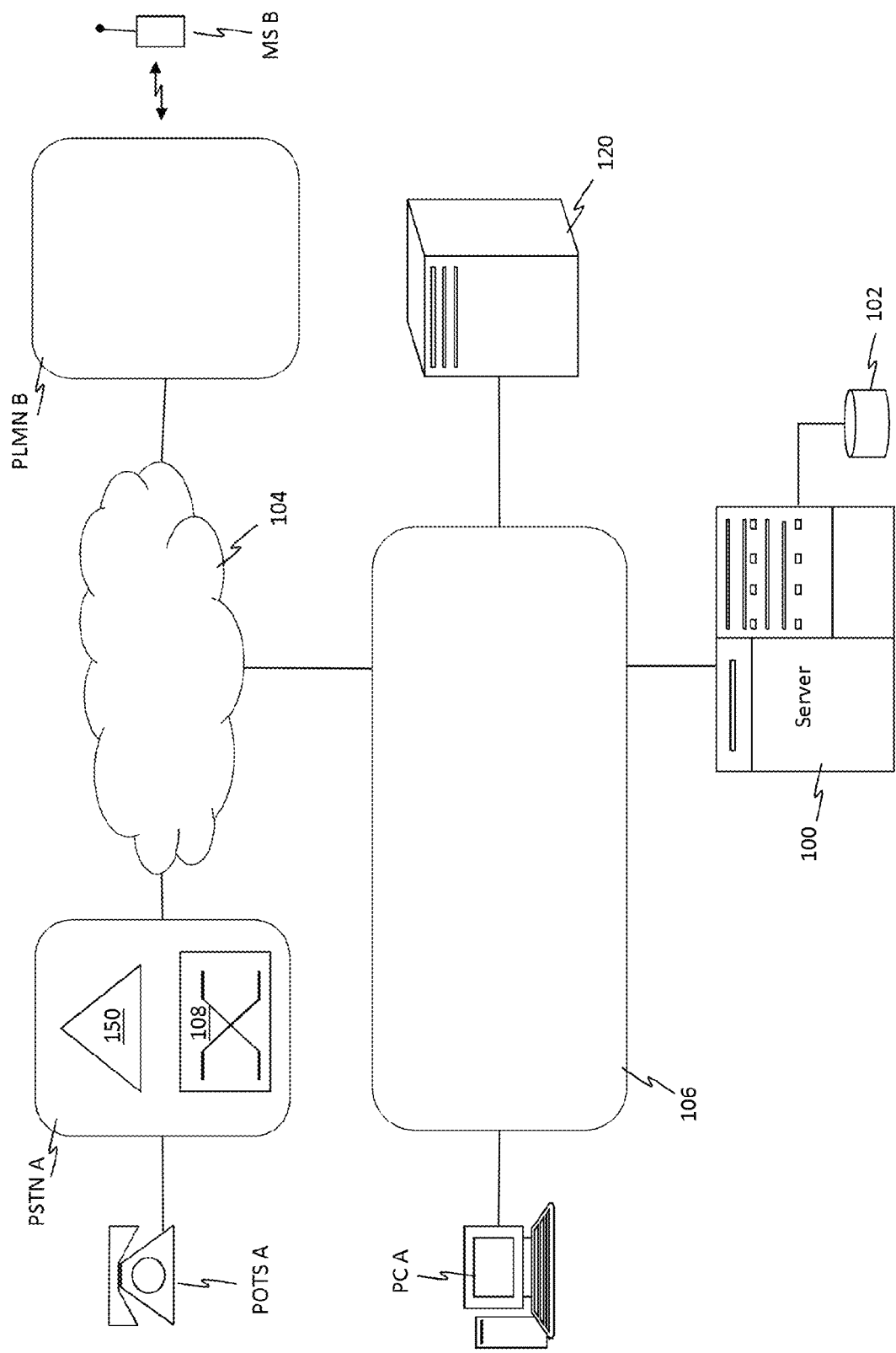
FIG. 9 is a system diagram according to embodiments.

FIG. 9 is a system diagram showing a data communications network according to embodiments. FIG. 9 includes some entities similarly depicted and labeled to FIG. 4, with such entities functioning in a similar manner. In addition, the system of FIG. 9 includes a content server 120 connected to packet network 106 at which electronic content can be provided, for example via electronic download. The electronic content could comprise software components such as applications or plug-ins, or media data such as music, videos, computer games, etc.

Figure 10:
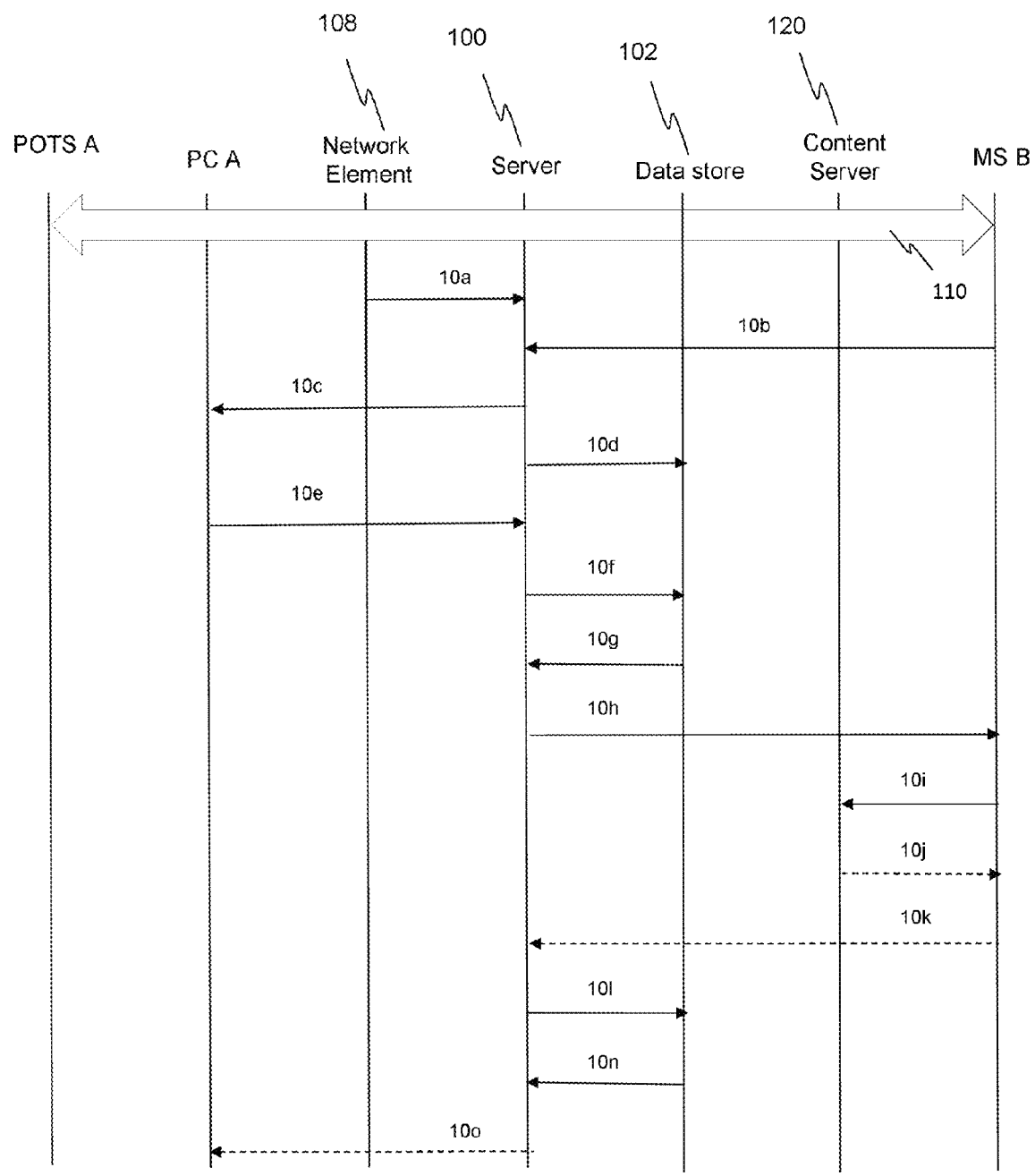
FIG. 10 is a flow diagram depicting operation of embodiments using the system of FIG. 9.

FIG. 10 is a flow diagram depicting operation of embodiments, for example implemented in a system depicted in FIG. 9. Similarly to FIG. 5 described above, a voice call is currently in progress between POTS A in PSTN A and MS B in PLMN B, as shown by item 110.

Similarly to steps 5a to 5d described above in relation to FIG. 5, steps 10a to 10d of FIG. 10 depict detection of a voice call between POTS A and MS B by network element 108 and notification of such to server 100, detection of the call between POTS A and MS B by MS B and notification of such to server 100, establishment of a separate communications session between PC A and MS B and notification of such to PC A, and updating of data store 102.

In these embodiments, the user of POTS A and PC A wishes to use a software component in the separate communications session with MS B and transmits from PC A an identifier for the software component, for example an application name, file name or Uniform Resource Locator (URL), to server 100 in step 10e. The software component may for example comprise a plug-in relating to the communications session application software installed on MS B and PC A.

Server 100 performs a lookup in data store 102 using IP A for PC A in step 10f and identifies that a communications session, separate to the voice call between POTS A and MS B, has been established between PC A and MS B. Server 100 retrieves TDN B for MS B in step 10g and proceeds to enable download of the software component by MS B.

Server 100 enables the download by transmitting the identifier for the software component received from PC A to MS B in step 10h. The identifier could be transmitted to MS B embedded in a text message such as an SMS message.

Using the received software component identifier, MS B sends a download request for the software component to content server 120 in step 10i. Content server then provides the software component to MS B in step 10j.

If the user of MS B wants to communicate data relating to use of the software component to the user of POTS A and PC A, MS B transmits such data to server 100 in step 10k. When server 100 receives the data from MS B in step 10k it performs a lookup in data store 102 using TDN B for MS B in step 10l and identifies that a separate communications session has been established between PC A and MS B. Server 100 retrieves IP A for PC A in step 10n and transmits the data received from MS B to PC A in step 10o. Data may be communicated from PC A to MS B in a similar manner as per steps 2h to 2k described above in relation to FIG. 2.

When server 100 receives the software component identifier in step 10e, it may identify that further information is required for downloading the software component, for example if only an application name is supplied by PC A. The further information could include an IP address, domain name or URL for locating content server 120 in packet network 106; such further information may be stored locally to server 100 or could be obtained via a search or query process carried out by server 100 within packet network 106 or beyond. In such a case, server 100 will additionally provide such further information to MS B in step 10h.

In alternative embodiments, when server 100 receives the software component identifier in step 10e, it performs a lookup in data store 102 and identifies that that a separate communications session has been established between PC A and MS B. Server 100 then downloads the software component from content server 120 itself using the software component identifier received from PC A, and transmits the software component directly to MS B.

In further alternative embodiments, instead of PC A transmitting an identifier for the software component to server 100 as per step 10e, PC A transmits the software component itself to server 100. Server 100 performs a lookup in data store 102 and identifies that that a separate communications session has been established between PC A and MS B and transmits the software component received from PC A to MS B.

In embodiments, before download of the software component to MS B or PC A is enabled, a capability check is conducted to determine whether MS B or PC A is initially enabled with the software component. If the capability check indicates that the respective user device is not initially enabled with the software component, then enabling of the download may proceed.

In some embodiments, capability data for one or more user devices is stored in data store 102 and server 100 may carry out a capability check by reference to data store 102. In other embodiments, the capability check involves transmitting a capability query to a user device, and receiving a response indicating whether said the device is initially enabled with the software component.

In embodiments, the separate communications session is established using a session establishment software application or operating system function on the user device to which the software component is being downloaded to and the software component is a software application which interoperates with the session establishment software application or operating system function.

In embodiments, a client-server connection request is transmitted by the user device to which the software component is being downloaded to server 100 and a client-server connection is established between server 100 and that device. The software component is transmitted via the established client-server connection. The client-server connection request could be transmitted in response to the telephone call being established or in response to a notification received during the telephone call, after the telephone call is established.

Figure 11:
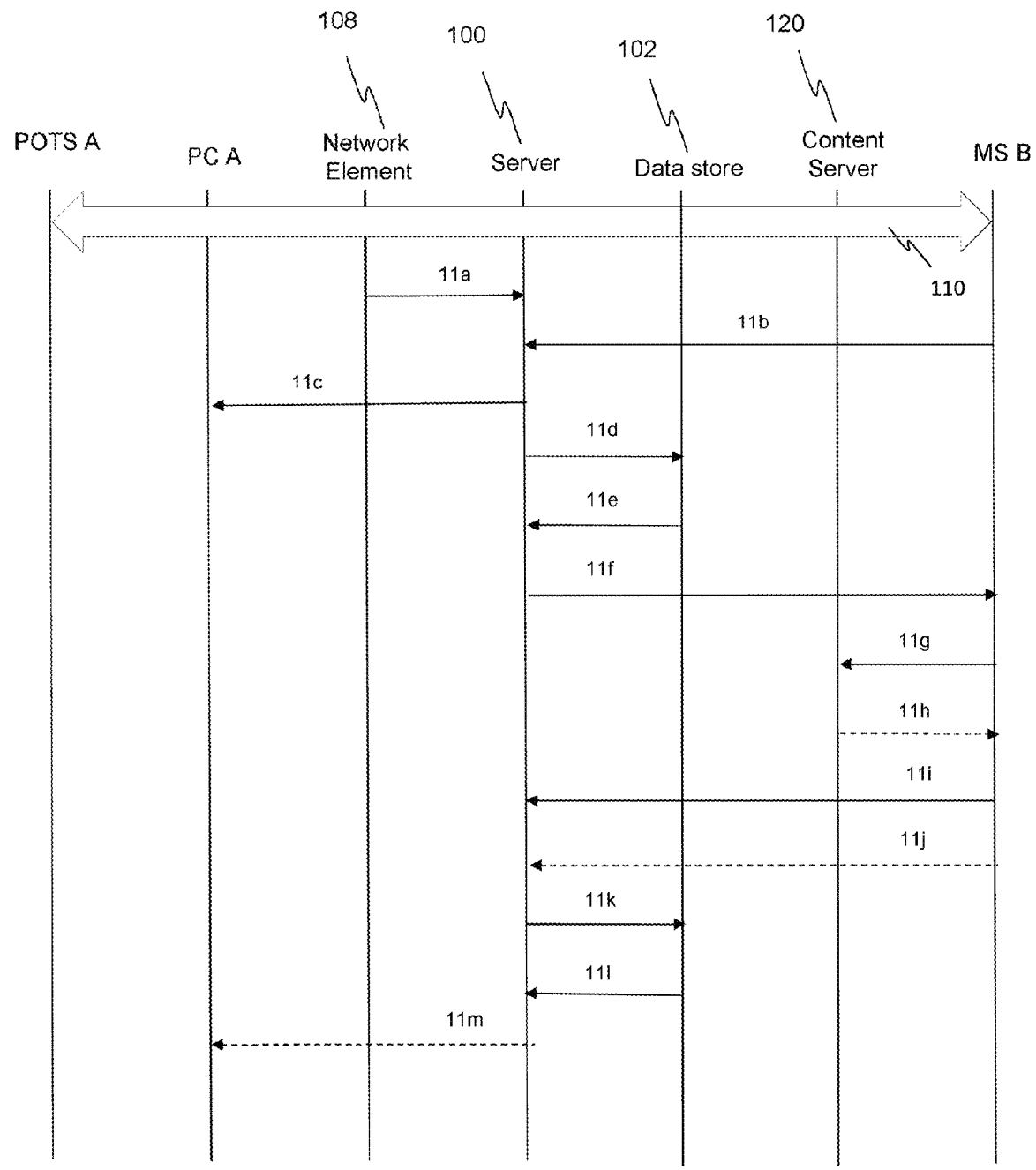
FIG. 11 is a flow diagram depicting operation of embodiments using the system of FIG. 9.

FIG. 11 is a flow diagram depicting operation of embodiments, for example implemented in a system depicted in FIG. 9. Similarly to FIG. 10 described above, a voice call is currently in progress between POTS A in PSTN A and MS B in PLMN B, as shown by item 110.

Steps 11a to 11c of FIG. 11 depict detection of a voice call between POTS A and MS B by network element 108 and notification of call party details for such to server 100, detection of the call between POTS A and MS B by MS B and notification of call party details for such to server 100, as well as notification of the detected call to PC A.

When server 100 receives the call party details for the call between POTS A and MS B in steps 11a and 11b, it performs a lookup in data store 102 for the TDNs of MS A and MS B in step 11d. From the lookup information received in step 11e, server 100 identifies that MS B is an initially non-enabled user device that does not currently have a capability associated with participating in a communication session separate to the voice call between POTS A and MS B.

For example, a data record for MS B in data store 102 may indicate that MS B does not have communications session software installed on it, or there may be no data record at all for MS B in data store 102 which also indicates that MS B does not have communications session software installed on it.

In these embodiments, in order to provide the initially non-enabled user device MS B with the capability associated with participating in the session, server 100 enables the download of a software application to the initially non-enabled user device MS B.

Server 100 enables the download of the software application by transmitting an identifier for the software application to MS B in step 11f. The identifier could be transmitted to MS B embedded in a text message such as an SMS message.

Using the received software application identifier, MS B sends a download request for the software application to content server 120 in step 11g. Content server then provides the software application to MS B in step 11h.

MS B proceeds to install the software application, which when installed, sends an installation confirmation message to server 100 in step 11i. Server 100 is now able to establish a communications session between PC A and MS B which is separate to the voice call being conducted between POTS A and MS B.

Once the separate communications session between MS B and PC A is established, MS B may communicate data to PC A as shown in steps 11j to 11m in a similar manner to steps 5i to 5l as described above in relation to FIG. 5. Further, communication of data from MS B to MS A can now occur (not shown) in a similar process to that described above for steps 5e to 5h in relation to FIG. 5.

In embodiments, establishment of the separate communications session may be initiated by the user of POTS A and PC A, for example by user input on PC A. The user input causes communications session software installed on PC A to transmit a communications session initiation request message to server 100 which then proceeds to establish a separate communications session as described above.

Figure 12:
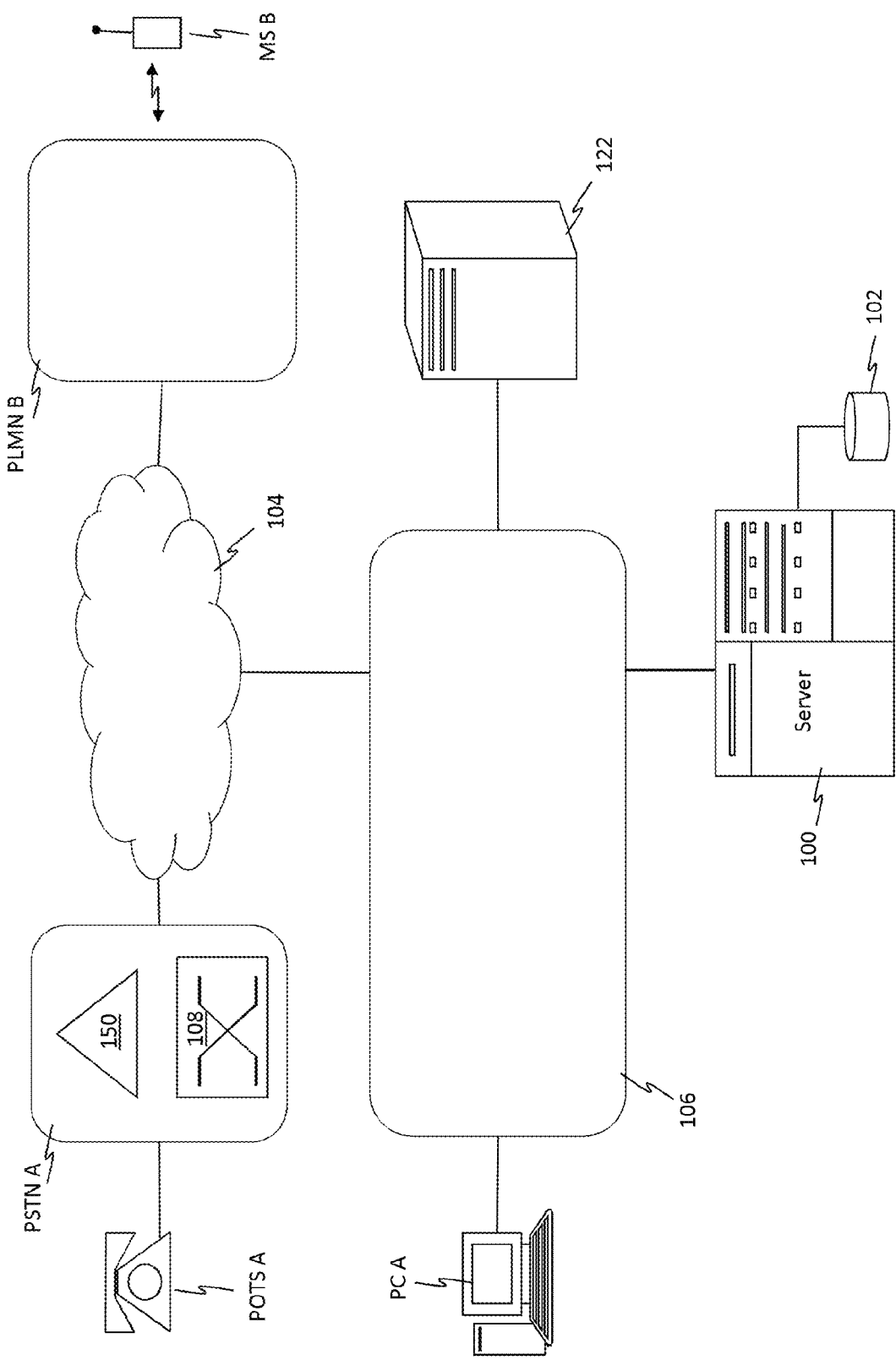
FIG. 12 is a system diagram according to embodiments.

FIG. 12 is a system diagram showing a data communications network according to embodiments. FIG. 12 includes some entities similarly depicted and labeled to FIG. 4, with such entities functioning in a similar manner. In addition, the system of FIG. 12 includes an authorization server 122 connected to packet network 106 at which authorization for use of copyrighted electronic content can be requested and granted. The electronic content could comprise software components such as applications and plug-ins, or media data such as music, videos, etc.

Figure 13:
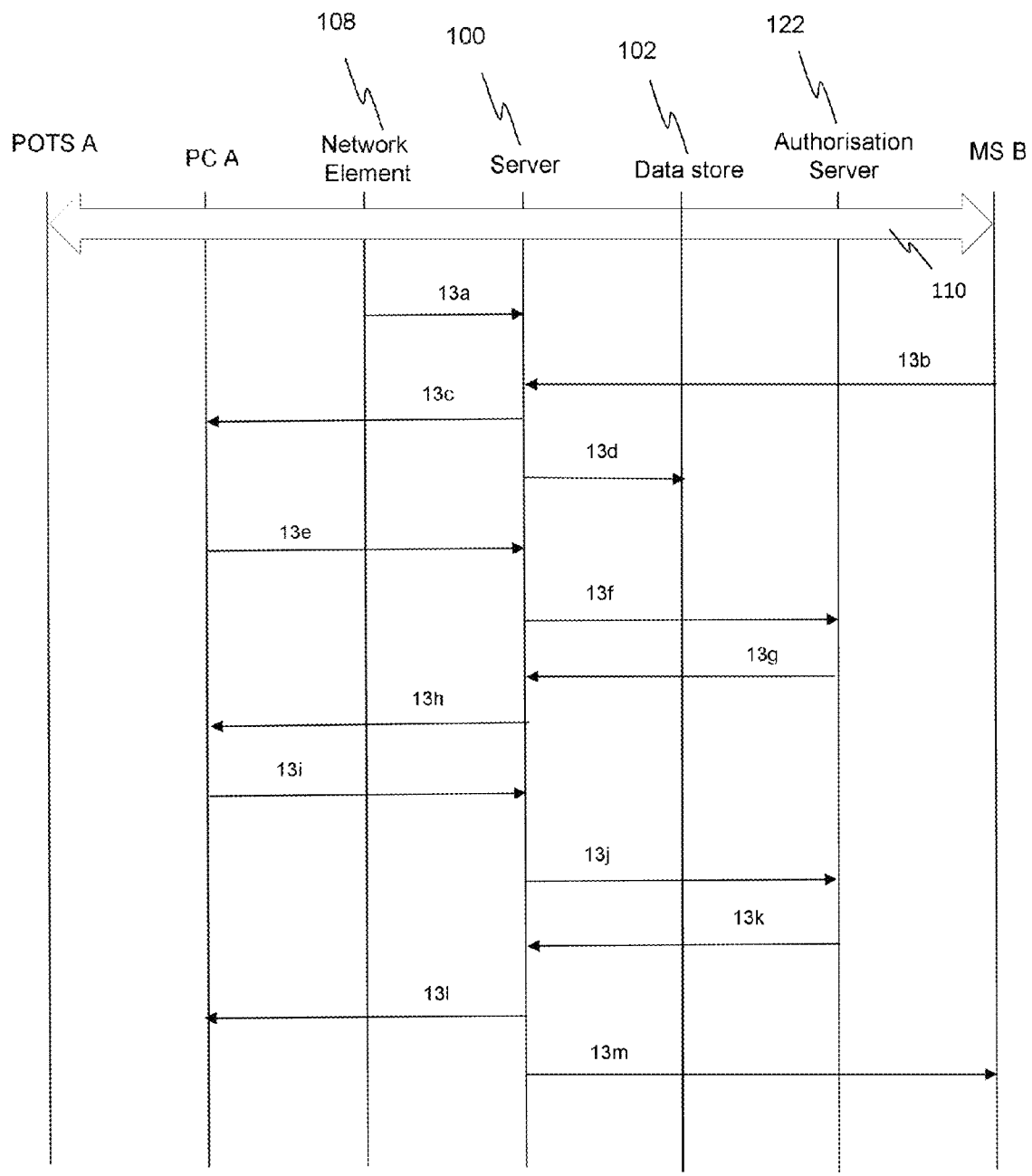
FIG. 13 is a flow diagram depicting operation of embodiments using the system of FIG. 12.

FIG. 13 is a flow diagram depicting operation of embodiments, for example implemented in a system depicted in FIG. 12. Similarly to FIG. 5 described above, a voice call is currently in progress between POTS A in PSTN A and MS B in PLMN B, as shown by item 110.

Similarly to steps 5a to 5d described above in relation to FIG. 5, steps 13a to 13d of FIG. 13 depict detection of a voice call between POTS A and MS B by network element 108 and notification of call party details for such to server 100, detection of the call between POTS A and MS B by MS B and notification of such to server 100, establishment of a separate communications session between PC A and MS B and notification of such to PC A, and updating of data store 102 accordingly.

In these embodiments, the user of POTS A and PC A, transmits from PC A an identifier identifying a feature of the communications session separate to the voice call between POTS A and MS B that requires authorization for use by MS B in step 13e. The feature could for example be a software component or media data and the identifier could be a URL or other network address at which the feature can be located.

Upon receipt of the feature identifier, server 100 transmits an authorization requirement query containing the feature identifier to authorization server 122 in step 13f. The authorization requirement query has the effect of asking the authorization server whether authorization for use of the identified feature by MS B in the separate communications session is required. Authorization server 122 performs any appropriate checks, for example with reference to a copyright records database (not shown), and transmits an authorization requirement response back to server 100 in step 13g. In this case, the authorization requirement response of step 13g indicates that authorization for use of the identified feature by MS B is required, for example "A copyright fee of $xx must be paid" for use of the identified feature in the separate communications session.

Server 100 now requests authorization from the user of PC A and POTS A to authorize the use of the identified feature by MS B in the separate communications session in step 13h, for example asking the user of POTS A and PC A whether they are willing to accept the $xx copyright charge. The user of POTS A and PC A accepts the charge by appropriate input via PC A which results in an indication of authorization being transmitted from PC A to server 100 in step 13i.

When server 100 receives the authorization indication of step 13i from PC A, server 100 enables the use of the feature by MS B in the separate communications session. Server 100 contacts authorization server 122 in step 13j requesting that authorization for the identified feature be granted. Server 122 responds to server 100 with an authorization grant in step 13k.

Granting authorization may involve authorization server contacting a payment server of an appropriate financial institution on behalf of the user device in question, for example to pay a copyright fee for use of the feature. The charge will generally be passed on to a an account associated with the user of POTS A and PC A because it is that user who is requesting use of the identified feature by the user of MS B in the separate communications session.

The user of PC A is informed that authorization of the feature has been granted by a message transmitted from server 100 to PC A in step 13l, for example including confirmation of the amount charged to their account.

Server 100 enables use of the feature for MS B by transmitting an identifier for the feature along with an authorization token proving that use of the feature by MS B has been authorized. The user of MS B can then download (not shown) or otherwise access the feature using the feature identifier and authorization token received from server 100 without having to request authorization (or pay for such). Download of the feature may involve contacting a content server such as item 120 in FIG. 9.

The authorization token may include a purchase token proving that a copyright fee or suchlike has already been paid for use of the feature.

In some embodiments, the feature may involve using a service application which requires authorization in order to process service data transmitted during the separate communications session. In alternative embodiments, the feature may involve accessing data which requires authorization in relation to which an identifier is transmitted during the separate communications session.

Figure 14:
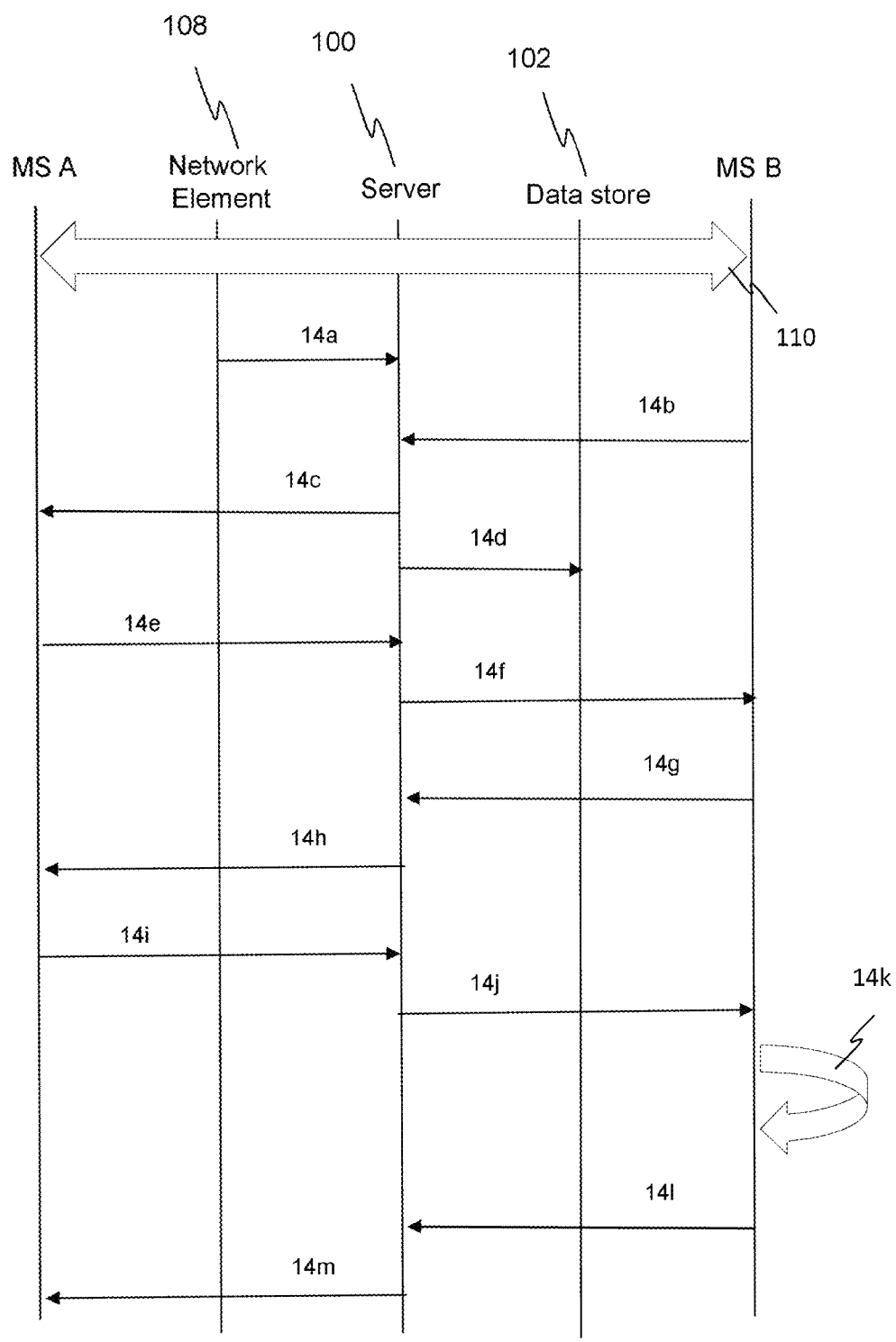
FIG. 14 is a flow diagram depicting operation of embodiments using the system of FIG. 12.

FIG. 14 is a flow diagram depicting operation of embodiments, for example implemented in a system depicted in FIG. 7. Similarly to FIG. 2 described above, a voice call is currently in progress between MS A in PLMN A and MS B in PLMN B, as shown by item 110. MS B and MS A include geographical location modules, such as Global Positioning System (GPS) modules, capable of receiving geographical location data based on the physical location of MS A and MS B respectively. MS A and MS B both have map creation applications for creating maps for display on MS A and MS B respectively.

FIG. 14 depicts embodiments where the geographical location of MS B is 'pulled' from MS B by MS A.

Network element 108 receives in-call signaling information for the call between MS A and MS B which triggers notification of call party details, including TDN A and TDN B, for the call to server 100 in step 14a.

Application software running on MS B detects the call in progress between MS B and MS A and notifies server 100 of call party details for the call, e.g. the TDNs of telephones involved in the call, TDN A associated with MS A and TDN B associated with MS B, in step 14b.

Server 100 identifies that the notification of step 14a from network element 108 and the notification of step 14b from MS B have call party details, TDN A and TDN B, in common and establishes a communications session, separate from the telephone call between MS A and MS B, for the communication of data between MS A and MS B. The separate communications session is established whilst the telephone call is in progress on the basis of the received call party details, e.g. TDN A and TDN B. Once the separate communications session is established, voice call data is transmitted via the telephone call and other data can be transmitted via the separate communications session.

Server 100 notifies MS A that a call has been detected between MS A and MS B and that a separate communications session has been established between MS A and MS B in step 14c.

Server 100 updates the records for MS A and MS B in data store 102 in step 14*d* to indicate that a call is in progress between MS A and MS B and that a separate communications session between MS A and MS B has been established.

In these embodiments, the user of MS A wishes to obtain geographical location data for MS B, for example to use in relation to a map creation application running on MS A. MS A transmits a geographical location capability check message to server 100 in step 14*e*; the capability check message is for checking the capability of MS B to provide geographical location data relating to its physical location, for example checking if MS B has a map creation application running on it.

Server 100 forwards the geographical location capability check message on to MS B in step 14*f*. Mobile station MS B responds by sending a geographical location capability response message to server 100 in step 14*g* which forwards this on to MS A in step 14*h*; the capability response message includes information as to whether MS B can provide geographical location data relating to its physical location.

In this embodiment, the capability response message informs MS A that MS B is able to provide geographical location data (by use of its geographical location module), so MS A transmits a request for geographical location data for MS B to server 100 in step 14*i*. Server 100 forwards the request from MS A to MS B in step 14*j*.

When MS B receives the request for geographical location data from server 100 in step 14*j*, MS B instructs its geographical location module to carry out a geographical location process and provide geographical location data relating to the physical location of MS B in step 14*k*. The geographical location data resulting from step 14*k* is transmitted to server 100 in step 14*l*. Server 100 then transmits data including or derived from the geographical location data received in step 14*l* to MS A in step 14*m*.

The map creation application of MS A can use the geographical location data received from server 100 in step 14*m* to create a map which incorporates a representation of the physical location of MS B. For example, the received geographical location data may include a grid reference or longitude and latitude parameters which can be processed by the map creation application to plot the location of MS B within a map stored or accessible by MS A. Such embodiments could for example be useful for the user of MS A to give directions to MS B verbally during the telephone call being conducted via MS A and MS B with reference to the created map and indication of the location of MS B thereon.

In embodiments, steps 14*i* to 14*m* are repeated, allowing display of a dynamically updating map on MS A that shows changes in the physical location of MS B as they happen. Alternatively, steps 14*k* to 14*m* can be repeated allowing updating of the map on MS A without further requests as per steps 14*i* and 14*j* being required.

In embodiments where MS B is not able to provide geographical location data, for example because MS B has no geographical location module or other such capability, the capability response message of step 14*g* will state so, thus informing MS A that communication of geographical location data from MS B is not possible. In alternative embodiments where MS B is not able to provide geographical location data, MS B may not send any capability response message, and after a predetermined period with no response being received, MS A might conclude that communication of geographical location data from MS B will not be possible.

In further alternative embodiments, the geographical location capability check message of step 14*e* can be combined with the request for geographical location data of step 14*i* and the geographical location capability response message of step 14*g* can be combined with the transmittal of geographical location data of step 14*l*.

Figure 15:
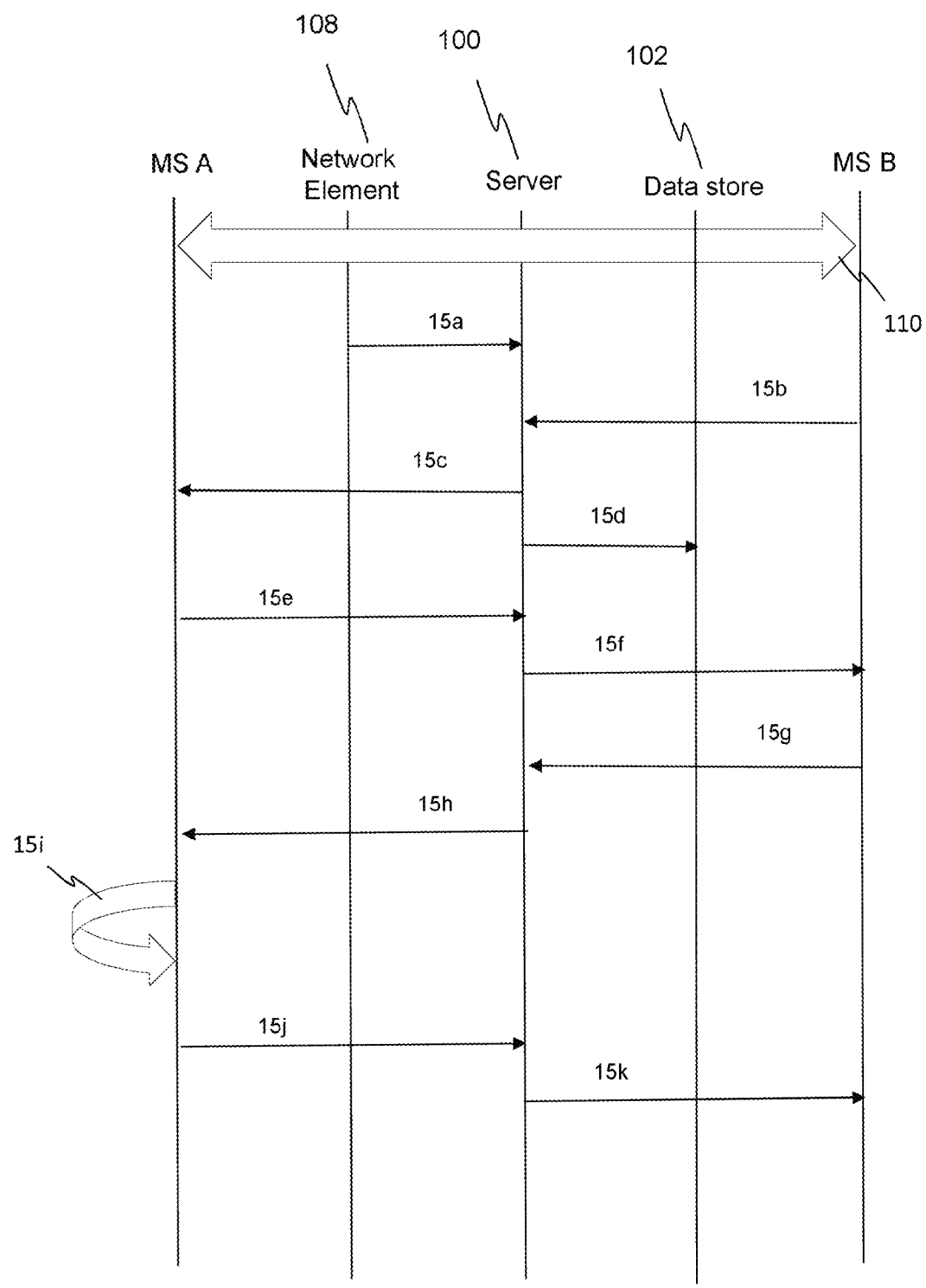
FIG. 15 is a flow diagram depicting operation of embodiments using the system of FIG. 12.

FIG. 15 is a flow diagram depicting operation of embodiments, for example implemented in a system depicted in FIG. 7. In FIG. 15, steps 15*a* to 15*d* occur in a similar manner as per steps 14*a* to 14*d* described above in relation to FIG. 14.

FIG. 15 depicts embodiments where the geographical location of MS A is 'pushed' from MS A to MS B.

In these embodiments, the user of MS A wishes to send geographical location data for MS A to MS B.

Embodiments involve MS A checking the capability of MS B to process and/or display geographical location data by transmitting a geographical location capability check message to server 100 in step 15*e*. Server 100 forwards the geographical location capability check message on to MS B in step 15*f*. Mobile station MS B responds by sending a geographical location capability response message to server 100 in step 15*g* which forwards this on to MS A in step 15*h*.

In this embodiment, the capability response message informs MS A that MS B is able to process geographical location data (by use of its map creation application), so the user of MS A triggers generation of appropriate geographical location data by appropriate input to the mapping application of MS A. Alternatively, generation of geographical location data could occur upon receipt of the capability response message of step 15*h* without any input from the user of MS A being required.

MS A instructs its geographical location module to carry out a geographical location process and provide geographical location data relating to the physical location of MS A in step 15*i*. The geographical location data resulting from step 15*i* is transmitted to server 100 in step 15*j*. Server 100 then transmits data including or derived from the geographical location data received in step 15*j* to MS B in step 15*k*.

The map creation application of MS B can use the geographical location data received from server 100 in step 15*k* to create a map which incorporates a representation of the physical location of MS A. Such embodiments could for example be useful for the user of MS B to give directions to the user of MS A verbally during the telephone call being conducted via MS A and MS B with reference to the created map and indication of the location of MS A thereon.

In embodiments, steps 15*i* to 15*k* can be repeated, allowing display of a dynamically updating map on MS B that depicts changes in the physical location of MS A as they occur.

In alternative embodiments, MS B has no map creation application for creating maps for display on MS B, but does have the capability to display images, such information being indicated in the location capability response message of step 15*g*. In such embodiments, the MS A itself plots a map containing a physical representation of its physical location and creates an map image (for example a screenshot from the map creation application) depicting this information for transmittal to MS B via server 100 in steps 15*j* and 15*k*; these steps would therefore involve transmittal of media (image) data. Upon receipt of the image data, MS B is able to display the image of the map created and provided by MS A, thus allowing the user of MS B to view a representation of the physical location of MS A even though MS B has no map creation capability itself.

In further alternative embodiments where MS B has no map creation application for creating maps for display on MS B, but does have the capability to display images, a network link, such as a URL, for an online mapping service such as Google Maps™ is transmitted to MS B. The network link contains information relating to the physical location of MS A and can be created by MS A and transmitted to server 100 for transmittal on to MS B, or can be derived from the geographical location data received from MS A by server 100 and transmitted on to MS B. When MS B receives the network link, it accesses the mapping service using the received network link. The mapping service uses the information in the network link relating to the physical location of MS A to generate a map image including a representation of the physical location of MS A and transmits the map image to MS B. Once MS B has downloaded the map image, it displays the map image to the user of MS B, thus allowing the user of MS B to view a representation of the physical location of MS A even though MS B has no map creation capability itself.

In embodiments, the geographical location data is received by server 100 in the form of a data object including geographical coordinate data. A capability check can then be carried out by server 100 in relation to whether the respective user device is capable of processing the geographical coordinate data during the separate communications session. If the capability check indicates that the respective user device is capable of processing the geographical coordinate data, server 100 will transmit the geographical coordinate data during the separate communications session.

Establishing the separate communication session may comprise receiving a client-server connection request from, and establishing a client-server connection with the appropriate user device, and transmitting the data including or derived from the received geographical location data via the client-server connection.

Embodiments described below in relation to FIGS. 16 to 21 involve establishing a communications session for communication of data between at least two devices in a data communications network. In these embodiments, one of the at least two devices comprises a telephony user device comprising a reconfigurable graphical user interface. Another of the at least two devices comprises a device associated with a service provider. The service provider also has one or more associated telephony devices.

Figure 16:
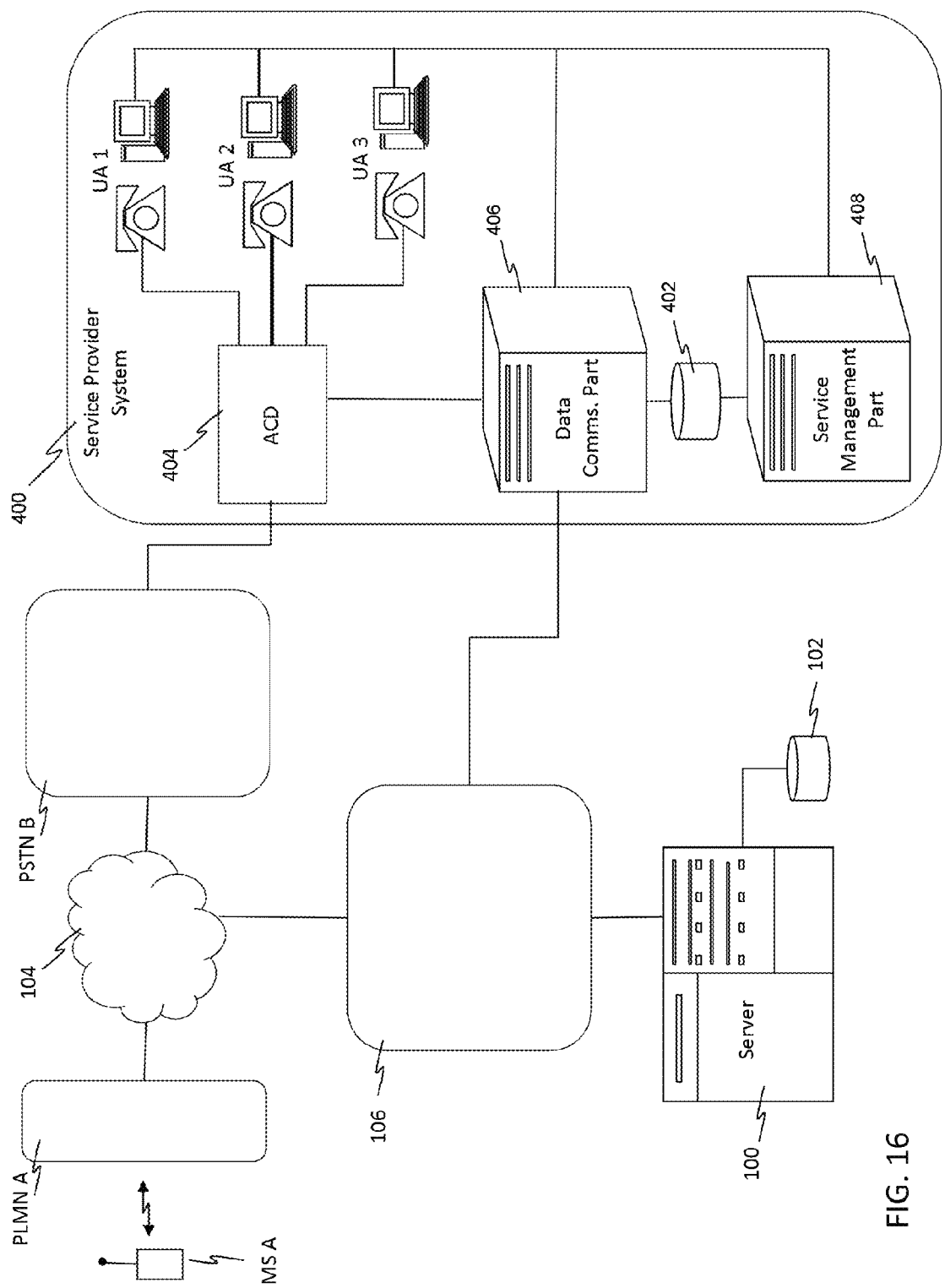
FIG. 16 is a system diagram according to embodiments.

FIG. 16 is a system diagram according to embodiments. Similarly, to FIG. 1, FIG. 16 includes mobile station MS A, PLMN A, telecommunications network 104, packet network 106, server 100 and data store 102. FIG. 16 also includes a PSTN B which functions in a similar manner to PSTN A as described above in relation to FIG. 4.

FIG. 16 also includes a service provider system 400 comprising an automatic call distributing system 404 (denoted 'ACD'), a data communications part 406, a service provider data store 402 and a service management part. Service provider system 400 also includes a number of user agent positions UA 1, UA 2, UA 3, with each user agent position comprising a user agent telephony device and a user agent computing device. Each user agent telephony device is connected to ACD 404. Each user agent computing device is connected to data communications part 406 via a Local Area network (LAN) or suchlike.

ACD 404 is capable of distributing incoming telephone calls to one or more user agents at which respective user agent operators are available. Incoming calls to the service provider system are distributed according to the availability of user agent operators at their associated user agent positions. When an incoming call from a customer is distributed to an available user agent position, a user agent operator associated with that user agent position can speak to the customer via their associated user agent telephony device and can process service data related to a service being provided to the customer via their associated computing device.

Data communications part 406 comprises a computing device such as a server with Computer Telephony Integration (CTI) capabilities. Data communications part 406 uses CTI techniques to provide user agent operators with information displayed via their associated user agent computing devices relating to calls they are conducting with customers. Data communications part 406 is capable of establishing and/or processing communication sessions between user agent computing devices and devices external to service provider system 400. Incoming data which data communications part 406 receives from an external device via a communication session can be passed on to the appropriate user agent computing device and vice versa for outgoing data from a user agent computing device.

Figure 17:
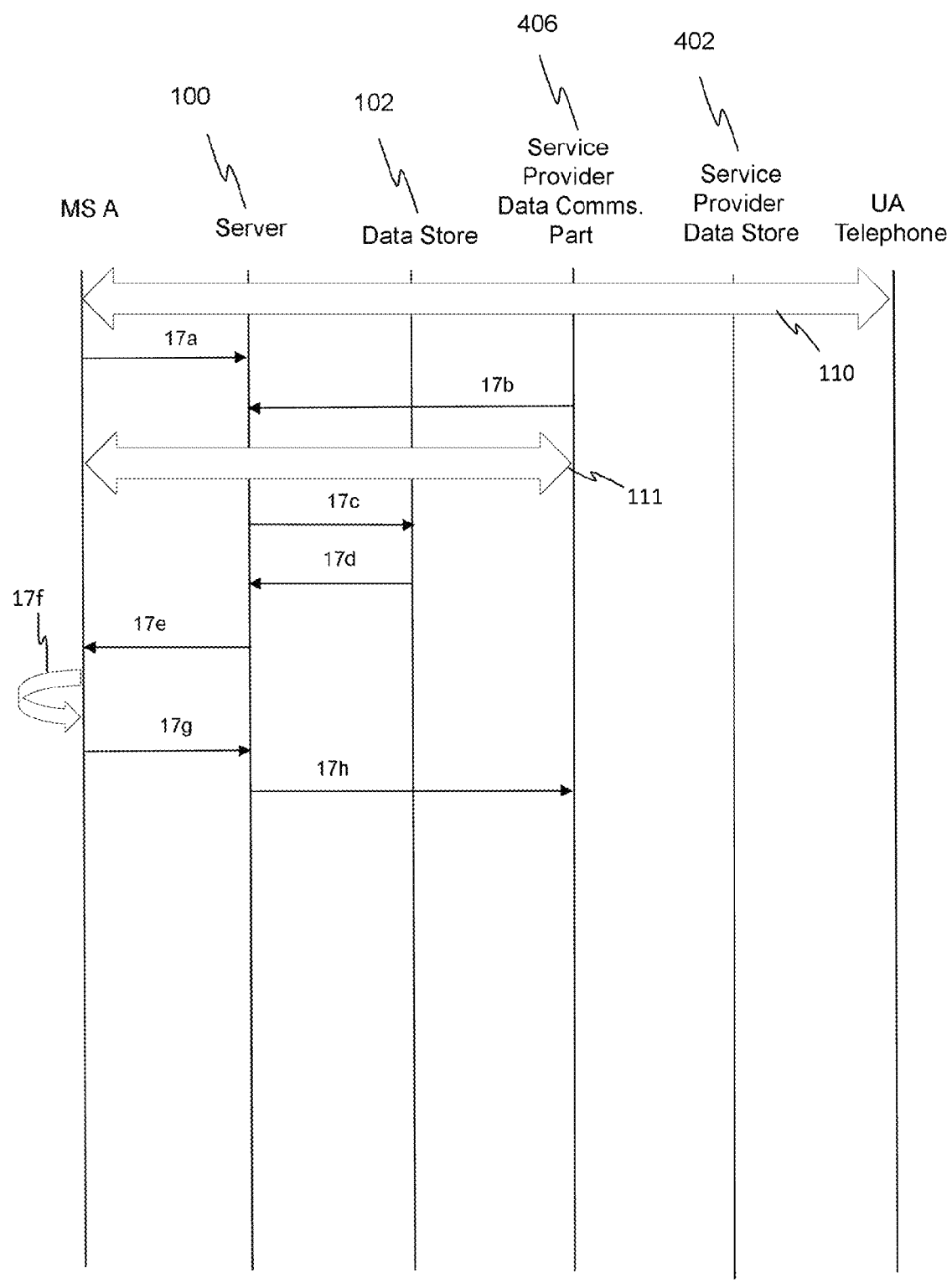
FIG. 17 is a flow diagram depicting operation of embodiments using the system of FIG. 16.

FIG. 17 is a flow diagram depicting operation of embodiments using the system of FIG. 16.

Telephony user device MS A is capable of establishing a communications session for communication of data with respect to at least one other device in a data communications network. MS A includes a reconfigurable graphical user interface.

The user of MS A dials the telephone dialing number associated with service provider system 400 which results in automatic call distributing system 404 receiving the incoming call. ACD 404 proceeds to identify an available user agent operator to take the incoming call. In these embodiments, the user of MS A is a customer of the service provider.

ACD 404 identifies that a user agent operator is available at a user agent position (for example agent position 'UA 1' depicted in FIG. 16) having an associated telephone (depicted 'UA Telephone' in FIG. 17) and computing device, and distributes the call to that UA Telephone accordingly. A voice call is thus established between MS A and UA Telephone, as shown by item 110.

Application software running on MS A detects that there is a call in progress between MS A and UA Telephone and notifies server 100 of call party details for the call, in step 17*a*. The call party details of step 17*a* may comprise a TDN associated with MS A and a TDN associated with service provider system 400.

ACD 404 notifies data communications part 406 that a call is in progress between UA Telephone and MS A. Data communications part 406 notifies server 100 of call party details for the call, in step 17*b*. The call party details of step 17*b* may comprise a TDN associated with MS A and a TDN associated with service provider system 400. The call party details of step 17*b* may also comprise an extension number associated with UA Telephone.

Server 100 establishes a separate communications session, separate from the telephone call between MS A and UA Telephone, for the transfer of data between MS A and data communications part 406, as shown by item 111. The session is established on the basis of the one or more call party details associated with the telephone call. Data communications part 406 forwards data received via the separate communication session to the computing device associated with the user agent operator of UA telephone and vice versa as and when necessary.

Upon establishment of the separate communications session, server 100 sends a request for configuration data determined by the service provider to data store 102 in step 17*c*, resulting in configuration data determined by the service provider being retrieved in step 17*d*. Server 100 transmits the retrieved configuration data to MS A via the separate communication session in step 17*e*.

When MS A receives the configuration data of step 17e, it reconfigures at least a first part of its graphical user interface according to the received configuration data, as shown by step 17f.

MS A confirms to server 100 that it has reconfigured at least a first part of its graphical user interface according to the received configuration data in step 17g and server 100 in turn notifies data communications part 406 of such in step 17h. Data communications part 406 notifies the appropriate user agent computing device of the reconfiguration such that the user agent operator conducting the telephone call with the user of MS A knows that the graphical user interface of MS A has been reconfigured according to the configuration data. The user agent operator can thus conduct the call accordingly, for example referring to information displayed via the reconfigured graphical user interface during the call.

In the above embodiments, the configuration data has been predetermined by the service provider prior to the call and provided to server 100 for storage in data store 102. Server 100 is thus able to retrieve the predetermined configuration data from data store 102 upon establishment of the separate communications session without having to contact service provider system 400.

Figure 18:
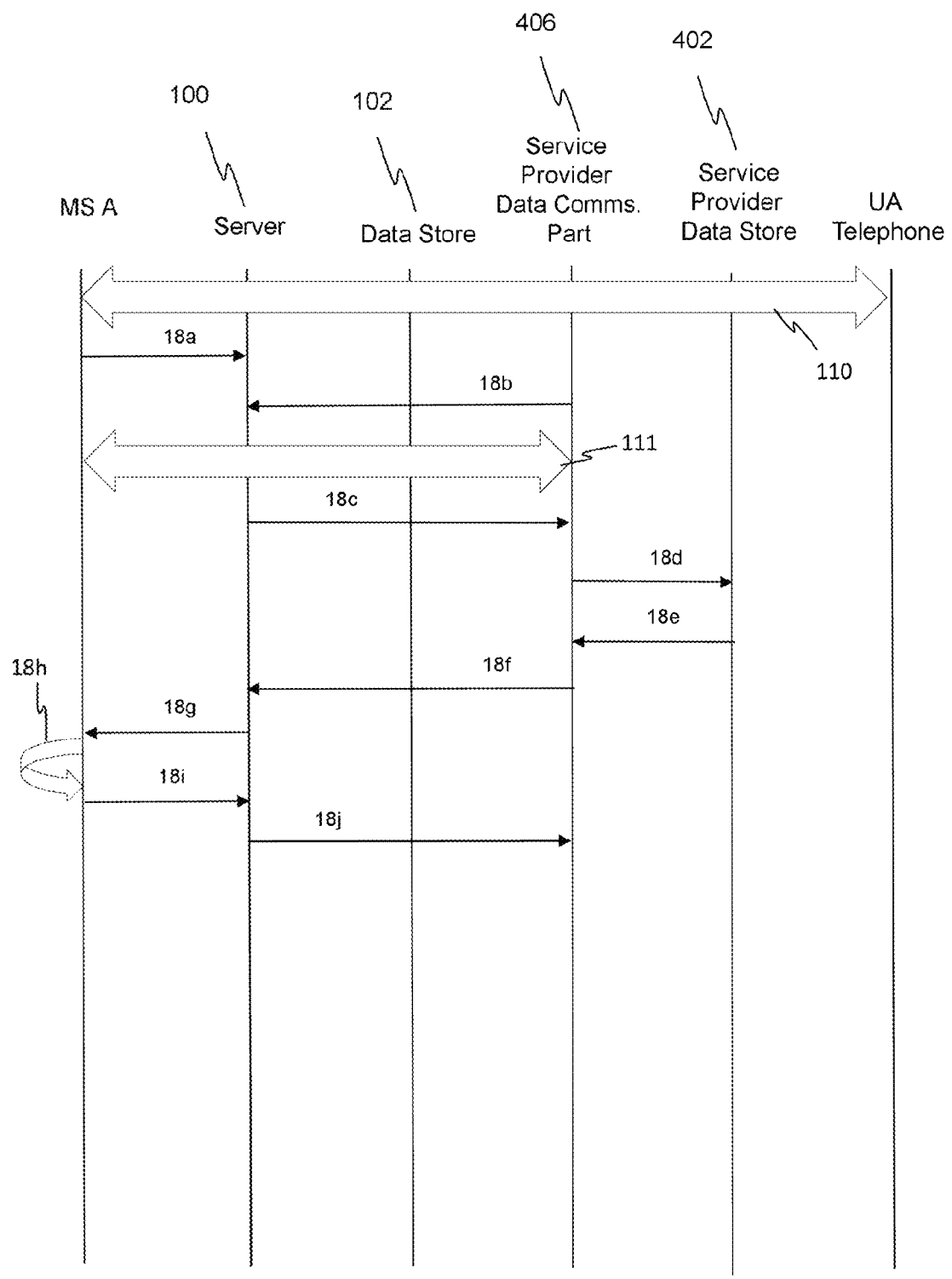
FIG. 18 is a flow diagram depicting operation of embodiments using the system of FIG. 16.

FIG. 18 is a flow diagram depicting operation of embodiments using the system of FIG. 16.

In these embodiments, the configuration data has been predetermined by the service provider prior to the call, but has not been provided to server 100. Instead, the predetermined configuration is stored in service provider data store 402.

Similarly to the embodiments of FIG. 17, a call is currently in progress between MS A and UA Telephone, as shown by item 110, MS A notifies server 100 of the call in progress in step 18a, data communications part 406 notifies server 100 of the call in progress in step 18b, and a separate communication session is established between MS A and data communications part 406 as shown by item 111.

In these embodiments, upon establishment of the separate communications session, server 100 sends a request for configuration data determined by the service provider (for transmittal to MS A) to data communications part 406 in step 18c. Data communications part 406 forwards the configuration data request to service provider data store 402 in step 18d. This results in configuration data determined by the service provider being retrieved by data communications part 406 in step 18e which forwards the retrieved configuration data to server 100 in step 18f.

Server 100 transmits the retrieved configuration data to MS A via the separate communication session in step 18g. When MS A receives the configuration data of step 18g, it reconfigures at least a first part of its graphical user interface according to the received configuration data, as shown by step 18h. MS A confirms to server 100 that it has reconfigured the at least first part of its graphical user interface according to the received configuration data in step 18i and server 100 in turn notifies data communications part 406 of such in step 18j.

Figure 19:
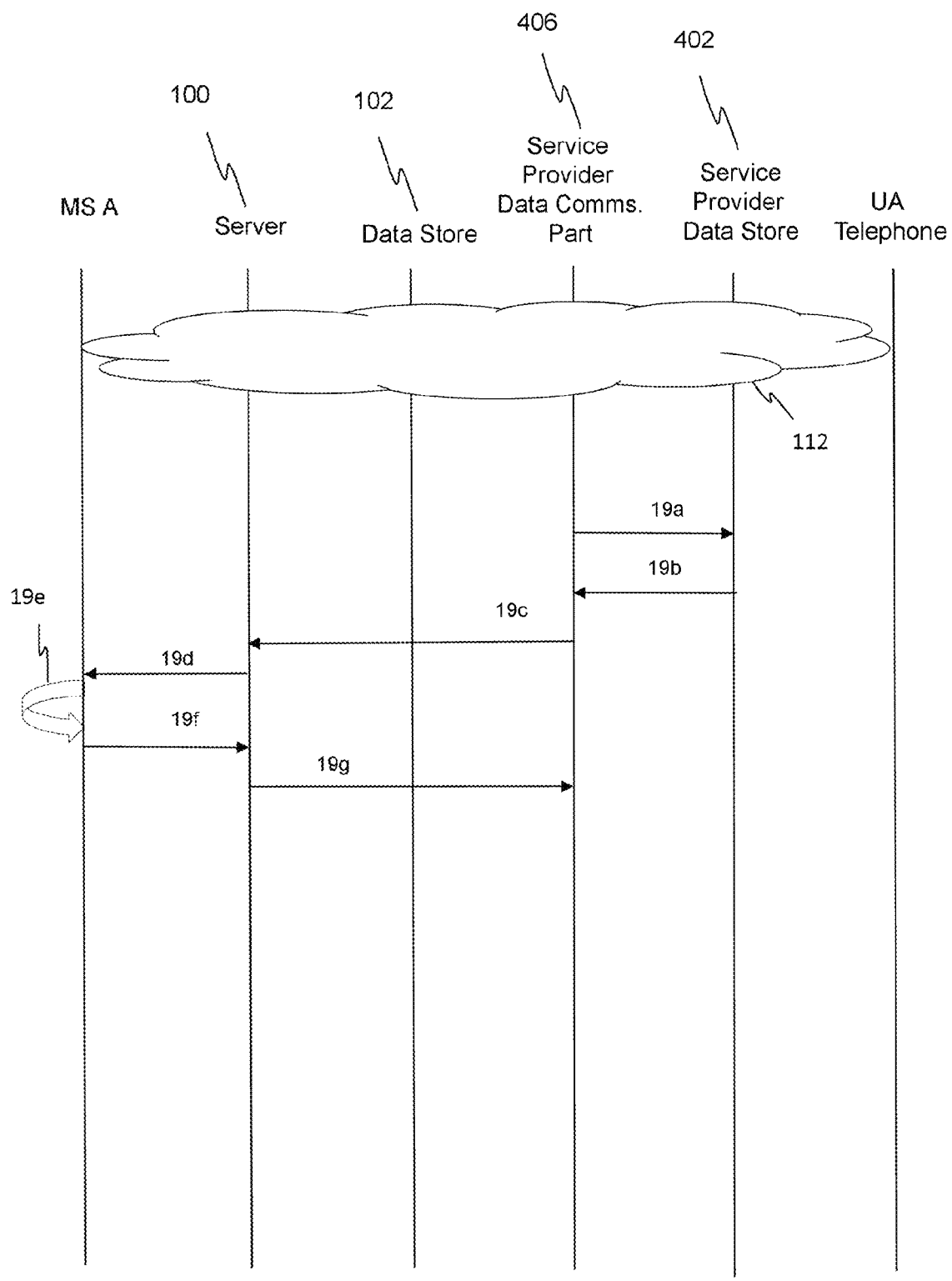
FIG. 19 is a flow diagram depicting operation of embodiments using the system of FIG. 16.

FIG. 19 is a flow diagram depicting operation of embodiments using the system of FIG. 16. These embodiments depict processes carried out either after those described above in relation to FIG. 17 or after those described above in relation to FIG. 18.

Item 112 of FIG. 19 indicates one or more steps involving interaction between MS A, server 100 and/or service provider computing device 406 during the call between the user of MS A and the user agent operator associated with UA Telephone. Some examples of such interaction are described later below.

During the call, the user agent operator associated with service provider computing device 406 realizes that further reconfiguration of the graphical user interface of MS A during the call, i.e. dynamic reconfiguration, is desirable and proceeds to initiate dynamic reconfiguration accordingly. This involves the user agent operator providing user input to their agent position computing device, for example selecting an appropriate action from an on-screen menu on a display part of the agent position computing device.

The user input is passed to data communications part 406 which sends a request for appropriate dynamic configuration data to service provider data store 402 accordingly in step 19a. The configuration data is dynamic because it is related to a reconfiguration process occurring during the call.

Dynamic configuration data is retrieved by data communications part 406 in step 19b which transmits the retrieved dynamic configuration data on to server 100 via the separate communication session in step 19c.

Server 100 transmits the dynamic configuration data received in step 19c to MS A via the separate communication session in step 19d. When MS A receives the dynamic configuration data of step 19d, it reconfigures at least a second part of its graphical user interface according to the received dynamic configuration data, as shown by step 19e. MS A confirms to server 100 that it has reconfigured the at least second part of its graphical user interface according to the received configuration data in step 19f and server 100 in turn notifies data communications part 406 of such in step 19g.

The user agent operator conducting the telephone call with the user of MS A now knows that the graphical user interface of MS A has been reconfigured according to the dynamic configuration data. The user agent operator can thus conduct the call accordingly, for example referring to information displayed via the dynamically reconfigured graphical user interface during the call.

Figure 20:
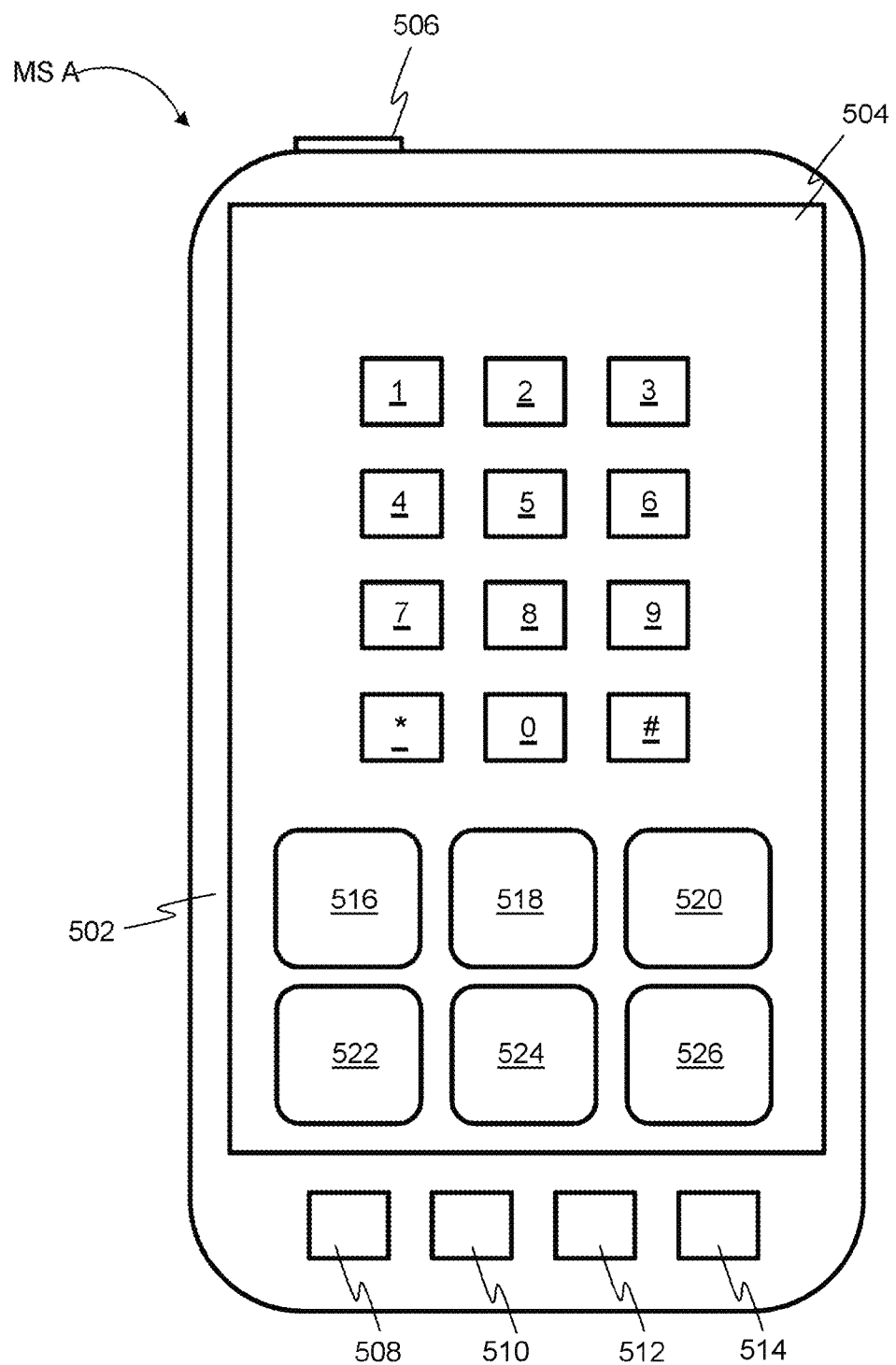
FIG. 20 shows a front view of a mobile telephony device according to embodiments.

FIG. 20 shows a front view of a mobile telephony device MS A according to embodiments. In FIG. 20, MS A comprises an example mobile telephony device, although embodiments may equally be applied to a non-mobile computing device and/or other computing device with telephony capabilities. MS A can comprise a variety of different hand-held devices, for example a smartphone, Personal Digital Assistant (PDA) or Personal Pocket Computer (PCC). MS A comprises memory storage and one or more processors (not shown) for data processing purposes including implementation of an operating system, for example an Android™, Symbian™, Blackberry™ or Windows Phone™ operating system. The operating system provides a platform for execution of application software (or 'applications' or 'apps') for allowing a user to perform different tasks on MS A. The application software may be installed during manufacture or may be downloaded and installed by a user of MS A.

MS A comprises a body 502, hard-wired input keys 508, 510, 512, 514 and a power on/off button 506. MS A comprises a touch-screen user interface 504 which is operable to output a graphics display and receive input via user touches on the interface. Hard-wired input keys 508, 510, 512, 514 may be operable to execute common operations such as 'Open menu', 'Go to home screen', 'Go back to last screen', etc. Alternatively, one or more hard-wired input keys 508, 510, 512, 514 may be implemented as soft keys on touch-screen 504.

MS A supports a variety of different communication methods including telephony functionality enabling a user to conduct incoming and outgoing telephone calls with one or more remote users in a telecommunications network (not shown). MS A comprises a number of components (not shown) which are known in the art, the operation of which is not described here in detail, including one or more radio frequency transceiver(s) and aerial(s), a speech coder/decoder connected to a loudspeaker and a microphone, and, in some embodiments, a removable Subscriber Identity Module (SIM) connected via electrical contacts.

MS A includes data transfer capabilities, including data packet input/output via a data input-output interface with one or more Internet Protocol (IP) parts of the telecommunications network. MS A may include messaging functionality, for example Short Message Service (SMS) and Multimedia Messaging Service (MMS) messaging.

In these embodiments, the user of MS A is currently conducting a call with a user agent operator of service provider system 400 as described above in relation to FIGS. 16 to 19. An in-call screen application is thus configured to display an in-call screen on touch-screen user interface 504. The in-call screen displayed on touch-screen user interface 504 includes a number of soft-keys which are responsive to user touches to provide input to the in-call screen application running on mobile telephony MS A. The soft-keys include dial-pad digits 1, 2, . . . to 0 and the * ('star') and # ('hash') symbols which are used for entering telephone dialing numbers. The soft-keys also include several other soft-keys 516, 518, 520, 522, 524, 526 which are operable to initiate other in-call functionality in response to user input, for example end-call, call-hold, mute, speaker-phone, and show/hide dial-pad operations.

Figure 21:
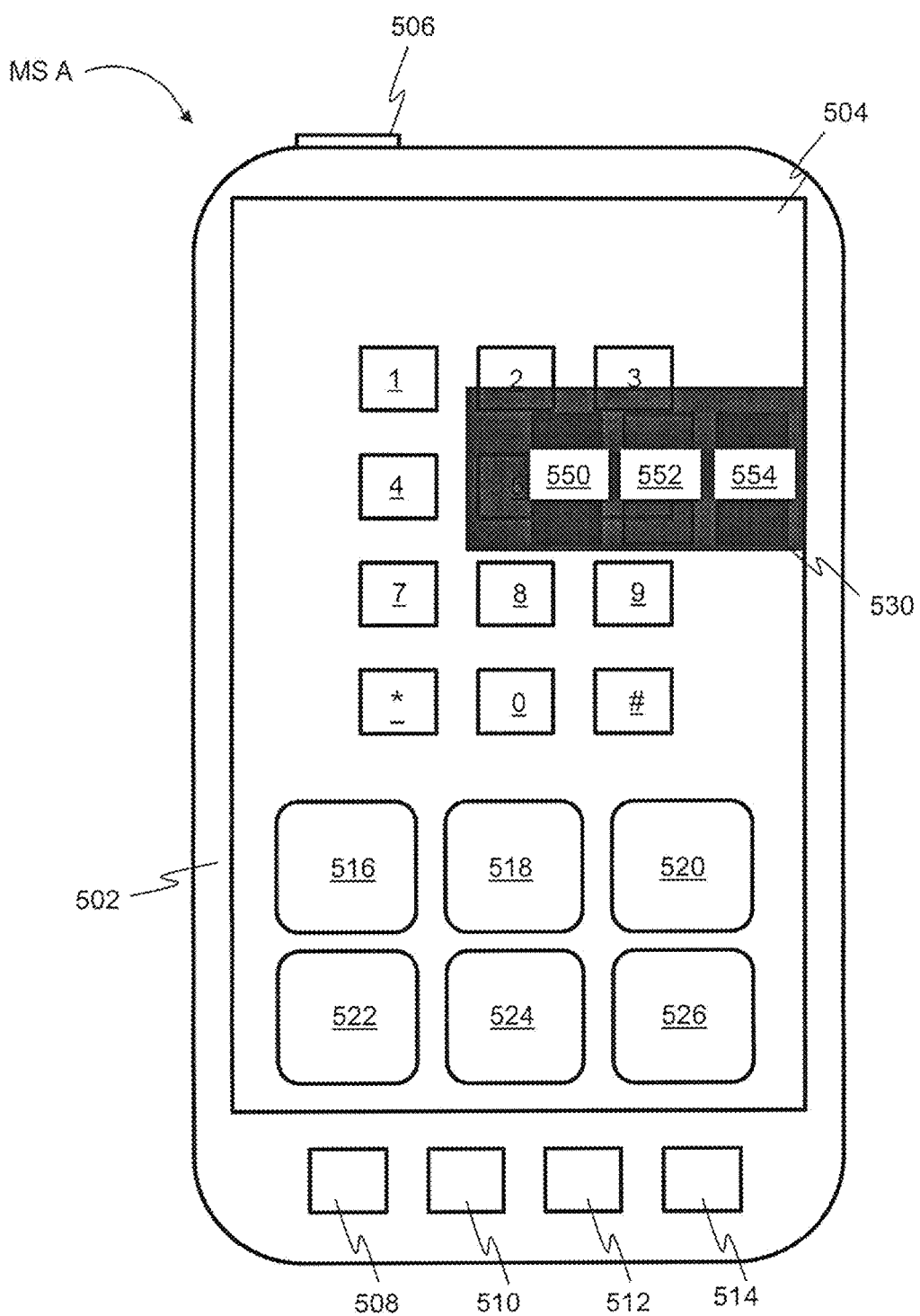
FIG. 21 shows a front view of a mobile telephony device according to embodiments.

FIG. 21 shows a front view of MS A according to embodiments. In these embodiments, the user of MS A is currently conducting a call with a user agent operator of service provider system 400 as described above in relation to item 110 of FIG. 17 or 18. Similarly, a separate communications session has been established between MS A and service provider data communications part 406 as per item 111 of FIG. 17 or 27.

In these embodiments, configuration data determined by the service provider prior to the call has been received by MS A via the separate communication session, as per steps 17c to 17e of FIG. 17 or steps 18c to 18g of FIG. 18. MS A reconfigures at least a first part of its touch-screen user interface 504 according to the received predetermined configuration data, as depicted by step 17f of FIG. 17 or step 18h of FIG. 18.

In these embodiments, the reconfiguration results in an overlay portion being displayed over the at least first part of the screen as shown by item 530 in FIG. 21. In these embodiments, overlay portion 530 comprises a translucent layer such that the portion of the screen below overlay portion 530 is visible through overlay portion 530. In this case, the soft-keys for digits '5' and '6' on the dial-pad part of the in-call screen can be seen through translucent overlay portion 530.

In these embodiments, overlay portion 530 comprises several touch-sensitive screen regions 550, 552, 554 which are operable to initiate one or more operations of MS A independently of the in-call screen application in response to user input via touch-sensitive screen regions 550, 552, 554. This means that user input via any of touch-sensitive screen regions 550, 552, 554 will be passed to other application software of MS A rather than to the in-call screen application displaying the in-call screen below the overlay portion, e.g. pressing touch-sensitive screen region 550 will not provide a user input of the dial-pad digits '5' or '6' to the in-call screen application, but rather will be passed to other application software of MS A for processing.

Embodiments therefore allow other tasks to be initiated on MS A which do not involve sending data associated with user input, such as in-band Dual-Tone Multi-Frequency (DTMF) tones, via the telephone call being conducted between MS A and the UA Telephone.

Embodiments therefore allow other tasks to be initiated on MS A which do not involve sending data associated with user input via the communication session established between MS A and data communications part 406.

Figure 22:
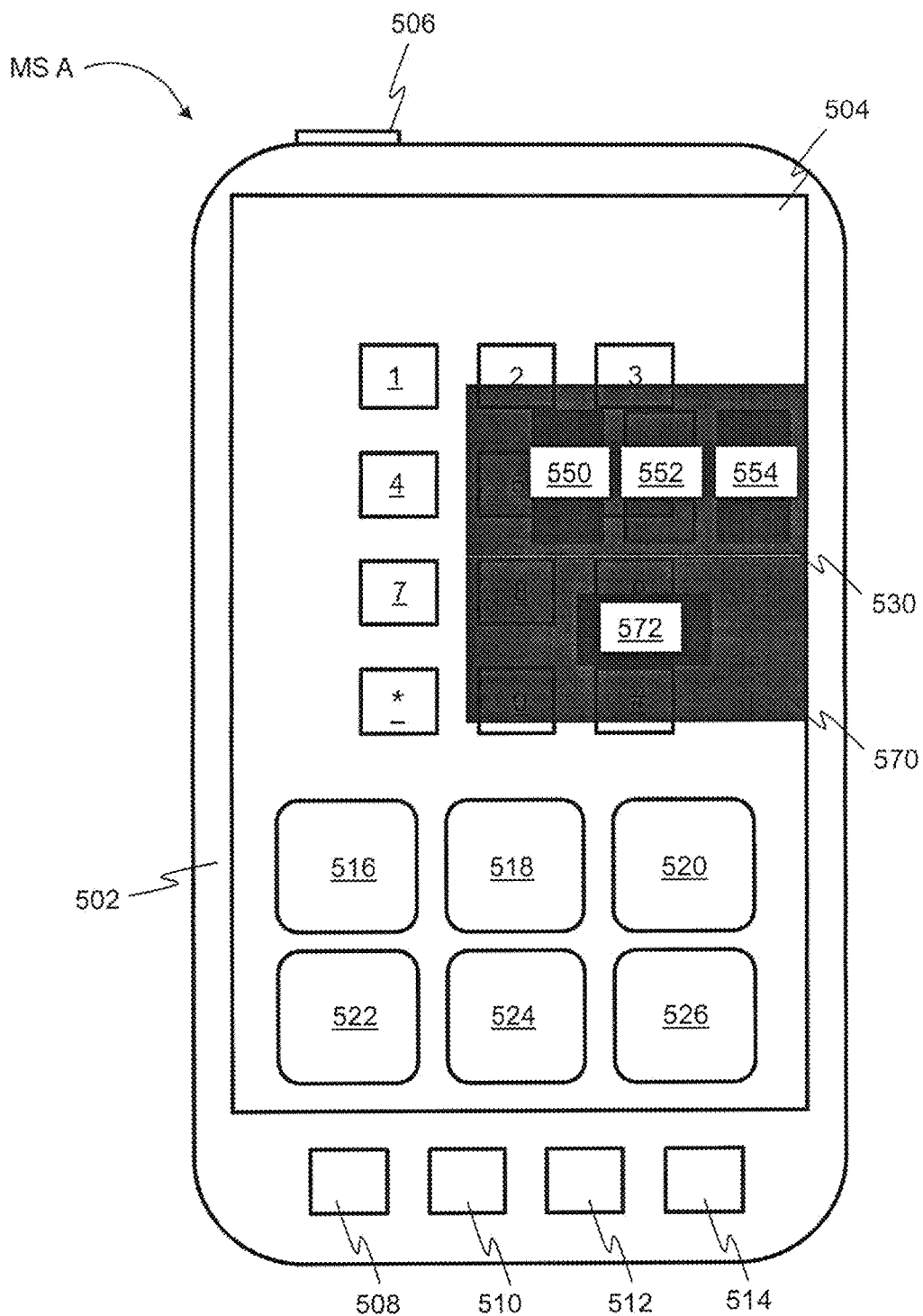
FIG. 22 shows a front view of a mobile telephony device according to embodiments.

FIG. 22 shows a front view of MS A according to embodiments. In these embodiments, the user of MS A is currently conducting the same call with the user agent operator of service provider system 400 as described above in relation to FIG. 21. Similarly, the separate communications session established between MS A and service provider data communications part 406 is in place.

In these embodiments, dynamic configuration data has been received by MS A via the separate communication session, as per steps 19a to 19d of FIG. 19. MS A reconfigures at least a second part of its touch-screen user interface 504 according to the received dynamic configuration data, as depicted by step 17f of FIG. 17 or step 18h of FIG. 18.

In these embodiments, the reconfiguration results in a further overlay portion being displayed over the at least second part of the screen as shown by item 570 in FIG. 22. In these embodiments, overlay portion 570 comprises a translucent layer such that the portion of the screen below overlay portion 570 is visible through overlay portion 570. In this case, the soft-keys for digits '8' and '9' on the dial-pad part of the in-call screen can be seen through translucent overlay portion 570.

In these embodiments, overlay portion 570 comprises a further touch-sensitive screen region 572 which is operable to initiate one or more operations of MS A independently of the in-call screen application in response to user input via touch-sensitive screen region 572. This means that user input via touch-sensitive screen region 572 will be passed to other application software of MS A rather than to the in-call screen application displaying the in-call screen below the overlay portion, e.g. pressing touch-sensitive screen region 572 will not provide a user input of the dial-pad digit '9' to the in-call screen application, but rather will be passed to other application software of MS A for processing.

Embodiments therefore allow other tasks to be initiated on MS A which do not involve sending data associated with user input via the telephone call being conducted between MS A and the UA Telephone.

Embodiments therefore allow other tasks to be initiated on MS A which do not involve sending data associated with user input via the communication session established between MS A and data communications part 406.

In embodiments, touch-screen user interface 504 will be reconfigured to display touch-sensitive screen regions 550, 552, 554 upon establishment of the separate communication session. However, touch-screen user interface 504 may not be reconfigured to display touch-sensitive screen region 572 until some time later during the call between the user of MS A and the user agent operator of service provider system 400.

To help draw the attention of the user of MS A to the fact that reconfiguration of touch-screen user interface 504 to display touch-sensitive screen region 572 has occurred, the at least first part 530 of touch-screen user interface 504 can display touch-sensitive screen regions 550, 552, 554 in a first display mode and the at least second part 570 of touch-screen user interface can display touch-sensitive screen region 572 in a second display mode. The different display modes allow a user of MS A to more easily distinguish between the different touch-sensitive screen regions.

The second display mode could involve displaying touch-sensitive screen region 572 as a flashing icon, whereas the first display mode could involve displaying touch-sensitive screen regions 550, 552, 554 as non-flashing icons. Alternatively, the second display mode could involve displaying touch-sensitive screen region 572 as a wobbling icon, whereas the first display mode could involve displaying touch-sensitive screen regions 550, 552, 554 as still icons.

In the embodiments described above in relation to FIGS. 20 to 22, predetermined configuration data is transmitted to MS A in order to reconfigure at least a first part of its touch-screen user interface. The reconfiguration results in one or more touch-sensitive screen regions being added to the screen in the form of a number of icons or 'buttons'. The user of MS A can touch the on-screen icons in order to initiate a variety of tasks associated with the service being provided by the service provider. The icons thus function as items of a menu from which the user of MS A can select actions of their choosing.

These embodiments also involve dynamic configuration data being generated and transmitted to MS A in order to reconfigure at least a second part of its touch-screen user interface such that one or more additional touch-sensitive screen regions are added to the screen in the form of a number of additional icons or 'buttons'. The additional icons thus function as additional items in the menu. Embodiments therefore provide processes by which the list of menu items can be expanded or otherwise modified. Embodiments therefore allow dynamic updating of the menu according to events which occur during the call between the user of MS A and the user agent operator of the service provider.

In the embodiments described above in relation to FIGS. 16 to 22, configuration data can include positional data defining one or more positions or locations within touch-screen user interface 504 at which the touch-sensitive screen regions should be configured. The configuration data can also include image data relating to the appearance of an icon, for example an icon containing a logo associated with the service provider and text data helping clarify what function(s) the icon is associated with.

In the embodiments described above in relation to FIGS. 17 and 18, data communications part 406 notifies the call to UA Telephone in steps 17b and 18b respectively. In alternative embodiments, the call may instead be notified to server 100 by one or more network entities located in PSTN B in a similar manner to the notification processes described above for network element 108 and SCP 150.

Embodiments involve a service provider system 400 capable of establishing a communications session for communication of data with respect to at least a first telephony user device MS A in a data communications network, the system comprising:

a service management part 408 adapted to manage service data for the service provider;

a service data store 402 adapted to store the service data;

a telephony part 'UA Telephone' adapted to conduct a telephone call with a customer of the service provider via the at least first telephony user device MS A; and a data communications part 406 adapted to:

establish a separate communications session, separate from the telephone call, for the transfer of data to/from the first telephony user device, on the basis of one or more call party details associated with the telephone call; and retrieve service data from the service data store and transmit data including or derived from the retrieved service data via the session.

The retrieved service data may be retrieved from data store 402 and data including or derived from the retrieved service data transmitted by the data communications part in response to establishment of the session.

The data communications part may retrieve and transmit the data including or derived from the service data in response to data input via a user agent computing device part associated with the user agent operator conducting the call with the user of MS A.

In embodiments data communications part 406 may modify the retrieved service data from the service data store before transmittal via the session. The modification could be carried out on the basis of data input via the user agent computing device part. Alternatively, or in addition, the modification could be carried out on the basis of data received via the session, for example data received from MS A and/or server 100.

The data including or derived from the retrieved service data could be transmitted to MS A in the form of predetermined configuration data via the separate communication session as described above in relation to FIGS. 17 and 18.

The data including or derived from the retrieved service data could be transmitted to MS A in the form of dynamic configuration data via the separate communication session as described above in relation to FIG. 19.

Some example applications of embodiments described above in relation to FIGS. 16 to 22 are now given. The example applications involve a call between a user of MS A and a user agent operator in a service provider system. A separate communications session is established between MS A, data communications part 406 and a user agent computing device associated with the user agent operator. The example applications also include some example interactions as per item 112 depicted in FIG. 19.

In a first example application, the service provider is providing a taxi service and the service provider system has received a call from the user of MS A which is distributed to a user agent telephony device associated with the user agent operator accordingly. In such embodiments, the service provider will typically want to obtain some information on the physical location of MS A such that the service provider knows where to send a taxi to meet the user of MS A. In such an embodiment, the service provider has predetermined configuration data which, upon establishment of the separate communication session, is transmitted to MS A. The predetermined configuration data instructs MS A to reconfigure its touch-screen user interface with a touch-sensitive screen region in an at least first part of the screen.

The touch-sensitive screen region is operable to initiate generation of geographical location data associated with the physical location of MS A and transmit data including or derived from the generated geographical location data via the separate communication session. The touch-sensitive screen region could for example comprise an icon labeled 'Send location'.

During the call, the user agent operator can thus ask the user of MS A to press the 'Send location' icon which results in the physical location of MS A being generated and transmitted from MS A to data communications part 406. Embodiments thus provide a convenient way for the service provider to obtain the location of the user of MS A without having to ask the user for address information verbally over the telephone and also avoids the user agent operator from having to enter in such information into the service provider system via a user agent computing device.

Once the location data is received at the user agent computing device, the user agent operator can process a taxi-booking for the user of MS A based on the received location data. The user agent operator may request retrieval of appropriate service data from service provider data store 402 by appropriate input via the agent position computing device. In this case, the retrieved service data could comprise service data including a taxi number for the booking and also service data associated with a live Estimated Time of Arrival (ETA) service for the booked taxi.

The retrieved service data is then modified on the basis of the location data received from MS A and transmitted as dynamic configuration data to MS A via the separate communication session. Upon receipt of the dynamic configuration data at MS A, the touch-screen user interface of MS A can be reconfigured accordingly. The reconfiguration may involve configuration of a further touch-sensitive screen region in an at least second part of the screen.

The further touch-sensitive screen region could be operable to initiate navigation via a browser application to a network address (such as an IP address or URL) associated with provision of the live ETA service, for example a network address of data communications part 406. The further touch-sensitive screen region could for example comprise an icon labeled 'Press for Live taxi ETA service'.

During the call, the user agent operator can thus ask the user of MS A to press the 'Press for Live taxi ETA service' icon which results in a browser application on MS A opening a webpage displaying information on a live ETA for their booked taxi.

In a second example application, the service provider is providing a restaurant table booking service and the service provider system has received a call from the user of MS A which is distributed to a telephony user device associated with a user agent operator accordingly. In such embodiments, the service provider will typically want to obtain contacts details for the user of MS A, for example in order to know which name to book the table under and/or an email address to send a table booking confirmation email to.

In these embodiments, the service provider has predetermined configuration data which, upon establishment of the separate communication session, is transmitted to MS A. The predetermined configuration data instructs MS A to reconfigure its touch-screen user interface with a touch-sensitive screen region in an at least first part of the screen. The touch-sensitive screen region is operable to initiate transmittal of contact data associated with a user of MS A via said session, for example by obtaining such details from address book application data stored on MS A. The touch-sensitive screen region could for example comprise an icon labeled 'Send contact details' or 'Send vCard'.

During the call, the user agent operator can thus ask the user of MS A to press the 'Send contact details' icon which results in contact details for the user of MS A being transmitted from MS A to data communications part 406. Embodiments thus provide a convenient way for the service provider to obtain the contact details of the user of MS A without having to ask the user for the contact details verbally over the telephone and also avoids the user agent operator from having to enter in such information into the service provider system via a user agent computing device.

Once the contact details for the user of MA A are received at the user agent computing device, the user agent operator can process a table booking for the user of MS A based on the received contact details. The user agent operator may initiate retrieval of appropriate service data from service provider data store 402. In this case, the retrieved service data could comprise service data relating to a representation of available tables in the restaurant at which the user of MS A wishes to book a table.

The retrieved service data can then be transmitted as dynamic configuration data to MS A via the separate communication session. Upon receipt of the dynamic configuration data at MS A, the touch-screen user interface of MS A can be reconfigured accordingly. The reconfiguration may involve configuration of a further touch-sensitive screen region in an at least second part of the screen.

The further touch-sensitive screen region could be operable to initiate navigation via a browser application to a network address associated with provision of a table choosing service, for example a network address of data communications part 406. The further touch-sensitive screen region could for example comprise an icon labeled 'Press to choose your table'.

During the call, the user agent operator can thus ask the user of MS A to press the 'Press to choose table' icon which results in a browser application on MS A opening a webpage which allows the user of MS A to see the layout of the restaurant and select a table of their choosing.

Service providers responsible for processing emergency calls could employ a combination of the above two example applications of embodiments in order to reconfigure a part of the touch-screen user interface which is operable to initiate transmittal of both geographical location data associated with the physical location of MS A and contact details such as name, national insurance number etc., to data communications part 406. Allowing a user to transmit their location and contact details to the emergency call processing service provider at the click of one icon could save valuable time associated with an ambulance or fire engine reaching the location of an accident or fire.

Customers of a breakdown recovery service provider could similarly benefit from such functionality.

In a third example application, the service provider is providing a ticket purchasing service, for example music concert or cinema tickets, and the service provider system has received a call from the user of MS A which is distributed to a telephony user device associated with a user agent operator accordingly. In such embodiments, the service provider will typically want to obtain contact details of the user of MS A and a payment for the tickets from the user of MS. In such an embodiment, the service provider has predetermined configuration data which, upon establishment of the separate communication session, is transmitted to MS A. The predetermined configuration data instructs MS A to reconfigure its touch-screen user interface with one or more touch-sensitive screen regions in an at least first part of the screen.

One touch-sensitive screen region could comprise an icon labeled Pay for tickets'. The touch-sensitive screen region is operable to initiate processing of a transaction from an account associated with a user of said first telephony user device via said session. The region may extract payment details from a data store of MS A and contact a secure payment server in packet network 106 at which the appropriate funds can be deducted from the user's credit card or PayPal™ account or suchlike.

Another touch-sensitive screen region could comprise an icon labeled 'Send contact details', the functioning of which has been described above.

During the call, the user agent operator can thus ask the user of MS A to press the Pay for tickets' which results in payment for the tickets being processed and notified to data communications part 406 and press the 'Send contact details' which results in contact details for the user of MS A being transmitted from MS A to data communications part 406. Alternatively, a single icon could be configured to provide both functions.

Embodiments thus provide a convenient way for the service provider to obtain the payment and contact details from the user of MS A without having to verbally ask the user for such over the telephone and also avoids the user agent operator from having to enter in such information into the service provider system via a user agent computing device.

Once the payment has been processed, confirmation of such is notified at the user agent computing device, and the user agent operator can process posting of the tickets to the user of MS A using an address contained in the received contact details.

The user agent operator may initiate retrieval of appropriate service data from service provider data store 402. In this case, the retrieved service data could comprise service data relating to the electronic tickets for the ticket purchase.

The retrieved service data can then be modified on the basis of the contact detail data, for example an email address, received from MS A and transmitted as dynamic configuration data to MS A via the separate communication session. Upon receipt of the dynamic configuration data at MS A, the touch-screen user interface of MS A can be reconfigured accordingly. The reconfiguration may involve configuration of a further touch-sensitive screen region in an at least second part of the screen.

The further touch-sensitive screen region could be operable to initiate emailing of electronic tickets to an email address contained in the contact details received via the session. The further touch-sensitive screen region could for example comprise an icon labeled 'Press to be emailed tickets'.

The further touch-sensitive screen region could be operable to initiate transmittal via an SMS message of electronic tickets to a phone number contained in the contact details received via the session. The further touch-sensitive screen region could for example comprise an icon labeled 'Press to receive tickets by SMS'.

The service provider associated with the above described third example application, could also benefit from seat choosing functionality which allows a customer to select which seats in the appropriate event venue they would like. The seat choosing functionality could function in a similar manner as described above in relation to the second example application via transmittal of dynamic configuration data to MS A. Alternatively, the seat choosing functionality could be configured via transmittal of predetermined configuration data to MS A.

In a fourth example application, the service provider is a retail vendor selling one or more products or services. In such an application, an image of a product the user of MS A is considering purchasing can be transmitted to MS A and displayed on the screen of MS A. Dynamic configuration data can be generated by data communications part 406 and transmitted to MS A in order to reconfigure the touch-screen user interface of MS A to display a touch-sensitive screen region related to the purchase of the product in an at least second part of the screen. The further touch-sensitive screen region could for example comprise an icon labeled 'Buy me' which can be configured to be embedded into the displayed image of the product.

In a fifth example application, the service provider is a retail vendor selling one or more spare part products. The user of MS A transmits an image of a broken spare part which needs replacing to data communications part 406 via the separate communications session. MS A thus requests dynamic configuration data from data communications part 406.

The service provider can then select an appropriate part and generate dynamic configuration data to transmit to MS A to reconfigure its touch-screen user interface to display a 'Buy me' icon or suchlike. The dynamic configuration data may include an image of the spare part which the service provider is proposing that the user of MS A purchases, allowing the user of MS A to confirm visually that the spare part is the correct spare part.

In a sixth example application, when a user of MS A calls service provider system 400, instead of the call being distributed by ACD 404 to an available user agent operator, the user of MS A is directed to an IVR system with the aim of connecting the user to a suitable user agent operator. Such an Interactive Voice Response (IVR) system could prompt the user of MS A to navigate through a menu system using a series of digit key presses on the dialpad, for example "press '1' for technical support, press '2' for billing, etc." with the user having to wait and listen for each of the options for each stage of the menu system. Such IVR systems can be cumbersome and slow to use, so the dynamic reconfiguration functionality of embodiments can be employed to allow the user to be redirected to a web-based alternative.

In this example application, dynamic configuration data can be generated by data communications part 406 and transmitted to MS A in order to reconfigure the touch-screen user interface of MS A to display a touch-sensitive screen region related to redirection to a web alternative for an IVR in an at least second part of the screen. The touch-sensitive screen region could for example comprise an icon labeled 'Go to website alternative of IVR' icon. The icon is configured, upon user touch input on the icon, to initiate navigation via a browser application to a network address in the data communications network. The network address in this case directs the user to a web-based alternative to the standard voice-based IVR system. The web-based alternative allows a user to read the various options for each stage of the menu system on-screen and press digits accordingly. Navigation of the menu system according to embodiments will tend to be quicker than the user having to wait and listen for each of the options for each stage of a standard voice-based IVR menu system.

Embodiments involve multi-party conference calls between more than two user telephony devices. In such embodiments, a separate communication session is established between the more than two telephony devices and/or associated computing devices for the communication of data between devices associated with all parties of the conference call. Such embodiments can be implemented by allocation of a conference identifier to a multiparty call, for example by server 100. The conference identifier along with a conference call telephone dialing number can be circulated around the multiple call parties.

In some embodiments, server 100 includes conference call hosting functionality, in which case, the conference call telephone dialing number may comprise a telephone dialing number associated with a conference call hosting module within server 100. Alternatively, the conference call telephone dialing number may comprise a telephone dialing number associated with a dedicated conference call hosting entity within packet network 106.

Each conference call party will dial the conference call telephone dialing number and enter the conference identifier. The parties will thus be able to conduct a teleconference voice-call.

A separate communication session is then established between the user device of each party to the conference call and server 100. Each user device will connect to server 100 using a client-server connection request/response procedure. Each user will then enter in the conference identifier which allows server 100 to disambiguate which conference a device should be connected to. Once each device has established a separate communication session with server 100, any party to the conference call is able to transmit or receive data with any other party to the conference call. Data transmitted from one user device will pass to server 100 and can be replicated and distributed to other user devices party to the conference call accordingly by server 100. Server 100 may employ multicast techniques, such as IP multicast, to efficiently transfer data to multiple devices.

Voicemail is a useful tool that allows people calling a busy or otherwise unavailable telephone number to leave a message for the called party that they will be able to collect later. However, many callers would prefer to send a message such as a text message rather than leave a voicemail, because a text message is easier and quicker to receive, and it is less disruptive to read a text message than to call a voicemail service and pick up a call. Accordingly, when diverted to a voicemail service, many people hang up the phone and send a text message instead.

Embodiments described below in relation to FIGS. 23 to 26 provide convenient methods by which a calling party who is trying to speak to a user of a called party device is given the option to send a message to the called party as an alternative to leaving a voicemail for the called party. Other embodiments described below in relation to FIGS. 23 to 26 provide convenient methods by which a calling party who is trying to speak to a user of a called party device is given the option to send media data such as one or more files for subsequent retrieval by the called party as an alternative to leaving a voicemail for the called party.

Figure 23:
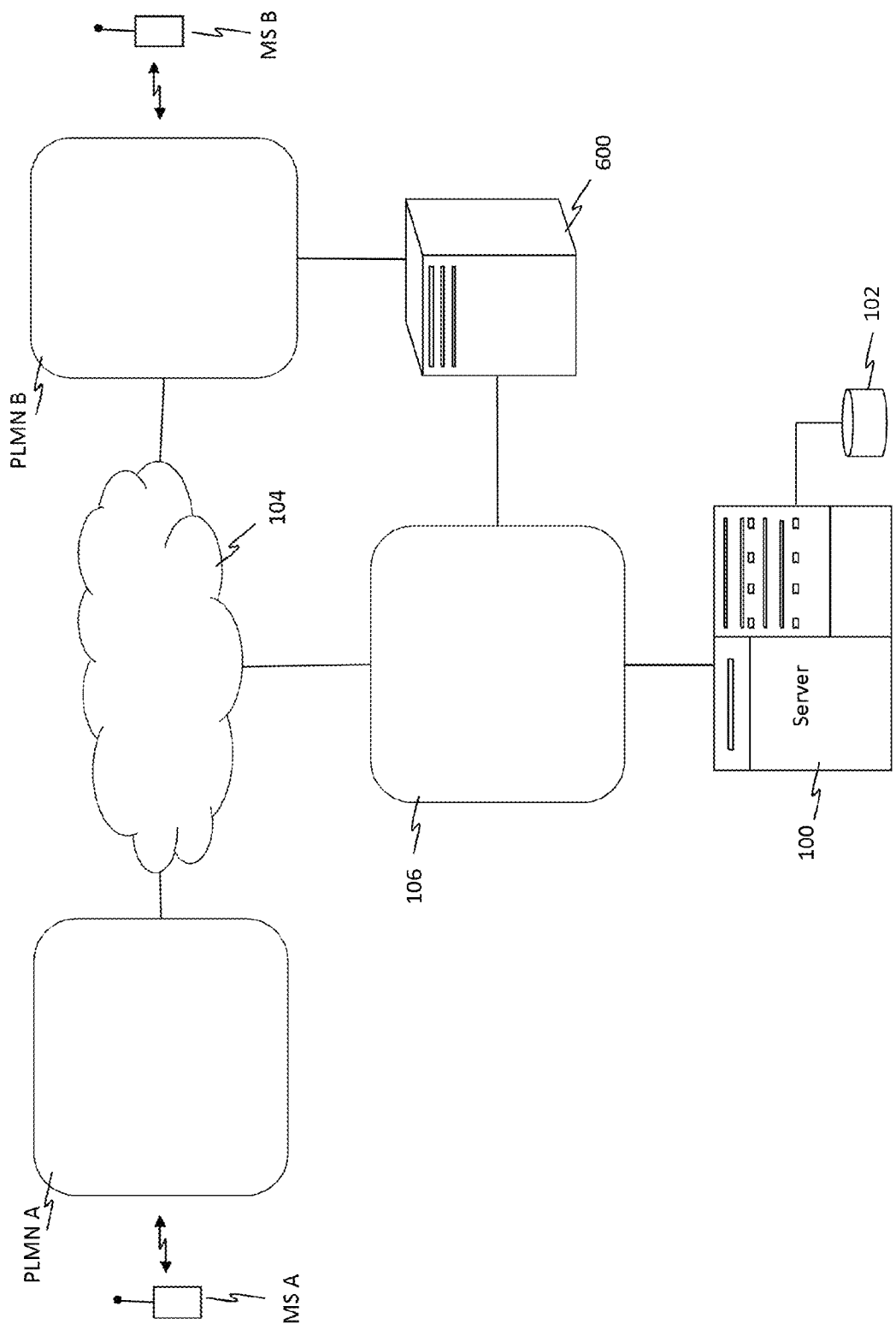
FIG. 23 is a system diagram according to embodiments.

FIG. 23 is a system diagram according to embodiments. FIG. 23 includes some entities similarly depicted and labeled to FIG. 1, with such entities functioning in a similar manner. In addition, the system of FIG. 23 includes an automated system 600 connected to packet network 106 and/or PLMN B.

Automated system 600 could for example comprise a voicemail system.

Figure 24:
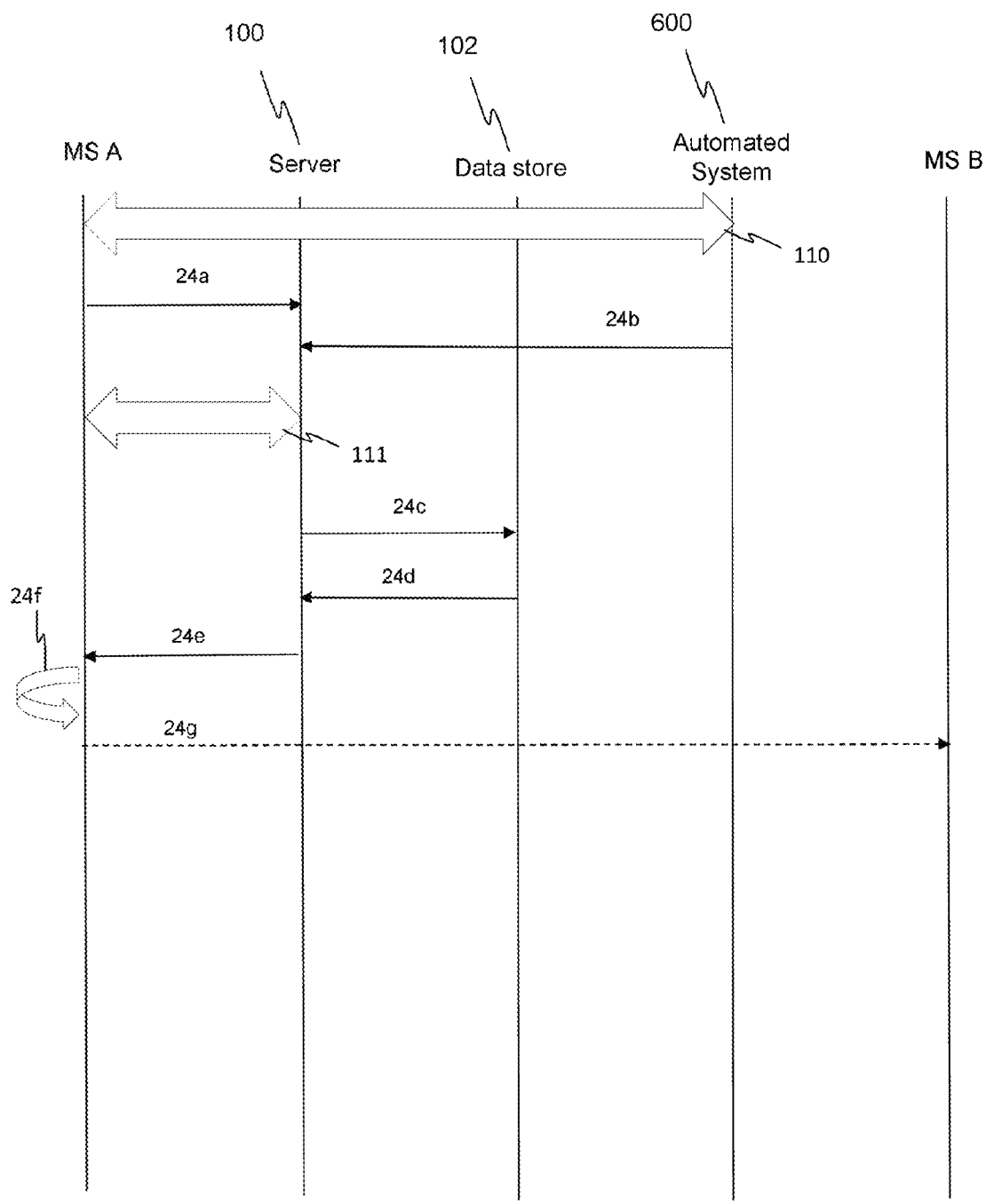
FIG. 24 is a flow diagram depicting operation of embodiments using the system of FIG. 23.

FIG. 24 is a flow diagram depicting operation of embodiments using the system of FIG. 23. In these embodiments, MS A comprises a reconfigurable graphical user interface.

The user of MS A attempts to call MS B, but the call attempt is unsuccessful. The call attempt might have failed for a number of reasons, for example the user of MS B did not want to or could not answer the call, MS B is currently switched off, etc. The call is therefore redirected to an automated system 600 and a call between MS A and automated system 600 is established, as shown by item 110.

A voice call is currently in progress between MS A and automated system 600, as shown by item 110.

Under normal circumstances, automated system 600 may play an audio message such "Bob cannot take your call right now, please leave a message after the tone". The user of MS A may not want to leave a voicemail message, so might hang up. However, according to embodiments, the user of MS A is given one or more options other than leaving a voicemail message.

Application software running on MS A detects that there is a call in progress between MS A and automated system 600 and notifies server 100 of call party details for the call, in step 24*a*.

The call party details may comprise a TDN A associated with MS A and TDN B associated with MS B. The call party details may comprise an identifier associated with automated system 600.

Automated system 600 detects the call in progress between itself and MS A and notifies server 100 of call party details for the call, in step 24*b*.

Server 100 identifies that the notification of step 24*a* from MS A and notification of step 24*b* from automated system 600 have call party details in common and establishes a separate communications session, separate from the telephone call, for the communication of data between MS A and server 100, as shown by item 111. The separate communications session is established on the basis of the received call party details.

Server 100 retrieves configuration data from data store 102 in steps 24*c* and 24*d* and transmits the configuration data on to MS A via the separate communications session in step 24*e*.

The configuration data indicates that the telephone call is with an automated system, in this case automated system 600. MS A therefore knows that the call is with an automated system and reconfigures at least a part of the graphical user interface in accordance with the configuration data received via the separate communication session.

In these embodiments, the reconfigurable graphical user interface of MS A comprises a touch-screen user interface and the reconfiguration comprises configuring one or more touch-sensitive screen regions in the at least part of the touch-screen user interface. The one or more touch-sensitive screen regions are operable to initiate one or more operations of MS A in response to user input via the one or more touch-sensitive screen regions.

In some embodiments, one of the touch-sensitive regions is operable to open a messaging application on MS A and instruct the messaging application to create a new message. The touch-sensitive region may be displayed in the form of an icon with accompanying text, for example 'Send message to called party'.

When the user of MS A presses the touch-sensitive region, a messaging application on MS A is initiated and a new message window is open. The messaging application may for example comprise a Short Message Service (SMS) application, a Multimedia Message Service (MMS) application, or an email application.

The user of MS A can then type text into the body field of the message. Once the user of MS A has finished typing in the message, the user presses a send key or similar and the message is transmitted to MS B in step 24*g*.

In embodiments, one of the one or more touch-sensitive regions is further operable to insert an identity associated with the intended recipient user device into a destination field of the new message. The user of MS A therefore does not need to enter in the required identity into the message.

The identity may comprise a telephony dialing number, an email address, or a Session Initiation Protocol Uniform Resource Identifier (SIP URI). The identity may be transmitted from the automated system as part of the configuration data, or retrieved from local storage on the device.

In some embodiments, the one or more touch-sensitive region is further operable to insert predetermined text into the body field of the new message. The predetermined text may for example include a commonly used text template such as 'Hi Bob, I tried to call you just now, but didn't get through. Please call me back when you are free'. The user of MS A therefore does not need to enter in the predetermined text. The predetermined text may be transmitted from the automated system as part of the configuration data, or retrieved from local storage on the device.

In other embodiments, one of the one or more touch-sensitive regions is operable to instruct said automated system to terminate said call. Hence, the user can choose not to send a message or leave a voicemail and end the call. Rather than ending the call using the telephony application on the user device, it may be more convenient for the user to initiate the termination of the call via one of the touch-sensitive regions, and this can be used to trigger the automated system to end the call on behalf of the user. In any case, in some operating systems, it may not be possible to cause the device itself to terminate the call from within an application. In such a scenario, a message, for example a SIP INFO message, instructing termination of the call can be transmitted to automated system 600 and the call can be terminated from the automated system 600.

In one embodiment, one of the one or more touch-sensitive regions is operable to instruct the automated system to initiate recordal of a voice message.

In embodiments, one of the one or more touch-sensitive regions is operable to instruct the voicemail system to initiate playback of a voice message. In embodiments, the voice message to be played back was recorded via the telephony user device (MS A); this function can therefore be used by the user who recorded the voice message (e.g. the user of MS A) to allow the user to listen to their message and check that it contains the correct information. In alternative embodiments, the message to be played back was previously recorded via a device other than the telephony user device which was used to record the voice message; this function can therefore be used by a user of another telephony user device (e.g. MS B) to retrieve the voice message from the voicemail system.

In embodiments, one of the one or more touch-sensitive regions is operable to instruct the voicemail system to initiate re-recordal of a voice message recorded via the telephony user device; this function can therefore be used by the user who recorded the voicemail to allow the user to re-record the voice message they previously left, for example because the original voice message contains incorrect or insufficient information than intended.

In embodiments, one of the one or more touch-sensitive regions is operable to instruct the voicemail system to initiate deletion of a voice message; this function can therefore be used by the user (e.g. the user of MS A) who recorded the voicemail to allow the user to delete the voice message they previously recorded. In alternative embodiments, the voice message to be deleted was previously recorded via a device other than the telephony user device; this function can therefore allow a user (e.g. the user of MS B) to delete a message (e.g. previously recorded by the user of MS A) after they have retrieved it from the voicemail system and listened to its contents.

In embodiments, one of the one or more touch-sensitive regions is operable to instruct the voicemail system to initiate a rewind operation during playback of a voice message previously recorded via a device other than the telephony user device. In embodiments, one of the one or more touch-sensitive regions is operable to instruct the voicemail system to initiate a fast-forward operation during playback of a voice message previously recorded via a device other than the telephony user device. In embodiments, one of the one or more touch-sensitive regions is operable to instruct the voicemail system to initiate a pause operation during playback of a voice message previously recorded via a device other than the telephony user device. Such functionality allows a user (e.g. the user of MS B) retrieving a voice message recorded by another user (e.g. the user of MS A) from the voicemail system to control the flow of playback of voice media during retrieval of the voice message from the voicemail system, for example to listen to an excerpt of the message more than once, for example to skip-through excerpts of the message without listening to them or stall the playback momentarily, etc.

Figure 25:
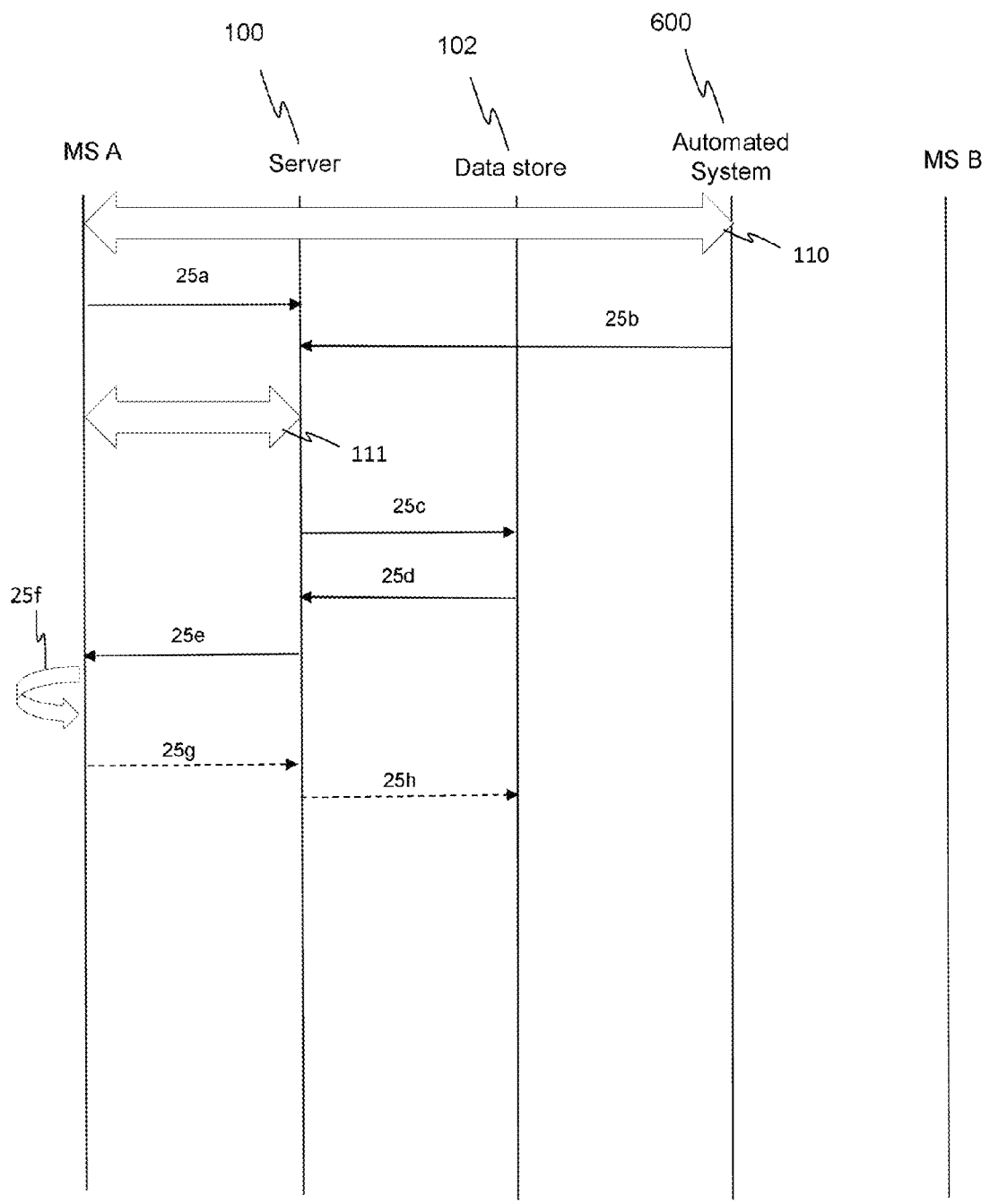
FIG. 25 is a flow diagram depicting operation of embodiments using the system of FIG. 23.

FIG. 25 is a flow diagram depicting operation of embodiments using the system of FIG. 23.

In these embodiments, instead of wanting to send a message to MS B, the user of MS A wishes to convey one or more files to MS B.

In these embodiments, steps 25*a* to 25*f* occur in a similar manner to steps 24*a* to 24*f* described above in relation to FIG. 24.

Server 100 receives call party details for a telephone call established between MS A and automated system 600. A separate communications session, separate from the telephone call, for the transfer of data to/from MS A is established, on the basis of one or more call party details associated with the telephone call. Sever 100 retrieves configuration data from data store 102 in steps 25*c* and 25*d* and transmits the configuration data to MS A in step 25*e*.

The configuration data instructs MS A to reconfigure at least a part of its graphical user interface as shown in step 25*f*.

In some embodiments the at least part is configured to include a touch-sensitive region which is operable to open a file browsing application on MS A. The user of MS A can thus select one or more files by appropriate user input to the file browsing application. The one or more selected files are then transmitted to server 100 via the separate communication session in step 25*g* which stores the files in data store 102 in step 25*h*. The one or more files received via the session are stored in data store 102 in association with one or more call party details associated with the telephone call which enables the one or more files to be identified correctly for subsequent retrieval.

In embodiments, automated system 600 comprises a voicemail system. In the case that one party is not available, the caller will be diverted to the voicemail system of the callee and will not be able to share any media. Equally, when the callee picks up the voice message (or 'voicemail'), they cannot access any of the media the caller could have shared with them, had they actually had a telephone call and associated established communication session. However, embodiments described below provide advanced voice mailbox functionality such that in addition to containing audio, the capability to store different forms of content, for example a picture or details of a contact is also provided. A caller can thus in effect 'attach' media to a voice message and when a callee picks up the voice message, they can view the attached media.

In embodiments, server 100 receives notification from the voicemail system at the start of recordal of a voice message. Such notification informs server 100 that such has been received from a voicemail system rather than a telephony user device and server 100 establishes a communication session with the caller's telephony user device and reconfigures its user interface accordingly. Similarly, in embodiments, server 100 receives a notification from the voicemail system at the start of retrieval of a voice message informing server 100 that such has been received from a voicemail system rather than a telephony user device and server 100 establishes a communication session with the callee's telephony user device and reconfigures its user interface accordingly.

Once server 100 is notified of a call between a caller telephony user device during recordal of a voice message and the voicemail system and establishes a separate communication session with the caller's telephony user device, server 100 transmits appropriate configuration data to the caller's telephony user device to reconfigure its graphical user interface accordingly. Similarly, once server 100 is notified of a call between a callee telephony user device during retrieval of a previously recorded voice message from the voicemail system and establishes a separate communication session with the callee's telephony user device, server 100 transmits appropriate configuration data to the callee telephony user device to reconfigure its graphical user interface accordingly.

In alternative embodiments, instead of server 100 receiving notification from the voicemail system that recordal of a voice message has begun, server 100 only receives notification that the call in question has gone to voicemail. Server 100 then establishes a communication session with the caller telephony user device on the basis of the call party details received from the voicemail system. A similar process is carried out by server 100 during retrieval of a voice message by the callee telephony user device.

In embodiments, MS A receives user input selecting one or more files and transmits the one or more selected files via the session to server 100 whilst the user of MS A is recording a voice message at the voicemail system via a telephone call. The one or more files could comprise a variety of different media such as image data, video data, contact data, geographical location data, etc.

In embodiments, server 100 stores time-stamp data associated with at least one of the one or more files received from MS A in data store 102. In embodiments, the time-stamp data is stored in data store 102 in association with the one or more files and one or more call party details stored in data store 102.

In embodiments, the time-stamp data is associated with the time of transmittal of the one or more files from MS A. In embodiments, MS A transmits time stamp data via the session to server 100 during recordal of the voice message. In embodiments, the time stamp data is indicative of the time at which the one or more selected files are transmitted to server 100. In embodiments, MS A transmits the time stamp data to server 100 in conjunction with transmittal of the one or more files to server 100.

In embodiments, the time-stamp data relates to the time at which recordal of the voice message began at the voicemail system.

In embodiments, the time-stamp data is associated with the time of receipt of the one or more files at server 100. In embodiments, server 100 generates at least part of the time-stamp data upon receipt of the one or more files.

In other embodiments, the at least part is configured to include a touch-sensitive region which is operable to instruct a geographical location module application on the telephony user device to generate geographical location data relating to the physical location of the telephony user device and transmit data including or derived from the generated geographical location data via the session. Such embodiments could for example, allow the user of MS A to send in image file in the form of a map containing their current location to the user of B.

Figure 26:
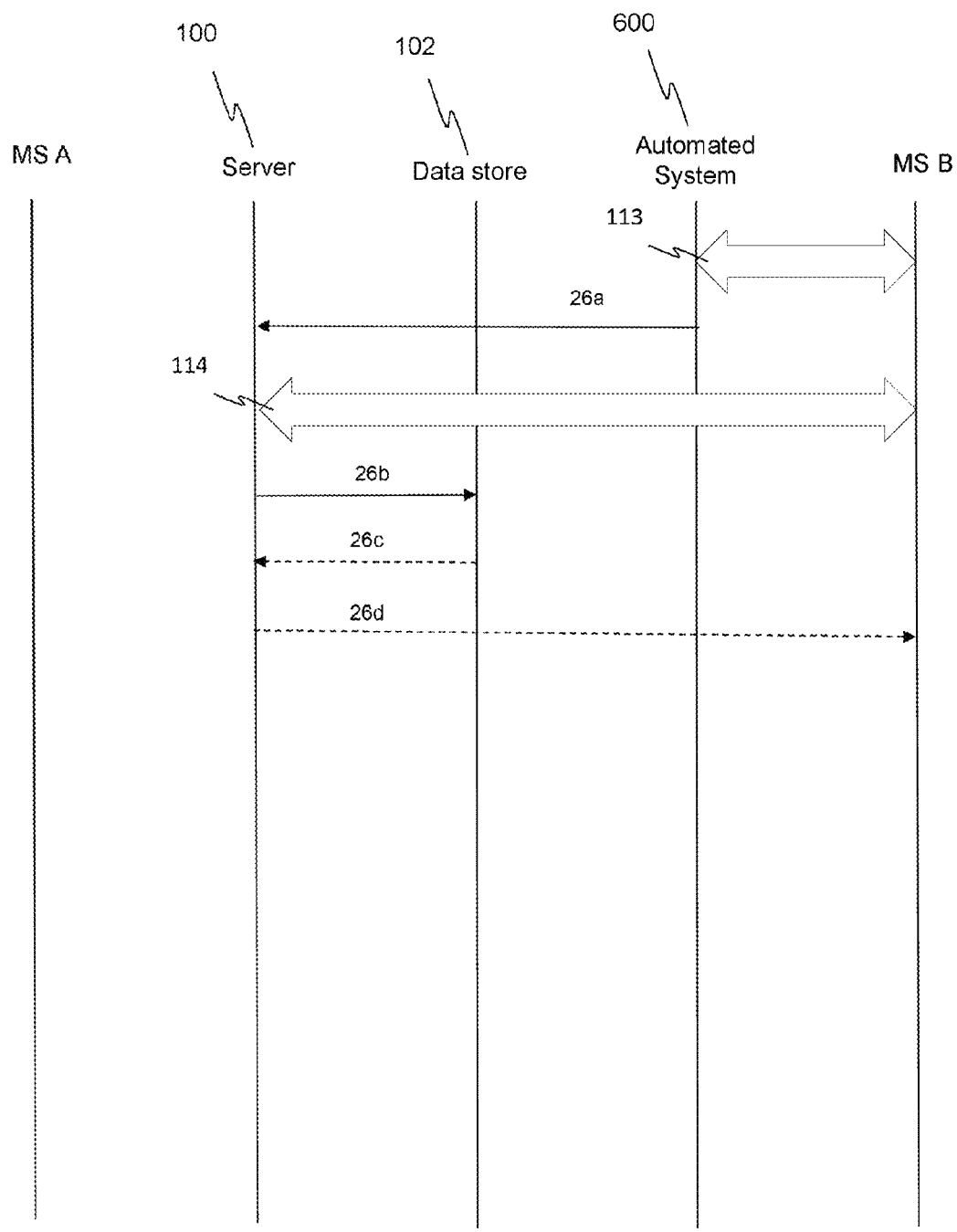
FIG. 26 is a flow diagram depicting operation of embodiments using the system of FIG. 23.

FIG. 26 is a flow diagram depicting operation of embodiments using the system of FIG. 23.

These embodiments occur after the steps carried out in FIG. 25, i.e. the user of MS A has sent one or more files to server 100 for subsequent retrieval by the user of MS B. These embodiments involve the user of MS B retrieving the one or more files from server 100.

The user of MS B dials the number for automated system 600 and a call is established between MS B and automated system 600 as shown by item 113.

Automated system 600 detects the call in progress between itself and MS B and notifies server 100 of call party details for the call, in step 26a.

Server 100 establishes a separate communications session, separate from the telephone call between MS B and automated system 600, for the transfer of data to/from MS B, as shown by item 114. The separate communications session is established on the basis of one or more call party details associated with the telephone call.

Server performs a lookup in data store 102 in step 26b for files stored in association with MS B and retrieves one or more such files in step 26c. Server 100 transmits the files retrieved in step 26c to MS B via the separate communications session in step 26d.

In embodiments, automated system 600 comprises a voicemail system. In such embodiments, the established telephone call comprises a user of a telephony user device (e.g. MS B) retrieving a voice message from the voicemail system.

In embodiments, the voice message was left for retrieval by the user of MS B by the user of MS A. In addition to leaving a voice message, the user of MS A also uploaded one or more files to server 100 via a communication session established between their telephony device (e.g. MS A) and server 100 for later retrieval by the user of MS B. Server 100 stored the files transmitted via the session in data store 102 as described above in relation to FIG. 25.

In embodiments, the one or more files were transmitted from MS A during recordal of the voice message by the user of MS A and server 100 stored time-stamp data in association with at least one of the one or more stored files, for example as metadata for the one or more stored files. The time-stamp data may for example be based at least in part on the time at which the one or more files were stored by server 100.

In embodiments, the one or more files are transmitted by server 100 during retrieval of the voice message by MS B according to a schedule determined at least in part by the stored time-stamp data.

Server 100 may receive notification (or other such trigger) of the start of retrieval of the voice message and determine the schedule at least in part by the time of receipt of the notification. In some embodiments, the notification is received from the telephony user device via the session, whereas in alternative embodiments the notification is received from the voicemail system.

Embodiments therefore allow a schedule of file uploading in association with recordal of a voice message to substantially match a schedule for file downloading in association with retrieval of the voice message. This can enable for example the time at which a user of MS A uploaded a given file during recordal of a voice message to be substantially matched by the time at which the file is downloaded to MS B during retrieval (playback) of the given file by the user of MS B. Such time-matching of uploading and downloading functionality is now described in relation to FIGS. 27 (voice message recordal and file upload during such) and 28 (voice message retrieval and file download during such).

Figure 27:
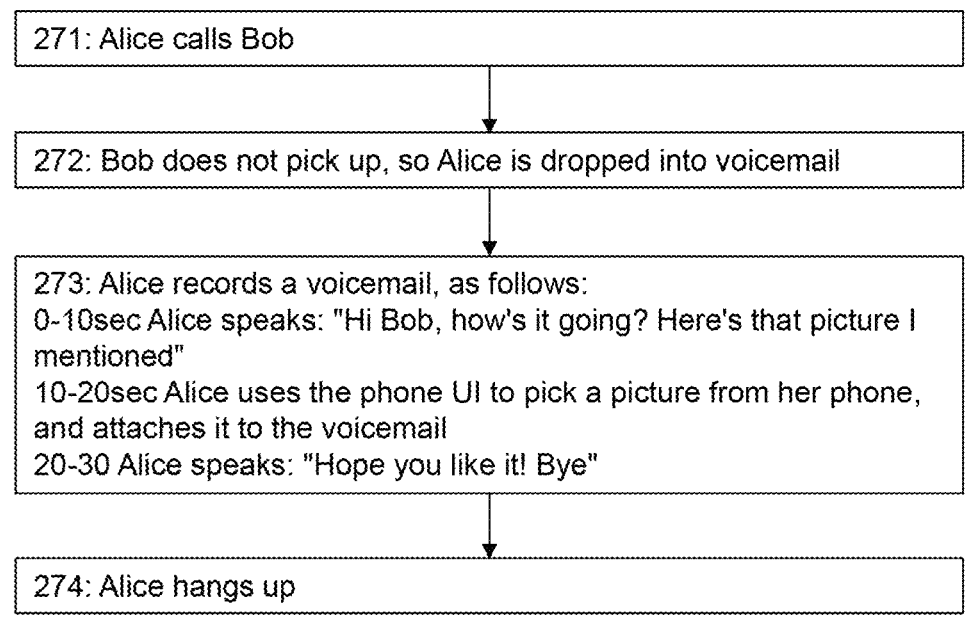
FIG. 27 is a flow chart depicting operation of embodiments using the system of FIG. 23.

FIG. 27 is a flow chart depicting operation of embodiments using the system of FIG. 23.

The process of FIG. 27 begins when Alice (e.g. user of MS A) makes a call to Bob (e.g. user of MS B) in step 271. Bob does not answer his telephone (MS B), so Alice is dropped into voicemail at automated system 600 in step 272.

A separate communications session, separate from the telephone call between MS A and the voicemail system, is established for the transfer of data to/from MS A and server 100, on the basis of one or more call party details associated with the telephone call between MS A and the voicemail system. At least a part of a graphical user interface of MS A is reconfigured in accordance with configuration data relating to and/or being derived from the voicemail system received via the separate communication session from server 100.

The reconfiguration comprises configuring on MS A a first touch-sensitive region which is operable to instruct the voicemail system to initiate recordal of a voice message. The reconfiguration also comprises configuring on MS A a second touch-sensitive region which is operable to open a file browsing application on MS A and, in response to receipt, via the file browsing application, of user input selecting one or more files, transmit the one or more selected files via the session to server 100 during recordal of a voice message.

Alice selects the first configured touch-sensitive region on MS A and records a voicemail in step 273, as follows:

between 0 and 10 seconds during recordal of the voice message, Alice speaks: "Hi Bob, how's it going? Here's that picture I mentioned.";

between 10 and 20 seconds during recordal of the voice message Alice selects the second configured touch-sensitive region on MS A and uses the file browsing application to transmit a picture file from MS A to server 100 via the session. When server 100 receives the picture transmitted from MS A, server 100 stores the picture file in data store 102 along with time-stamp data, for example time-stamp data indicating the time during recordal of the voicemail at which the picture file was transmitted from MS A; and between 20 and 30 seconds during recordal of the voice message Alice speaks: "Hope you like it! Bye" and hangs up in step 274.

Figure 28:
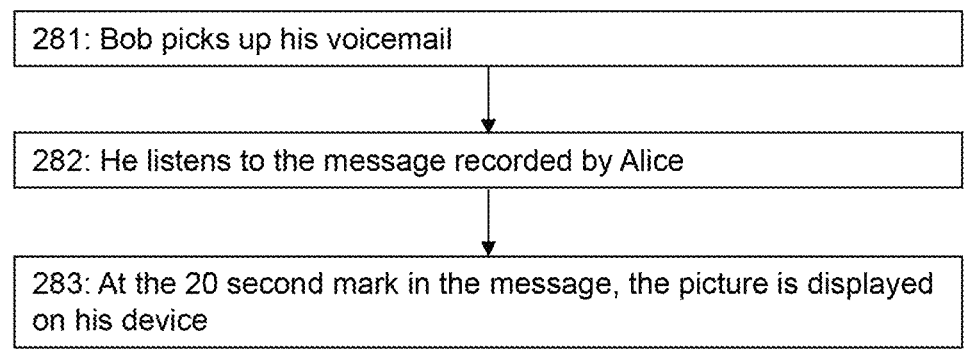
FIG. 28 is a flow chart depicting operation of embodiments using the system of FIG. 23.

FIG. 28 is a flow chart depicting operation of embodiments using the system of FIG. 23.

The process of FIG. 28 begins when Bob (e.g. user of MS B) makes a call to his voicemail system in step 281.

A separate communications session, separate from the telephone call between MS B and the voicemail system is established, for the transfer of data to/from MS B and server 100, on the basis of one or more call party details associated with the telephone call between MS B and the voicemail system. At least a part of a graphical user interface of MS B is reconfigured in accordance with configuration data relating to and/or being derived from the voicemail system received via the separate communication session from server 100.

The reconfiguration comprises configuring on MS B a third touch-sensitive region which is operable to instruct the voicemail system to initiate playback of a voice message.

Bob selects the third configured touch-sensitive region on MS B and server 100 begins in step 282 to playback the voice message previously recorded by Alice (the user of MS A).

During playback of the voice message to Bob, server 100 retrieves time stamp-data stored in data store 102 which is associated with the picture file previously uploaded by Alice. The time-stamp data indicates that the picture file was uploaded at a particular time during recordal of the voice message by Alice. Server 100 therefore retrieves the picture file and associated time-stamp data from data store 102 and timely transmits the picture to MS B such that it is displayed by MS B at 20 seconds after playback of the voice message to Bob begins in step 283. Such embodiments therefore allow Bob to view the picture file on MS B at the same time during retrieval of the voice message as Alice is talking about the picture file uploaded during recordal of the voice message.

Note that server 100 may transmit the file to MS B earlier than the 20 second mark during playback of the voice message and inform MS B of the time at which the picture file should be displayed on MS B during playback of the corresponding voice message. This accommodates for any transmission delays that may occur between server 100 and MS B and therefore avoids display of the picture file out of synchronization with playback of the voice message.

Some users may wish to download one or more files previously uploaded by another user from the voicemail system without having to listen to the corresponding voicemail, i.e. playback of the voice message can be skipped, but one or more files stored in association with a voice message can still be retrieved. The reconfiguring of the one or more touch-sensitive regions can therefore involve configuring a touch-sensitive region which is operable to instruct the voicemail system to initiate transmittal of one or more files stored in association with a previously recorded voice message, but without initiating playback of the associated recorded voice message.

Embodiments described above include a user of a telephony user device MS A uploading one or more files to server 100 whilst a voice message is being recorded where the one or more files are downloaded later by a user of a telephony user device MS B during retrieval of the voice message. In alternative embodiments, instead of the files being uploaded to server 100, the voicemail system is enhanced to enable it to carry out the file storage and retrieval capabilities of server 100 described above. In such embodiments, the one or more files are uploaded to the enhanced voicemail system which has a capability to store such files in association with the corresponding audio of the voice message, along with any associated time-stamp data. The enhanced voicemail system is also enhanced with a capability to retrieve such files and transmit them according to any associated time-stamp data when the voice message is being retrieved. In such embodiments, the enhanced voicemail system may notify server 100 of message upload and download events such that server 100 may reconfigure the user interface of MS A and/or MS B accordingly.

In some embodiments, the configuration data comprises one or more configuration settings. The one or more configuration settings indicate to MS A how it should reconfigure the at least part of its graphical user interface.

In other embodiments, one or more configuration settings are stored locally to MS A. When MS A receives configuration data via the separate communication session, MS A knows to refer to the one or more locally stored configuration settings in order to find out how to reconfigure the at least part of its graphical user interface.

In some embodiments, the configuration data is generated by automated system 600 and instead of establishing a separate communication session between server 100 and MS A, a communication session between MS A and automated system 600 is established for the transmission of data to/from MS A.

Capabilities of the various devices to handle receipt/transmission of configuration data according to embodiments can be ascertained by transmittal of a SIP INFO message with an appropriate eXtensible Markup Language (XML) file embedded within it, with a corresponding SIP OK response message being returned containing the capability information. Such SIP INFO messages may be transmitted from automated system 600 to server 100, from automated system 600 to MS A and/or from server 100 to MS A.

The above embodiments are to be understood as illustrative examples of embodiments. Further embodiments are envisaged.

In the above-described embodiments, the automated system is a voicemail system. In alternative embodiments, the automated system may take different forms.

In another embodiment, the automated system may comprise an interactive voice response (IVR) unit, with which the user interacts on a call. Configuration data associated with the IVR unit, for example information resulting from an IVR interaction with the user, may be used to alter the information displayed on the reconfigured user interface.

In another embodiment, the automated system may comprise a conference call system, with which the user interacts on a call. Configuration data associated with the conference call system, for example a data entry screen requesting a conference call ID from the user may be displayed after the conference call system has been called by the user on a general conference calling number and a connection has been made. The conference call ID may then be collected and transmitted to the conference call system via the separate communications session.

The above described embodiments primarily relate to telephony devices having associated identities in the form of telephone dialing numbers. In other embodiments, one or more, or all of the identities could be non-telephone-dialing-numbers, for example usernames, email addresses etc. Where non-telephone-dialing-number identities are employed, mappings between non-telephone-dialing-number identities and telephone dialing number identities may be stored in data store 102 and used by server 100 for converting from non-telephone-dialing-number identities to telephone dialing numbers after receipt of the call party details.

The personal computer PC A described above could alternatively be another device or combination of devices with corresponding data processing, display and data input capabilities, for example a television, a smart television, a general purpose desktop computer terminal, a general purpose laptop computer terminal, a general purpose tablet computer terminal, an in-car computing and communications system a satellite navigation system, games console, or any combination thereof.

In embodiments described above, telephone calls to/from mobile stations and POTS phones are detected either by application software running on the mobile stations or by a telephony apparatus configured accordingly. In alternative embodiments, during a voice call, a party to the call uses a computing terminal to enter in call party details (for example the calling and called party telephone dialing numbers) for the call via a web server interface. The web server interface passes the call party details to server 100 which can then establish a communications session, separate to the voice call, on the basis of the calling and called party telephone dialing numbers received from the web server interface.

The logical coupling between user devices for a user may be temporary or more permanent. If for example a user has a POTS phone and a PC as their user devices in their home, then these devices will tend to be used by the user on a fairly permanent basis, so the logical coupling would tend to be more permanent. If for example a user has a mobile phone and a satellite navigation system in their car, then the logical coupling between the two devices may only be valid when the user is in or near their car, so the logical coupling would only be maintained temporarily when the two devices are within close enough proximity of each other.

The logical coupling between a user's devices can be activated (or otherwise triggered) by a variety of different processes. One example could involve communication between a smartphone and a satellite navigation system via a short wave radio interface (such as a Bluetooth™ interface) in order to couple the two devices together locally, along with subsequent registration of details of such with server 100. Another example could be registration of device details via a website. A further example might involve registration by a service engineer when installing a telephone and set-top box combination. Alternatively, registration could be carried out over the telephone verbally to an administrative operator, or via an Interactive Voice Response (IVR) system.

The above embodiments describe telephone calls and establishment of communications sessions for user devices of two parties. All embodiments can be applied to user devices of multiple parties numbering more than two. When the multiple parties are conducting a multi-leg teleconference, a communications session can be created between all of their user devices, allowing communication of data, not just between two user devices, but between many different combinations of user devices, i.e. multi-branch data communication.

The connections between server 100 and the user devices are described above as being HTTP or HTTPS connections. In alternative embodiments, the connections could be peer-to-peer connections such that data is communicated between the user devices through a number of peer-to-peer nodes. Creating the peer-to-peer connections may involve use of processes for traversing firewalls, for example using protocols such as the Simple Traversal of User Datagram Protocol (UDP) Through Network Address Translators (NATs) (STUN) protocol.

Further alternatively, the connections could initially be created as HTTP or HTTPS connections between server 100 and the user devices, but then could be migrated to peer-to-peer connections according to network topography and/or current network load.

Embodiments described above involve communication of different types of data during a communication session, for example software component identifiers, software applications, feature identifiers, authorization requests, authorization indications, geographical location data, etc. Any of these different types of data may be communicated between the various combinations of devices in the above described embodiments, including mobile station to mobile station and mobile station to PC, both with or without use of telephony apparatus for call detection.

Embodiments described above allow a single predetermined affiliate such as a user of a device or a service provider to be associated with download of one or more files by a user of another device. In alternative embodiments, both a user of a device and a service provider can be associated with download of one or more file by a user of another device.

The example embodiments described above in relation to FIGS. 20 to 22 include reconfiguration of a touch-screen user interface mobile telephone device MS A. Embodiments can equally be applied to a mobile telephony device having a non-touch-sensitive screen, in which case the reconfiguration can involve reconfiguring one or more soft-keys accordingly.

In the above-described embodiments, both call parties transmit, either from the telephony device, or an associated device, call party identifiers for each party to the server 100 in the process of setting up the separate data communications session. These call party identifiers are, in the embodiments described, both telephony dialing numbers (TDNs). In alternative embodiments, one party or both parties may be identified by another form of call party identifier, using for example one or more lookup mechanisms which map a telephony dialing number to a different unique identifier and/or vice-versa (examples of such alternatives are described in further detail below.) However, such lookup mechanisms may increase latency and may introduce unexpected errors (e.g. if a lookup database such as an address book is not kept up to date.) Hence, whilst it is not indeed necessary for either party to transmit a telephony dialing number of either party (since either party may be identified by other mechanisms), it is preferred that at least one of the devices includes the telephony dialing number of the other party. Indeed, whilst it is again not necessary, it is preferred that both parties transmit the telephony dialing number of the other party, if available, to the server 100, during the session setup. Furthermore, in order at least to reduce latency at the server, and/or to reduce the need to maintain a separate store of identities and/or to reduce the need to implement a registration mechanism, it is preferred that both parties transmit both their own telephony dialing number and the telephony dialing number of the other party, if available, to the server 100, during the session setup. If a call party is identifiable using an additional identifier, such as an extension number or a conference call ID, the additional identifier may be transmitted in association with both of the telephony dialing numbers, if available, by one or each party to the call.

As mentioned above, in alternative embodiments, one, or each, of the call parties may transmit, either from the telephony device, or an associated device, a unique identifier in the form other than that of a telephony dialing number which is nonetheless recognizable by the server 100. A user device which interacts with the server may thus transmit the unique identifier to identify one party, or both parties, as a party to the call, instead of a telephony dialing number. For example, the server 100 may have access to a data store which includes a set of unique identifiers for all subscribers registered to receive the service provided by the server 100, along with a corresponding telephony dialing number for a telephony device associated with each respective unique identifier. Such unique identifiers may be allocated by the server 100 during an initial registration procedure, and notified to, and stored by, an application on the user device which interacts with the server 100 during the registration procedure. Other globally unique identifiers, such as email addresses, Facebook™ IDs, etc. may be used alternatively, or in addition, to such allocated unique identifiers.

In embodiments, at least one of the two call parties may use a Voice-over-Internet-Protocol (VoIP) enabled device or other device employing the Session Initiation Protocol (SIP). One, or each, party may be identified in the call setup procedures by means of a unique SIP user identifier which may include a telephone dialing number as a user identifier or a user identifier other than a telephony dialing number, for example a SIP identifier in which the form of username@hostname. Thus, a SIP user identifier can be transmitted to the server 100 as a call party identifier identifying at least one, or each, participant in the call.

In embodiments, a call party identifier may take the form of an Internet Protocol (IP) address, which may be either a static or dynamically allocated IP address. This may for example be the IP address which a user device transmits to the server 100 in a client-server connection setup request, for example an HTTP setup request, when establishing a leg of the communications session. This may uniquely identify the call party associated with the device making the request. If for example, a given party sends the telephony dialing number of only the other party to the server 100 in the session setup procedure, then that given party can nevertheless be identified as a party to the call using the IP address of that given party's device used in establishing the session leg. The supplied IP address may then be used to send data to that given party's device throughout the ensuing communications session, even if the IP address is only temporarily allocated to the user device as a dynamic IP address. Hence, a static or dynamic IP address may be used, in some embodiments, to identify a call party and may be one of the call party identifiers which forms part of the call party details transmitted to the server 100, e.g. in a connection setup request during session establishment.

In embodiments, a call party identifier may take the form of a session identifier, or other unique identifier, generated by the server 100 and received from the server 100 by a user device in a push notification message. Such a push notification message may be sent from the server in response to the server receiving call party details from the other party to the call, in a first communication session leg. The push notification message is configured, on receipt, to trigger the user device to set up a second communication session leg with the server 100. The user device may be configured to include the identifier received in the push notification as a call party identifier in a client-server connection setup request, for example an HTTP setup request, when establishing the communications session leg in response to the push notification message. This may uniquely identify the call party associated with the device making the request, since such identifier may be mapped to the telephony dialing number, or other call party identifier, by the server 100. Hence, an identifier received in a push notification message may be used, in some embodiments, to identify a call party and may be one of the call party identifiers which forms part of the call party details transmitted to the server 100, e.g. in a connection setup request during session establishment.

A unique identifier in any of the various forms described above, in a form other than that of a telephony dialing number, may be used to identify a given party to the call, in call party details transmitted by a user device associated with that given party. A unique identifier in any of the various forms described, in a form other than that of a telephony dialing number, may in addition, or in the alternative, be used to identify another party to the call, in call party details transmitted by that given party. The server 100 may supply the unique identifiers of other parties, using e.g. a synchronization process for populating an address book locally stored on the user device with such identifiers. Alternatively, such unique identifiers of other parties may already be stored by, or manually added by a user of the device, in the local address book. Further alternatively, the unique identifiers may be stored in a global address book stored on a remote device. At least one of the two parties may have a user device which is configured to look up, from a local data store (e.g. a local address book) or a remote data store (e.g. a global address book), a correspondence between the other party's telephone dialing number, or other received unique identifier, and a different unique identifier. The different unique identifier may then be used instead to identify the other party to the call in the call party details transmitted by at least one side of the call to the server 100.

In the above, various forms of alternative call party identifiers are described. Whatever form the supplied unique identifier takes, the server 100 may have a corresponding database and lookup mechanism to map a supplied unique identifier to a different call party identifier, such as a telephony dialing number, whereby to match both session legs together as relating to a particular current telephone call, using the information supplied in each respective one of the session legs. The server can then bridge the two session legs together, or otherwise associate the two session legs, to create a separate communications session between the participants in a currently ongoing call.

In the above described embodiments, whilst a different form of call party identifier may be used in some cases, in a generally accessible telephony system at least one of the two parties may have no access to identifying details other than the telephony dialing number of the other call party when the call is established. Hence, the system may be configured such that at least one of the two parties may transmit the call party identifier of the other party to the server 100 in the form of a telephony dialing number, and that the server 100 is able to process one or more call party details in such a form in order to establish the separate communications session.

In alternative embodiments, rather than both call parties transmitting both calling party and called party identifiers to identify the parties to a call, at least one of the parties may transmit only one of the two call party identifiers to the server 100. This may be done according to a predetermined convention, e.g. a convention which determines that the calling party should always transmit both identifiers but the called party need only transmit one identifier (or vice-versa). Again, the server 100 is nevertheless able to match both session legs together as relating to a particular current telephone call, using the information supplied in both of the session legs. In this case, it is sufficient that at least one common call participant, namely that participant which is determined by convention to be identified by each party to the call, has been identified in each session leg.

In some circumstances, the telephony dialing number, or other call party identifier, of the other party may not be received at all during the call setup procedures. For example, the other party may use a number withholding service. Hence, an identifier for the other party may not be available to the user device. In this case, the user device may be able, during the setup of the separate communications session, to identify only its associated call party (and not the other call party) to the server 100 as a party to the call. However, providing both sides of the call do not use a number withholding service, the other party's device may be able identify both parties to the call, and may transmit call party details identifying both call parties to the server 100 during session establishment. Again, the server 100 is nevertheless able to match both session legs together as relating to a particular current telephone call, using the information supplied in both of the session legs. Again, in this case, it is sufficient that at least one common call participant, namely the participant not using a number withholding service, has been identified in both session legs.

In the above-described embodiments the mobile stations MS A, MS B communicate via a PLMN. Such a PLMN may be any of a variety of different cellular communications network types, including a 2G network such as a Global System for Mobile communications (GSM) network, a 3G network, such as a Universal Mobile Telecommunications System (UMTS) network or a 4G network such as a Long Term Evolution (LTE or LTE Advanced) network. Whilst the call setup and call data flow may be conducted via the PLMN, the communications relating to the separate data communications session, e.g. communications with the server 100, may be conducted via a different radio access network (RAN), such as a wireless local area network (WLAN) based on the IEEE 802.11 standards.

In the above-described embodiments, the server 100 is described as a single computing device located in a single network location. However, it should be understood that the server may consist of a distributed set of computing devices or applications, either co-located in a single network location, or dispersed in different network locations.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which is defined in the accompanying claims.

The invention claimed is:

1. A telephony user device capable of establishing a communications session for communication of data in a data communications network, the telephony user device comprising a processing system configured to:
provide a reconfigurable graphical user interface;
in response to a call attempt directed to another telephony user device being unanswered, establish a telephone call with a voicemail system;
establish a separate communications session, separate from the telephone call, on the basis of one or more call party details associated with the telephone call, wherein the separate communication session is capable of transferring data to the telephony user device, from the telephony user device, or to and from the telephony user device; and
reconfigure at least a part of the graphical user interface in accordance with configuration data received via the separate communication session, the configuration data being at least one of related to or derived from the voicemail system.

2. A telephony user device according to claim 1, wherein the reconfigurable graphical user interface comprises a touchscreen user interface,
wherein the reconfiguration comprises configuring one or more touch-sensitive screen regions in the at least part which are operable to initiate one or more operations of the telephony user device in response to user input via the one or more touch-sensitive screen regions.

3. A telephony user device according to claim 2, wherein one of the one or more touch-sensitive regions is operable to:
open a messaging application on the telephony user device; and
instruct the messaging application to create a new message.

4. A telephony user device according to claim 3, wherein one of the one or more touch-sensitive regions is further operable to insert an identity associated with the intended recipient user device into a destination field of the new message.

5. A telephony user device according to claim 4, wherein the identity comprises one or more of:
a telephony dialing number,
an email address, and
a Session Initiation Protocol Uniform Resource Identifier, SIP URI.

6. A telephony user device according to claim 3, wherein the one of the one or more touch-sensitive regions is further operable to insert predetermined text into the body field of the new message.

7. A telephony user device according to claim 2, wherein one of the one or more touch-sensitive regions is operable to instruct the voicemail system to perform at least one of:
terminating the call;
initiating recordal of a voice message;
initiating playback of a voice message;
initiating re-recordal of a voice message recorded via the telephony user device;
initiating deletion of a voice message;
initiating a rewind operation during playback of a voice message previously recorded via a device other than the telephony user device;
initiating a fast-forward operation during playback of a voice message previously recorded via a device other than the telephony user device; or
initiating a pause operation during playback of a voice message previously recorded via a device other than the telephony user device.

8. A telephony user device according to claim 2, wherein one of the one or more touch-sensitive regions is operable to open a file browsing application on the telephony user device, the processing system being configured to:

in response to receipt, via the file browsing application, of user input selecting one or more files, transmit the one or more selected files via the session.

9. A telephony user device according to claim 7 or 8, the processing system being configured to receive the user input selecting one or more files and transmit the one or more selected files via the session during recordal of the voice message.

10. A telephony user device according to claim 9, the processing system being configured to transmit time stamp data via the session during recordal of the voice message, the time stamp data being indicative of the time at which the one or more selected files are transmitted.

11. A telephony user device according to claim 10, the processing system being configured to transmit the time stamp data in conjunction with transmittal of the one or more files.

12. A telephony user device according to claim 2, wherein one of the one or more touch-sensitive regions is operable to perform at least one of:
instructing the voicemail system to initiate transmittal of one or more files stored in association with a previously recorded voice message, but without initiating playback of the associated recorded voice message; or
instructing a geographical location module application on the telephony user device to generate geographical location data relating to the physical location of the telephony user device and transmit data including or derived from the generated geographical location data via the session.

13. A telephony user device according to claim 1, the processing system being configured to receive one or more configuration settings in the configuration data, and wherein the reconfiguration is carried out in accordance with the one or more settings.

14. A telephony user device according to claim 1, wherein the configuration data is generated by the voicemail system.

15. Apparatus adapted to establish a communications session for communication of data in a data communications network, the apparatus comprising a processing system configured to:
receive call party details for a telephone call established between a telephony user device having a reconfigurable graphical user interface and a voicemail system, the telephone call having been established in response to a call attempt from the telephony user device directed to another telephony user device being unanswered;
establish a separate communications session, separate from the telephone call, on the basis of one or more call party details associated with the telephone call, wherein the separate communication session is capable of transferring data to the telephony user device, from the telephony user device, or to and from the telephony user device; and
transmit configuration data via the separate communication session, the configuration data being operable to instruct the telephony device to reconfigure at least a part of its graphical user interface.

16. Apparatus adapted to establish a communications session for communication of data in a data communications network, the apparatus comprising a processing system configured to:
receive call party details for a telephone call established between a telephony user device and an automated system, the telephone call having been established in response to a call attempt from the telephony user device directed to another telephony user device being unanswered;
establish a separate communications session, separate from the telephone call, on the basis of one or more call party details associated with the telephone call, wherein the separate communication session is capable of transferring data to the telephony user device, from the telephony user device, or to and from the telephony user device;
receive one or more files from the telephony user device via the session; and
store the received one or more files in association with one or more call party details associated with the telephone call.

17. Apparatus according to claim 16, wherein the automated system comprises a voicemail system.

18. Apparatus according to claim 17, wherein the established telephone call comprises a user of the telephony user device recording a voice message at the voicemail system.

19. Apparatus according to claim 16, the processing system being configured to store time-stamp data associated with the at least one of the one or more files, the time-stamp data being stored in association with the stored one or more files and one or more call party details.

20. Apparatus according to claim 18 or 19, wherein the one or more files are received during recordal of the voice message and the time-stamp data relates to the time at which recordal of the voice message began.

21. Apparatus according to claim 19, wherein the time-stamp data is associated with at least one of:
the time of receipt of the one or more files at the apparatus; or
the time of transmittal of the one or more files from the telephony user device.

22. Apparatus according to claim 19, the processing system being configured to perform at least one of:
receiving at least part of the time-stamp data from the telephony user device; or
generating at least part of the time-stamp data upon receipt of the one or more files.

23. Apparatus adapted to establish a communications session for communication of data in a data communications network, the apparatus comprising a processing system configured to:
store one or more files;
receive call party details for a telephone call established between a telephony user device and an automated system;
establish a separate communications session, separate from the telephone call, on the basis of one or more call party details associated with the telephone call, wherein the separate communication session is capable of transferring data to the telephony user device, from the telephony user device, or to and from the telephony user device; and
transmit at least one of the stored files via the session,
wherein the one or more files are stored in response to a call attempt from another telephony user device being unanswered by the telephony user device.

24. Apparatus according to claim 23, wherein the automated system comprises a voicemail system.

25. Apparatus according to claim 24, wherein the established telephone call comprises a user of the telephony user device retrieving a voice message from the voicemail system.

26. Apparatus according to claim 25, wherein the one or more files are transmitted during retrieval of the voice message.

27. Apparatus according to claim 23, the processing system being configured to store time-stamp data in association with at least one of the one or more stored files.

28. Apparatus according to claim 27, wherein the time-stamp data is based at least in part on the time at which the one or more files are stored.

29. Apparatus according to claim 27, wherein the one or more files are transmitted during retrieval of the voice message according to a schedule determined at least in part by the stored time-stamp data.

30. Apparatus according to claim 29, the processing system being configured to receive notification of the start of retrieval of the voice message,
   wherein the schedule is determined at least in part by the time of receipt of the notification.

31. Apparatus according to claim 30, wherein the notification is received from the telephony user device via the session or from the voicemail system.

32. A computer program product comprising a non-transitory computer-readable storage medium having computer readable instructions stored thereon, the computer readable instructions being executable by a computerized device to cause the computerized device to operate a telephony device according to claim 1 or an apparatus according to claim 15, 16 or 23.

* * * * *